United States Patent
Park et al.

(10) Patent No.: US 10,473,886 B2
(45) Date of Patent: Nov. 12, 2019

(54) LENS DRIVING APPARATUS, AND CAMERA MODULE AND OPTICAL DEVICE COMPRISING SAME

(71) Applicant: LG INNOTEK CO., LTD., Seoul (KR)

(72) Inventors: Sang Ok Park, Seoul (KR); Byung Wook Son, Seoul (KR); Seong Min Lee, Seoul (KR); Jun Taek Lee, Seoul (KR); Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 50 days.

(21) Appl. No.: 15/758,670

(22) PCT Filed: Sep. 8, 2016

(86) PCT No.: PCT/KR2016/010088
§ 371 (c)(1),
(2) Date: Mar. 8, 2018

(87) PCT Pub. No.: WO2017/043884
PCT Pub. Date: Mar. 16, 2017

(65) Prior Publication Data
US 2018/0252893 A1    Sep. 6, 2018

(30) Foreign Application Priority Data

Sep. 8, 2015   (KR) .................. 10-2015-0127252
Sep. 23, 2015  (KR) .................. 10-2015-0134327

(51) Int. Cl.
*G02B 7/02*    (2006.01)
*G02B 7/10*    (2006.01)
(Continued)

(52) U.S. Cl.
CPC .............. *G02B 7/102* (2013.01); *G02B 7/08* (2013.01); *G02B 7/09* (2013.01); *G02B 27/646* (2013.01);
(Continued)

(58) Field of Classification Search
CPC . G02B 7/08; G02B 7/09; G02B 7/102; G02B 27/646; G03B 3/10; G03B 5/00;
(Continued)

(56) References Cited

U.S. PATENT DOCUMENTS 5,682,097 A      10/1997  Bryant et al.
2014/0368936 A1*  12/2014  Hu .................. G02B 27/646
                                              359/824

FOREIGN PATENT DOCUMENTS

JP    2002-341243 A    11/2002
JP    2005-331399 A    12/2005
(Continued)

OTHER PUBLICATIONS

International Search Report in International Application No. PCT/KR2016/010088, filed Sep. 8, 2016.

*Primary Examiner* — William Choi
(74) *Attorney, Agent, or Firm* — Saliwanchik, Lloyd & Eisenschenk

(57) ABSTRACT

An embodiment comprises: a housing; a bobbin for mounting a lens, the bobbin being accommodated inside the housing; a first coil disposed on an outer circumferential surface of the bobbin; a magnet disposed in the housing; and a second coil disposed in the housing, wherein the second coil comprises a third coil and a fourth coil, a first signal is applied to the first coil, a second signal is applied to the fourth coil, and an induction voltage is generated in the second coil by a mutual induction operation between the first coil and the second coil.

20 Claims, 26 Drawing Sheets

(51) Int. Cl.
*G02B 7/09* (2006.01)
*G03B 3/10* (2006.01)
*G03B 5/00* (2006.01)
*H02K 41/035* (2006.01)
*H04N 5/225* (2006.01)
*H04N 5/232* (2006.01)
*G02B 7/08* (2006.01)
*G02B 27/64* (2006.01)
*H02P 1/00* (2006.01)

(52) U.S. Cl.
CPC ............... *G03B 3/10* (2013.01); *G03B 5/00* (2013.01); *H02K 41/035* (2013.01); *H02K 41/0356* (2013.01); *H02P 1/00* (2013.01); *H04N 5/2254* (2013.01); *H04N 5/2257* (2013.01); *H04N 5/23212* (2013.01); *H04N 5/23248* (2013.01); *H04N 5/23287* (2013.01); *G03B 2205/0007* (2013.01); *G03B 2205/0069* (2013.01); *H04N 5/2253* (2013.01)

(58) Field of Classification Search
CPC .... G03B 2205/0007; G03B 2205/0069; H02K 41/035; H02K 41/0356; H02P 1/00; H04N 5/2254; H04N 5/2257; H04N 5/23212; H04N 5/23248; H04N 5/23287
USPC .................. 359/811, 819, 822, 823, 824
See application file for complete search history.

(56) References Cited

FOREIGN PATENT DOCUMENTS

| | | |
|---|---|---|
| JP | 2014-126668 A | 7/2014 |
| KR | 10-2009-0122105 A | 11/2009 |
| KR | 10-1080399 B1 | 11/2011 |
| KR | 10-2013-0075682 A | 7/2013 |
| KR | 10-2014-0107903 A | 9/2014 |

\* cited by examiner

| DISPLACEMENT | CODE VALUE | $Va_1$ |
|---|---|---|
| $d_0$ | code_0 | $P_0$ |
| $d_1$ | code_1 | $P_1$ |
| ⋮ | ⋮ | ⋮ |
| $d_n$ | code_n | $P_n$ |

LENS DRIVING APPARATUS, AND CAMERA MODULE AND OPTICAL DEVICE COMPRISING SAME

CROSS-REFERENCE TO RELATED APPLICATIONS

This application is the U.S. national stage application of International Patent Application No. PCT/KR2016/010088, filed Sep. 8, 2016, which claims priority to Korean Application Nos. 10-2015-0127252, filed Sep. 8, 2015, and 10-2015-0134327, filed Sep. 23, 2015, the disclosures of each of which are incorporated herein by reference in their entirety.

TECHNICAL FIELD

Embodiments relate to a lens driving apparatus and to a camera module and an optical device including the same.

BACKGROUND ART

Cellular phones or smartphones equipped with camera modules for capturing subjects and storing the captured subjects as images or video have been developed. In general, a camera module may include a lens, an image sensor module, and a voice coil motor (VCM) for adjusting the distance between the lens and the image sensor module.

In the case of a camera module mounted in a small electronic product such as a smartphone, the camera module may frequently receive shocks during use, and may be shaken minutely due to, for example, shaking of the user's hand. In consideration of this, development of technology in which a hand tremor compensation device is additionally provided to the camera module has recently been required.

DISCLOSURE

Technical Problem

Embodiments provide a lens driving apparatus capable of achieving accurate auto focusing by inhibiting a lens from being defocused due to variation in ambient temperature, and a camera module and an optical device including the same.

Technical Solution

In one embodiment, a lens driving apparatus includes a housing, a bobbin accommodated in the housing, the bobbin being equipped with a lens, a first coil disposed on an outer circumferential surface of the bobbin, a magnet disposed in the housing, and a second coil disposed in the housing, wherein the second coil includes a third coil and a fourth coil, the first coil receives a first signal and the fourth coil receives a second signal, and induced voltage is generated at the second coil by mutual induction with the first coil.

Voltage may be generated at the fourth coil by the second signal.

Each of the third coil and the fourth coil may surround the outer circumferential surface of the housing so as to rotate about an optical axis in the clockwise direction or in the counterclockwise direction.

One of the third coil and the fourth coil may surround the outer circumferential surface of the housing so as to rotate about an optical axis in the clockwise direction or in the counterclockwise direction, and the remaining one of the third coil and the fourth coil may be disposed in a shape of a coil ring that is wound about an axis perpendicular to the optical axis in the clockwise direction or in the counterclockwise direction.

Each of the first signal and the second signal may be one of an alternating-current signal and a pulse signal.

Each of the first signal and the second signal may include a pulse width modulation (PWM) signal.

The third coil and the fourth coil may be connected in series to each other, and an intermediate tap may be provided at a contact point between one end of the third coil and one end of the fourth coil.

The third coil and the fourth coil may be electrically separated from each other.

The intermediate tap may receive ground power.

The lens driving apparatus may further include an upper elastic member coupled to an upper portion of the bobbin and an upper portion of the housing, and a lower elastic member coupled to a lower portion of the bobbin and a lower portion of the housing, wherein each of the upper elastic member and the lower elastic member may be divided into two or more parts, the first coil may be electrically connected to two selected from among the divided parts of the upper elastic member, and the second coil may be electrically connected to at least three selected from among parts of the upper elastic member other than the selected parts of the upper elastic member and among the parts of the lower elastic member.

The lens driving apparatus may further include a circuit board disposed on one side surface of the housing and electrically connected to the divided parts of the upper elastic member and the divided parts of the lower elastic member.

The lens driving apparatus may further include a circuit board disposed below the lower elastic member and electrically connected to the divided parts of the upper elastic member and the divided parts of the lower elastic member, and support members for electrically connecting the divided parts of the upper elastic member and the circuit board to each other.

The lens driving apparatus may further include a fifth coil disposed on the circuit board and configured to move the housing via interaction with the magnet.

The lens driving apparatus may further include a capacitor connected in parallel to both ends of the second coil.

Induced voltage generated at each of the third coil and the fourth coil by mutual induction with the first coil may vary according to variation in ambient temperature.

Voltage generated by the second signal may vary according to variation in ambient temperature.

Each of the first signal and the second signal may include an alternating-current signal and a direct-current signal.

The PWM signal may have a frequency of 20 kHz or higher.

In another embodiment, a camera module includes a lens barrel, a lens driving apparatus according to the above-described embodiment for moving the lens barrel, an image sensor for converting an image incident through the lens driving apparatus into an electrical signal, and a drive controller for controlling the lens driving apparatus.

In a further embodiment, an optical device includes a display module including a plurality of pixels, colors of which are changed according to an electrical signal, a camera module according to claim 19 for converting an image incident thereon into an electrical signal, and a controller for controlling operation of the display module and the camera module.

Advantageous Effects

Embodiments are capable of achieving accurate auto focusing by inhibiting a lens from being defocused due to variation in ambient temperature.

DESCRIPTION OF DRAWINGS

FIG. 10a illustrates first voltage between one end of a first induction coil and an intermediate tap and second voltage between one end of a second induction coil and the intermediate tap, which are shown in FIG. 9a.

BEST MODE

Figure 1:
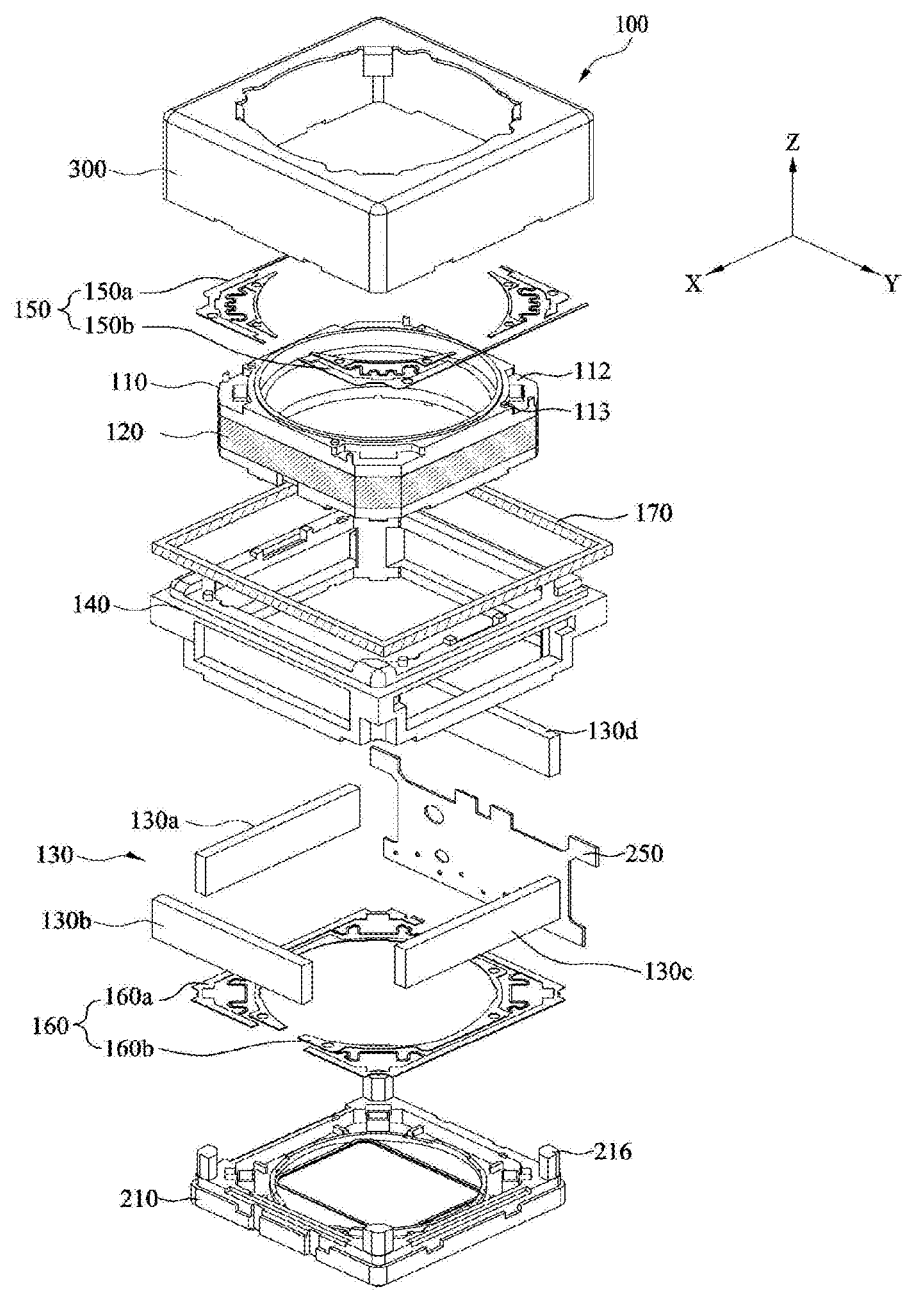
FIG. 1 illustrates a perspective view of a lens driving apparatus according to an embodiment.

Hereinafter, embodiments will be clearly understood from the attached drawings and the description associated with the embodiments. In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. In addition, it will also be understood that the criteria of "on" or "under" is on the basis of the drawings.

In the drawings, elements may be exaggerated in size, omitted or schematically illustrated for convenience in description and clarity. Further, the sizes of elements do not indicate the actual sizes of the elements. Wherever possible, the same reference numbers will be used throughout the drawings to refer to the same parts.

For the convenience of description, the lens driving apparatus according to the embodiment will be described using a Cartesian coordinate system (x, y, z). However, the disclosure is not limited thereto. Other different coordinate systems may be used. In the drawings, an x axis and a y axis are directions perpendicular to a z axis, which is an optical-axis direction. The optical-axis direction or the z-axis direction, which is parallel to the optical-axis direction, may be referred to as a 'first direction', the x-axis direction may be referred to as a 'second direction', and the y-axis direction may be referred to as a 'third direction'.

Figure 2:
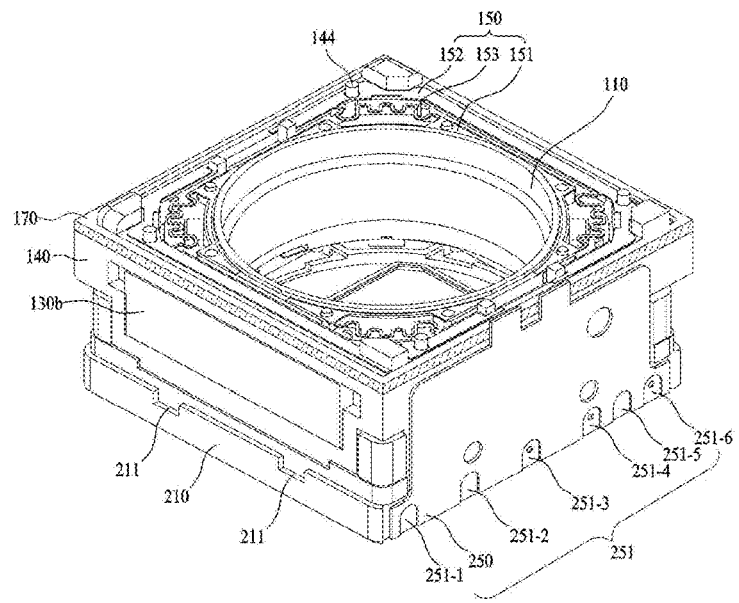
FIG. 2 is an exploded perspective view of the lens driving apparatus shown in FIG. 1.

FIG. 1 illustrates a perspective view of a lens driving apparatus 100 according to an embodiment, and FIG. 2 is an exploded perspective view of the lens driving apparatus 100 shown in FIG. 1.

A hand tremor compensation device used in a small-sized camera module mounted in a mobile device, such as a smartphone or a tablet PC, is a device configured to inhibit the outline of a captured image from being blurred due to vibration caused by the shaking of a user's hand when the image is captured. The term "hand tremor compensation" may be used along with "Optical Image Stabilization (OIS)".

In addition, an auto focusing device is a device for automatically focusing an image of a subject on the surface of an image sensor (not illustrated). The optical image stabilization device and the auto focusing device may be configured in various manners. The lens driving apparatus 100 according to the embodiment may move lenses in the first direction in order to perform an auto focusing function.

Referring to FIGS. 1 and 2, the lens driving apparatus 100 includes a bobbin 110, a first coil 120, a magnet 130, a housing 140, an upper elastic member 150, a lower elastic member 160, a second coil 170, and a circuit board 250. The lens driving apparatus 100 may further include a cover member 300 and a base 210.

First, the cover member 300 will be described.

The cover member 300 accommodates the components 110, 120, 130, 140, 150, 160 and 250 in an accommodation space defined by the cover member 300 and the base 210.

The cover member 300 may be formed in the shape of a box, the lower portion of which is open and which includes an upper end and sidewalls. The lower portion of the cover member 300 may be coupled to the upper portion of the base 210. The upper end of the cover member 300 may be formed in a polygonal shape, such as a quadrangular or octagonal shape.

The cover member 300 may be provided in the upper end thereof with a hollow, through which a lens (not shown) coupled to the bobbin 110 is exposed to external light. In addition, a window, made of a light-transmissive material, may be further provided in the hollow in the cover member 300 in order to inhibit foreign matter, such as dust or moisture, from permeating into a camera module.

The cover member 300 may be made of a non-magnetic body, such as SUS, in order to inhibit the cover member from being attached to the magnet 130. Alternatively, the cover member 300 may be made of a magnetic body so as to perform a yoke function.

Next, the bobbin 110 will be described.

The bobbin 110 is disposed inside the housing 140. The bobbin 110 may move in the optical-axis direction or in the first direction parallel to the optical-axis direction (e.g. the Z-axis direction or the optical-axis direction) as the result of electromagnetic interaction between the coil 120 and the magnet 130.

Although not shown, the bobbin 110 may include a lens barrel (not shown), in which at least one lens is installed. The lens barrel may be coupled to the inside of the bobbin 110 in various manners.

The bobbin 110 may have a hollow, in which the lens or the lens barrel is mounted. The shape of the hollow in the bobbin 110 may conform to that of the lens or the lens barrel. For example, the hollow may be formed in a circular, oval, or polygonal shape. However, the disclosure is not limited thereto.

The bobbin 110 may have at least one upper support protrusion 113, which is disposed on the upper surface thereof and is coupled and fixed to an inner frame of the upper elastic member, and at least one lower support protrusion (not shown), which is disposed on the lower surface thereof and is coupled and fixed to an inner frame 161 of the lower elastic member 160.

The bobbin 110 may have an upper escape recess 112 provided in one region of the upper surface thereof that corresponds to or is aligned with a connection portion 153 of the upper elastic member 150. In addition, the bobbin 110 may have a lower escape recess (not shown) provided in one region of the lower surface thereof that corresponds to or is aligned with a connection portion 163 of the lower elastic member 150. Alternatively, in another embodiment, the connection portion of the upper elastic member and the bobbin may be designed so as to avoid interfering with each other, in which case the upper escape recess and/or the lower escape recess may be eliminated.

The bobbin 110 may be provided in the outer circumferential surface thereof with at least one recess (not shown), in which the first coil 120 is disposed or installed. The shape and number of recesses may correspond to the shape and number of coils disposed on the outer circumferential surface of the bobbin 110. In another embodiment, the bobbin 110 may have no coil-receiving recess, and the first coil 120 may be directly wound around and fixed to the outer circumferential surface of the bobbin 110.

Next, the first coil 120 will be described.

The first coil 120 is disposed on the outer circumferential surface of the bobbin 110. The first coil 120 may be a driving coil that electromagnetically interacts with the magnet 130 disposed in the housing 140. In order to generate electromagnetic force using the electromagnetic interaction with the magnet 130, a drive signal (e.g. drive current) may be applied to the first coil 120.

An AF movable unit may move in the first direction due to the electromagnetic force generated by the electromagnetic interaction between the first coil 120 and the magnet 130. The movement of the movable unit in the first direction may be controlled by controlling the drive signal applied to the first coil 120 to adjust the electromagnetic force, thereby performing an auto focusing function.

The AF movable unit may include the bobbin 110, which is elastically supported by the upper and lower elastic members 150 and 160, and components, which are mounted to the bobbin 110 so as to move together with the bobbin 110. For example, the AF movable unit may include the bobbin 110, the first coil 120, and the lens (not shown) mounted to the bobbin 110.

The first coil 120 may be wound around the outer circumferential surface of the bobbin 110 so as to rotate about the optical axis in the clockwise direction or in the counterclockwise direction. In another embodiment, the first coil 120 may be formed in the shape of a coil ring that is wound about an axis that is perpendicular to the optical axis in the clockwise direction or in the counterclockwise direction.

The number of coil rings may be the same as the number of magnets 130. However, the disclosure is not limited thereto.

The first coil 120 may be electrically connected to at least one of the upper or lower elastic member 150 or 160.

Next, the housing 140 will be described.

Figure 3:
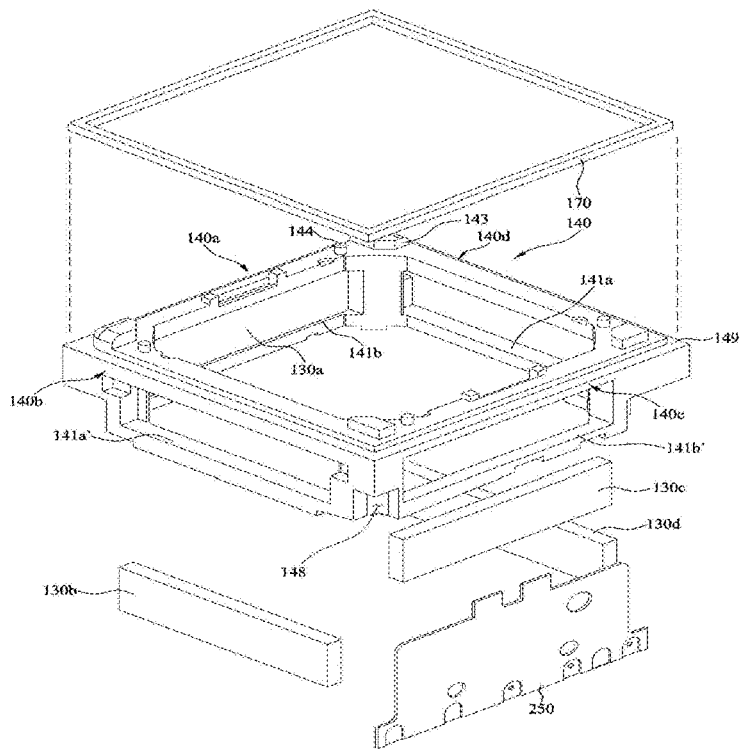
FIG. 3 illustrates a schematic exploded perspective view of a housing, a magnet, and a circuit board shown in FIG. 1.
Figure 4:
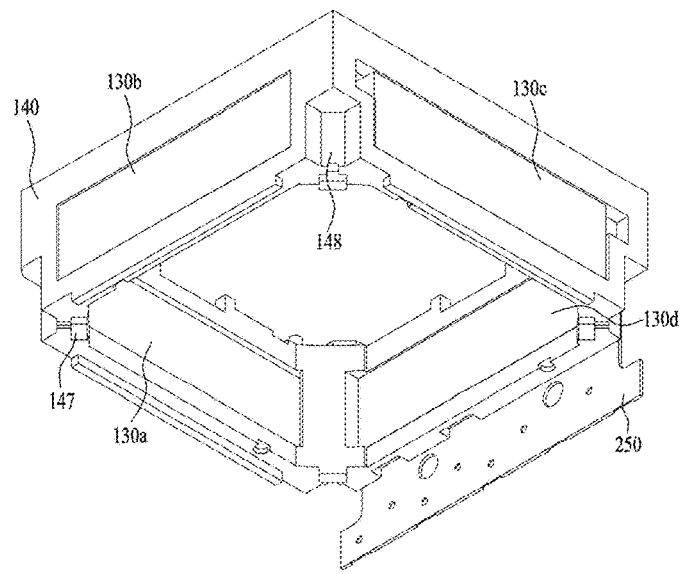
FIG. 4 illustrates an assembled perspective view of the housing, the magnet, and the circuit board of FIG. 3.

FIG. 3 illustrates a schematic exploded perspective view of the housing 140, the magnet 130, and the circuit board 250, and FIG. 4 illustrates an assembled perspective view of the housing 140, the magnet 130, and the circuit board 250 of FIG. 3.

Referring to FIGS. 3 and 4, the housing 140 supports the magnet 130 and the circuit board 250, and receives the bobbin 110 therein such that the bobbin 110 is movable in the first direction, which is parallel to the optical axis.

The housing 140 may be generally formed in a hollow column shape. For example, the housing 140 may have four side portions 140a to 140d and may have a polygonal (e.g. quadrangular or octagonal) or circular hollow therein.

The side portions 140a to 140d of the housing 140 may be provided with magnet recesses 141a, 141a', 141b, and 141b', in which the magnet 130 is seated, disposed, or fixed. In FIG. 3, each of the magnet recesses 141a, 141a', 141b, and 141b' is formed in the shape of a through-hole. However, the disclosure is not limited thereto. Each of the magnet recesses may be formed in the shape of a blind hole.

The housing 140 may have a first stopper 143 protruding from the upper surface thereof.

The first stopper 143 of the housing 140 is provided to prevent inhibit collisions between the cover member 300 and the housing 140. When an external impact is applied, the first stopper may inhibit direct collision between the upper surface of the housing 140 and the upper inner surface of the cover member 300.

In addition, the housing 140 may be provided on the upper surface thereof, e.g. the upper surfaces of the side portions 140a to 140d, with a plurality of upper frame support protrusions 144, to which an outer frame 152 of the upper elastic member 150 is coupled. The housing 140 may be provided on the lower surface thereof with a plurality of lower frame support protrusions 147, to which an outer frame 162 of the lower elastic member 160 is coupled.

In addition, the housing 140 may be provided in the lower ends of the corners of the side portions 140a to 140d thereof with lower guide recesses 148, into which guide members 216 of the base 210 are inserted, fastened, or coupled.

The housing 140 may be provided in the marginal regions of the upper surface thereof, e.g. the marginal regions of the upper surfaces of the side portions 140a to 140d, with a seat portion 149, on which the second coil 170 is seated. The seat portion 149 may be located on the marginal regions of the upper surface of the housing 140 that are adjacent to the edges at which the upper surfaces and the side surfaces of the side portions 140a to 140d adjoin each other.

The seat portion 149 and the upper surfaces of the side portions 140a to 140d of the housing 140 may have steps formed in the vertical direction or in the first direction, and the seat portion 149 may be located below the upper surfaces of the side portions 140a to 140d of the housing 140.

The second coil 170 seated on the seat portion 149 may be spaced apart from the upper elastic member 150, which is located on the upper surface of the housing 140. The reason for this is to prevent inhibit the second coil 170 from being electrically connected to the upper elastic members (e.g. the first and second upper elastic members), which are connected with the first coil 120.

For example, the seat portion 149 may be located between the first stopper 143 and the edges at which the upper surfaces and the side surfaces of the side portions 140a to 140d adjoin each other, and the first stopper 143 may guide the second coil 170 so that the second coil 170 is seated on the seat portion 149.

Next, the magnet 130 will be described.

The magnet 130 may be disposed at the side portions 140a to 140d of the housing 140 so as to correspond to or be aligned with the first coil 120 in a direction perpendicular to the optical-axis direction.

For example, the magnet 130 may be disposed in the magnet recesses 141a, 141a', 141b, and 141b' in the housing 140 so as to overlap the first coil 120 in the second direction or in the third direction.

In another embodiment, no magnet recesses may be formed in the side portions 140a to 140d of the housing 140, and the magnet 130 may be disposed outside or inside the side portions 140a to 140d of the housing 140.

The magnet 130 may have a shape corresponding to the side portions 140a to 140d of the housing 140, e.g. a rectangular parallelepiped shape. However, the disclosure is not limited thereto.

The magnet 130 may be a monopolar magnetized magnet or a bipolar magnetized magnet, which is configured such that the surface of the magnet that faces the first coil 120 has an S pole and the outer surface of the magnet has an N pole. However, the disclosure is not limited thereto. The polarity of the magnet may be reversed.

In this embodiment, the number of magnets 30 is four. However, the disclosure is not limited thereto. The number of magnets 130 may be at least two. The surface of the magnet 130 that faces the first coil 120 may be flat. However, the disclosure is not limited thereto. The surface of the magnet that faces the first coil may be curved.

Next, the upper elastic member 150 and the lower elastic member will be described.

Figure 5:
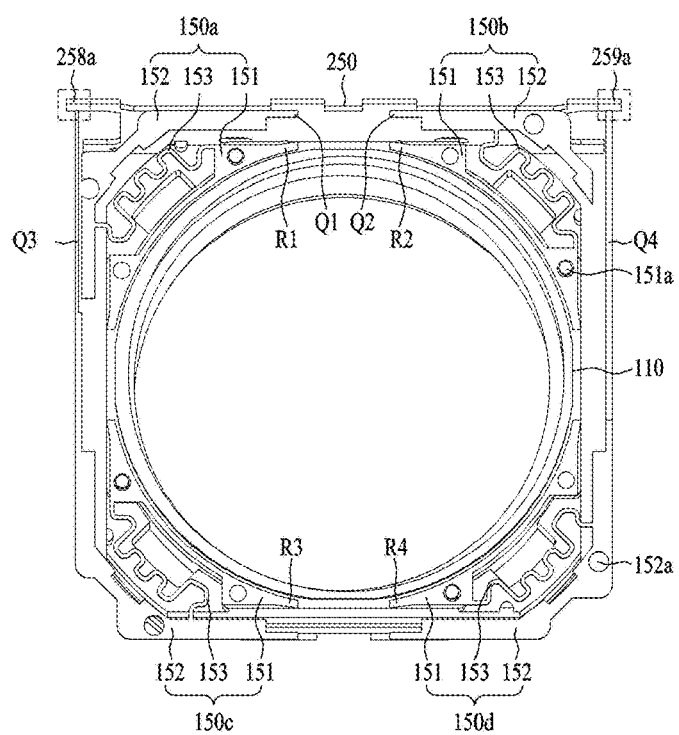
FIG. 5 illustrates a bobbin, an upper elastic member, and the circuit board shown in FIG. 1.
Figure 6:
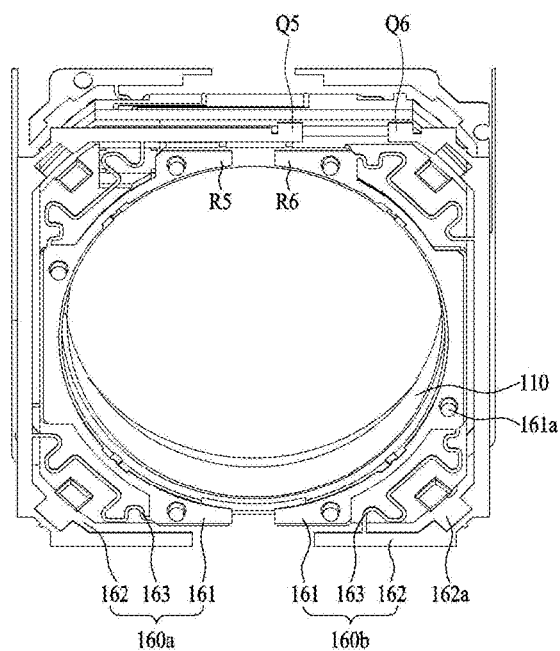
FIG. 6 illustrates the bobbin and a lower elastic member shown in FIG. 1.

FIG. 5 illustrates the bobbin 110, the upper elastic member 150, and the circuit board shown in FIG. 1, and FIG. 6 illustrates the bobbin 110 and the lower elastic member 160 shown in FIG. 1.

Referring to FIGS. 5 and 6, the upper elastic member 150 and the lower elastic member 160 are coupled to the bobbin 110 and the housing 140, and flexibly support the bobbin 110.

For example, the upper elastic member 150 may be coupled to the upper portion, the upper surface or the upper end of the bobbin 110 and to the upper portion, the upper surface or the upper end of the housing 140, and the lower elastic member 160 may be coupled to the lower portion, the lower surface or the lower end of the bobbin 110 and to the lower portion, the lower surface or the lower end of the housing 140.

At least one of the upper and lower elastic members 150 and 160 may be divided into two or more parts.

For example, the upper elastic member 150 may include first to fourth upper elastic members 150a to 150d, which are separated from each other, and the lower elastic member 160 may include first and second lower elastic members 160a and 160b, which are separated from each other. The upper elastic member 150 and the lower elastic member 160 may each be embodied by a leaf spring. However, the disclosure is not limited thereto. The upper elastic member and the lower elastic member may each be embodied by a coil spring or a suspension wire.

Each of the first to fourth upper elastic members 150a to 150d may include an inner frame 151 coupled to the upper support protrusions 113 of the bobbin 110, an outer frame 152 coupled to the upper frame support protrusions 144 of the housing 140, and a first connection portion 153 for connecting the inner frame 151 and the outer frame 152 to each other.

Each of the first and second lower elastic members 160a and 160b may include an inner frame 161 coupled to the lower support protrusion of the bobbin 110, an outer frame 162 coupled to the lower frame support protrusions 147 of the housing 140, and a second connection portion 163 for connecting the inner frame 161 and the outer frame 162 to each other.

Each of the connection portions 153 and 163 of the upper and lower elastic members 150 and 160 may be bent at least once to form a predetermined pattern. The upward and/or downward movement of the bobbin 110 in the first direction may be flexibly (or elastically) supported through the positional change and micro-scale deformation of the connection portions 153 and 163.

The inner frame 151 of the first upper elastic member 150a may include a first inner connection portion R1, and the outer frame 152 of the first upper elastic member 150a may include a first outer connection portion Q1.

The inner frame 151 of the second upper elastic member 150b may include a second inner connection portion R2, and the outer frame 152 of the second upper elastic member 150b may include a second outer connection portion Q2.

The inner frame 151 of the third upper elastic member 150c may include a third inner connection portion R3, and the outer frame 152 of the third upper elastic member 150c may include a third outer connection portion Q3.

The inner frame 151 of the fourth upper elastic member 150d may include a fourth inner connection portion R4, and the outer frame 152 of the fourth upper elastic member 150d may include a fourth outer connection portion Q4.

The inner frame 161 of the first lower elastic member 160a may include a fifth inner connection portion R5, and the outer frame 162 of the first lower elastic member 160a may include a fifth outer connection portion Q5.

The inner frame 161 of the second lower elastic member 160b may include a sixth inner connection portion R6, and the outer frame 162 of the second lower elastic member 160b may include a sixth outer connection portion Q6.

The first to sixth inner connection portions R1 to R6 may be parts to which the first coil 120 or the second coil 170 is electrically connected, and the first to sixth outer connection portions Q1 to Q6 may be parts to which the circuit board 250 is electrically connected.

The first coil 120 may be electrically connected to two inner connection portions selected from among the first to sixth inner connection portions R1 to R6. In addition, the second coil 170 may be electrically connected to inner connection portions other than the inner connection portions to which the first coil 120 is connected.

For example, one end of the first coil 120 (e.g. the start portion of the first coil 120) may be electrically connected to the first inner connection portion R1, and the opposite end of the first coil 120 (e.g. the end portion of the first coil 120) may be electrically connected to the second inner connection portion R2.

Depending on the configuration, the second coil 170 may include three terminals 22a, 22b and 22c or four terminals 23a, 23b, 24a and 24b. Each of the terminals of the second coil 170 may be electrically connected to a corresponding one of the third to fourth inner connection portions R3 to R6.

The first to sixth outer connection portions Q1 to Q6 may be electrically connected to the circuit board 250. For example, each of the first to sixth outer connection portions Q1 to Q6 may be electrically connected to a corresponding one of terminals 251-1 to 251-6 of the circuit board 250.

Bonding between the first coil 120 and the first and second inner connection portions R1 and R2, between the second coil 170 and the third and fourth inner connection portions R3 and R4, and between the circuit board 250 and the first to sixth outer connection portions Q1 to Q6 may be achieved by thermal fusion such as soldering or using conductive epoxy (e.g. Ag epoxy).

The first to fourth upper elastic members 150a to 150d may have through-holes or recesses 151a, which are formed in the inner frames 151 and are coupled to the upper support protrusions 113 of the bobbin 110, and through-holes or recesses 152a, which are formed in the outer frames 152 and are coupled to the upper frame support protrusions 144 of the housing 140.

In addition, the first and second lower elastic members 160a and 160b may have through-holes or recesses 161a, which are formed in the inner frames 161 and are coupled to the lower support protrusions of the bobbin 110, and through-holes or recesses 162a, which are formed in the outer frames 162 and are coupled to the lower frame support protrusions of the housing 140.

Bonding between the upper and lower elastic members 150 and 160 and the bobbin 110 and between the upper and lower elastic members 150 and 160 and the housing 140 may be achieved by thermal fusion and/or using an adhesive.

Next, the circuit board 250 will be described.

The circuit board 250 may be disposed at, coupled to, or mounted to the housing 140, and may be electrically connected to at least one of the upper or lower elastic members 150 or 160. The circuit board 250 may be a printed circuit board, e.g. a FPCB, a PCB, or a ceramic board.

For example, the circuit board 250 may be fixed to, supported by, or disposed at one (e.g. 140c) of the four side portions 140a to 140d of the housing 140. However, the disclosure is not limited thereto. In another embodiment, the circuit board 250 may be supported by the upper surface of the housing 140.

The circuit board 250 may have a plurality of terminals 251, which are electrically connected to the first coil 120 and the second coil 170.

Through the terminals of the circuit board 250, a first drive signal may be supplied to the first coil 120, first voltage v1 or v1" of a first induction coil 171 may be output, and a second drive signal Id2 may be supplied to a second induction coil 172.

For example, the circuit board 250 may include two terminals 251-1 and 251-2 for supplying first power (e.g. (+) power) and second power (e.g. (−) power) to the first coil 120, terminals 251-3 and 251-4, through which the voltage of the first induction coil 171 is output, and terminals 251-5 and 251-6 for supplying the second drive signal to the second induction coil 172.

The lens driving apparatus 100 may include a driver IC, which provides the first drive signal Id1 and the second drive signal Id2 and is disposed on the circuit board 250 or a circuit board 1250, to be described later. Alternatively, in another embodiment, the driver IC may be provided at the camera module.

Next, the base 210 will be described.

The base 210 may be coupled to the cover member 300 to define a space for receiving the bobbin 110 and the housing 140. The base 210 may have a hollow corresponding to the hollow in the bobbin 110 and/or the hollow in the housing 140, and may be formed in a shape coinciding with or corresponding to the shape of the cover member 300, such as a quadrangular shape.

The base 210 may include guide members 216 protruding upwards perpendicularly from the four corners thereof by a predetermined height. Each of the guide members 216 may be formed in the shape of a multi-angular prism. However, the disclosure is not limited thereto. The guide members 216 may be inserted, fastened, or coupled into the lower guide recesses 148 in the housing 140.

Next, the second coil 170 will be described.

The second coil 170 is disposed in the housing 140 so as to be spaced apart from the first coil 120.

For example, the second coil 170 may be disposed on the seat portion 149 provided in the housing 140. For example, the second coil 170 disposed on the seat portion 149 may be disposed between the upper elastic member 150 and the first coil 120 in the vertical direction or in the first direction. However, the disclosure is not limited thereto.

The second coil 170 may be wound so as to rotate about the optical axis in the clockwise direction or in the counterclockwise direction. However, the disclosure is not limited thereto. The second coil 170 may correspond to or may be aligned with the first coil 120 in the first direction. However, the disclosure is not limited thereto.

As shown in FIG. 3, the second coil 170 is formed in the shape of a ring. However, the disclosure is not limited thereto. The second coil 170 may be formed in the shape of a PCB or an FP coil.

Figure 7:
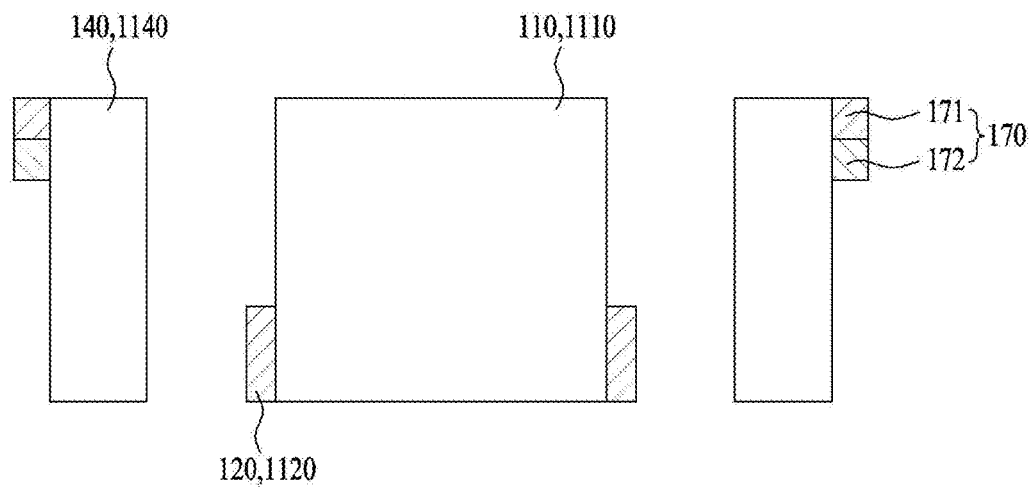
FIG. 7 illustrates one embodiment of a second coil disposed in the housing.

FIG. 7 illustrates one embodiment of the second coil 170 disposed in the housing 140.

Referring to FIG. 7, the second coil 170 includes a first induction coil 171 and a second induction coil 172.

Each of the first induction coil 171 and the second induction coil 172 may be wound around the outer circumferential surface of the housing 140 so as to rotate about the optical axis in the clockwise direction or in the counterclockwise direction.

The first induction coil 171 may be a coil for sensing the position or displacement of the movable unit, namely the bobbin 110, and the second induction coil 172 may be a coil for sensing variation in ambient temperature. For example, the ambient temperature may be a temperature that is generated when the lens driving apparatus, the camera module or the mobile phone is used, and that is applied to the second coil 170.

The first induction coil 171 and the second induction coil 172 may be disposed so as to surround the outer circumferential surface, namely the side portions 140a to 140d, of the housing 140 so as to rotate about the optical axis in the clockwise direction or in the counterclockwise direction. The first induction coil 171 and the second induction coil 172 may be disposed adjacent to each other.

Figure 8:
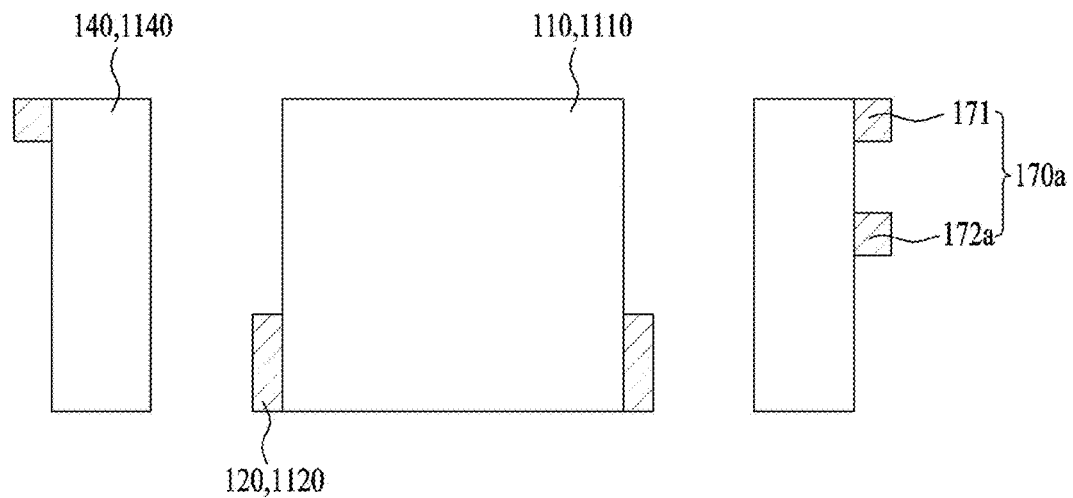
FIG. 8 illustrates another embodiment of the second coil disposed in the housing.

FIG. 8 illustrates another embodiment 170a of the second coil 170 disposed in the housing 140.

Referring to FIG. 8, the second coil 170 may include a first induction coil 171 disposed at the upper portion of the outer circumferential surface of the housing 140 and a second induction coil 172 disposed below the first induction coil 171 so as to be spaced apart therefrom.

At least one of the first and second induction coils 171 and 172 may be disposed so as to surround the outer surface of the housing 140 so as to rotate about the optical axis in the clockwise direction or in the counterclockwise direction.

In addition, at least one of the first and second induction coils 171 and 172 may be disposed in the shape of a coil ring that is wound around one of the side portions of the housing 140 about an axis perpendicular to the optical axis in the clockwise direction or in the counterclockwise direction.

For example, the first induction coil 171 may be disposed so as to surround the outer surface of the housing 140 so as to rotate about the optical axis in the clockwise direction or in the counterclockwise direction, and the second induction coil 172 may be disposed in the shape of a coil ring that is wound around one of the side portions of the housing 140 about an axis perpendicular to the optical axis in the clockwise direction or in the counterclockwise direction.

Figure 9A:
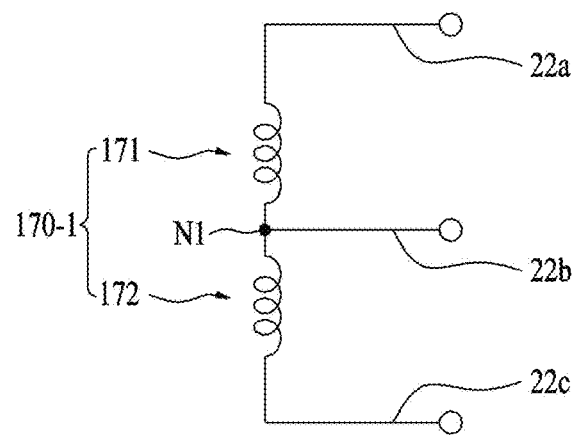
FIG. 9a illustrates one embodiment of the second coil shown in FIG. 1.

FIG. 9a illustrates one embodiment 170-1 of the second coil 170 shown in FIG. 1.

Referring to FIG. 9a, the second coil 170 includes a first induction coil 171 and a second induction coil 172, which are connected to each other in series, and an intermediate tap 22c, which is connected to a contact point Ni between the first induction coil 171 and the second induction coil 172.

The circuit board 250 may include three terminals for electric connection with one end 22a of the first induction coil 171, one end 22b of the second induction coil 172, and the intermediate tap 22c.

Figure 9B:
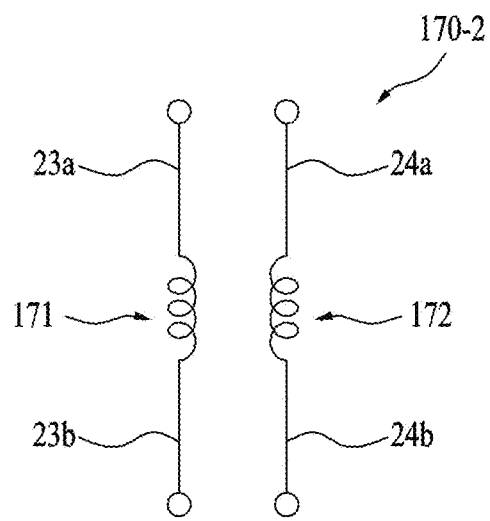
FIG. 9b illustrates another embodiment of the second coil shown in FIG. 1.

FIG. 9b illustrates another embodiment 170-2 of the second coil 170 shown in FIG. 1.

Referring to FIG. 9b, the second coil 170-2 may include a first induction coil 171 and a second induction coil 172, which are electrically separated from each other.

The circuit board 250 may include four terminals for electric connection with one end 23a and the opposite end 23b of the first induction coil 171 and one end 24a and the opposite end 24b of the second induction coil 172.

In another embodiment, the second coil may include a first induction coil and a second induction coil, which are connected to each other in series.

The circuit board 250 may include two terminals for electric connection with one end of the first induction coil and one end of the second induction coil.

Figure 10A:
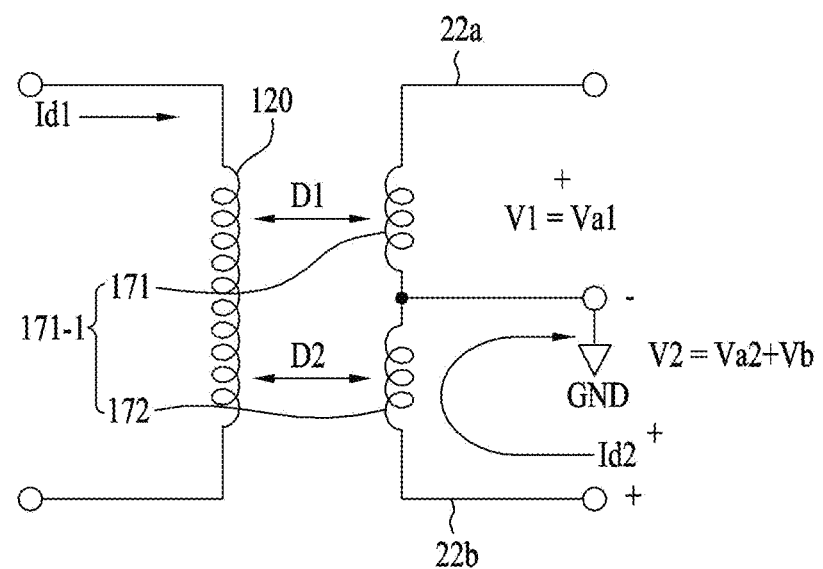

FIG. 10a illustrates first voltage V1 between the one end 22a of the first induction coil 171 and the intermediate tap 22c and second voltage V2 between the one end 22b of the second induction coil 172 and the intermediate tap 22c, which are shown in FIG. 9a.

Referring to FIG. 10a, the first voltage V1 of the first induction coil 171 is output voltage between the one end 22a of the first induction coil 171 and the intermediate tap 22c.

The first voltage V1 may be first induced voltage Va1, which is generated by mutual induction between the first coil 120 and the first induction coil 171.

The second voltage V2 of the second induction coil 172 is output voltage between the one end 22b of the second induction coil 172 and the intermediate tap 22c (V1=Va1).

The second voltage V2 may be generated based on mutual induction between the first coil 120 and the second induction coil 172 and a voltage drop caused by the second drive signal Id2.

For example, the second voltage V2 may be the sum of the second induced voltage Va2, generated by mutual induction between the first coil 120 and the second induction coil 172, and a voltage Vb, generated by the voltage drop caused by the second drive signal Id2 (V2=Va2+Vb).

For example, ground power may be applied to the intermediate tap 22c.

The first coil 120 may be moved together with the bobbin 110 in the first direction by the electromagnetic force generated by the interaction between current flowing through the first coil 120 in response to the first drive signal Id1 and a magnet 1130.

The first drive signal Id1, which is applied to the first coil 120, may be an alternating-current signal, e.g. alternating current. For example, the first drive signal Id1 may be a sine wave signal or a pulse signal (e.g. a Pulse Width Modulation (PWM) signal).

Alternatively, in another embodiment, the first drive signal Id1, which is applied to the first coil 120, may include an alternating-current signal and a direct-current signal. The reason for applying an alternating-current signal, e.g. an alternating current, to the first coil 120 is to induce electromotive force or voltage to the second coil 170 through a mutual induction action. The frequency of the PWM signal may be 20 kHz or more, or may be 500 kHz or more for reduction of current consumption.

As the first coil 120 moves in the first direction, a first distance D1 between the first coil 120 and the first induction coil 171 and a second distance D2 between the first coil 120 and the second induction coil 172 may be changed. As the first and second distances D1 and D2 are changed, the first induced voltage Va1 is induced to the first induction coil 171, and the second induced voltage Va2 may be induced to the second induction coil 172.

For example, as the first and second distances D1 and D2 are decreased, the first and second induced voltages Va1 and Va2, which are induced to the first and second induction coils 171 and 172, may be increased. Conversely, as the first and second distances D1 and D2 are increased, the first and second induced voltages Va1 and Va2, which are induced to the first and second induction coils 171 and 172, may be decreased.

For example, in the case in which the number of windings of the first induction coil 171 and the number of windings of the second induction coil 172 are the same as each other, when the first distance D1 and the second distance D2 become equal to each other due to movement of the movable unit, the first induced voltage Va1 and the second induced voltage Va2 may be equal to each other. However, the disclosure is not limited thereto. In another embodiment, the number of windings of the first induction coil 171 and the number of windings of the second induction coil may be different from each other, the first distance D1 and the second distance D2 may be different from each other, and the first induced voltage Va1 and the second induced voltage Va2 may be different from each other.

The second drive signal Id2, e.g. second drive current, is applied to the second induction coil 172. The second drive signal Id2 may be an alternating-current signal, e.g. alternating current. For example, the second drive signal Id2 may be a sine wave signal or a pulse signal (e.g. a Pulse Width Modulation (PWM) signal). Alternatively, in another embodiment, the second drive signal Id2, which is applied to the second induction coil 172, may include an alternating-current signal and a direct-current signal.

The second drive signal Id2 may be applied to the one end 22b of the second induction coil 172, and may flow between the one end 22b of the second induction coil 172 and the intermediate tap 22c.

Between the one end 22b of the second induction coil 172 and the intermediate tap 22c, voltage Vb may be generated by the voltage drop caused by the second drive signal Id2 and the resistance of the second induction coil 172.

Figure 10B:
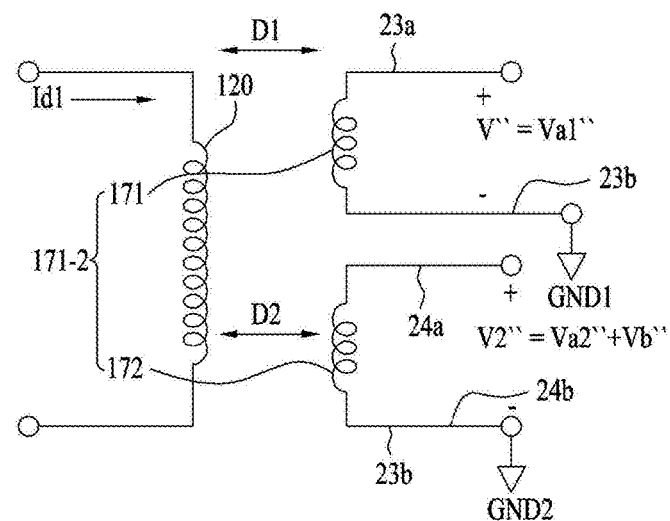
FIG. 10b illustrates first voltage between one end and the opposite end of a first induction coil and second voltage between one end and the opposite end of a second induction coil, which are shown in FIG. 9b.

FIG. 10b illustrates first voltage V1" between the one end 23a and the opposite end 23b of the first induction coil 171 and second voltage V2" between the one end 24a and the opposite end 24b of the second induction coil 172, which are shown in FIG. 9b.

Referring to FIG. 10b, the first voltage V1" of the first induction coil 171 may be output voltage between the one end 23a and the opposite end 23b of the first induction coil 171, and the second voltage V2" of the second induction coil 172 may be output voltage between the one end 24a and the opposite end 24b of the second induction coil 172.

Compared to FIG. 10a, in FIG. 10b, no intermediate tap, which is connected to a ground power source GND, may be used, and the first induction coil 171 and the second induction coil 172 may be electrically separated from each other. For example, a first ground power source GND1 may be connected to the opposite end 23b of the first induction coil 171, and a second ground power source GND2 may be connected to the opposite end 24b of the second induction coil 172.

The first voltage V1" may be first induced voltage Va1" generated by mutual induction between the first coil 120 and the first induction coil 171, and the second voltage V2" may be the sum of second induced voltage Va2" generated by mutual induction between the first coil 120 and the second induction coil 172 and voltage Vb" generated by the voltage drop caused by the second drive signal Id2 (V2"=Va2"+Vb").

The description of the first induced voltage Va1, the second induced voltage Va2, and the voltage Vb generated by the voltage drop, made with reference to FIG. 10a, may be identically applied to Va1", Va2", and Vb" shown in FIG. 10b.

The first induced voltage V1 generated at the first induction coil 171 is influenced by the distance D1 between the first coil 120 and the first induction coil 170-1. Therefore, it is possible to sense the displacement of the bobbin 110, at which the first coil 120 is located, based on the magnitude of the first induced voltage V1 and to perform feedback control of auto focusing of the bobbin 110 in the first direction using the displacement of the bobbin 110 that is sensed.

In general, in order to perform auto focus (AF) feedback control, a position sensor for sensing the displacement of the AF movable unit, e.g. the bobbin, and an additional power connection structure for driving the position sensor are required, which may lead to an increase in the price of the lens driving apparatus and difficulty in manufacturing.

In addition, a linear section (hereinafter, referred to as a "first linear section) in a graph, which indicates the relationship between a moving distance of the bobbin and a magnetic flux of the magnet sensed by the position sensor, may be limited by the positional relationship between the magnet and the position sensor.

Since the embodiment does not need a separate position sensor for sensing the displacement of the bobbin 110, it is possible to reduce the manufacturing costs of the lens driving apparatus and to improve convenience in manufacturing.

In addition, since the embodiment uses mutual induction between the first coil 120 and the first induction coil 171, the linear section in the graph, which indicates the relationship between the moving distance of the bobbin 110 and the first induced voltage V1, may be expanded compared to the first linear section. As a result, the embodiment is capable of assuring linearity within a wider section, lowering a defect rate, and performing AF feedback control more accurately.

Figure 11:
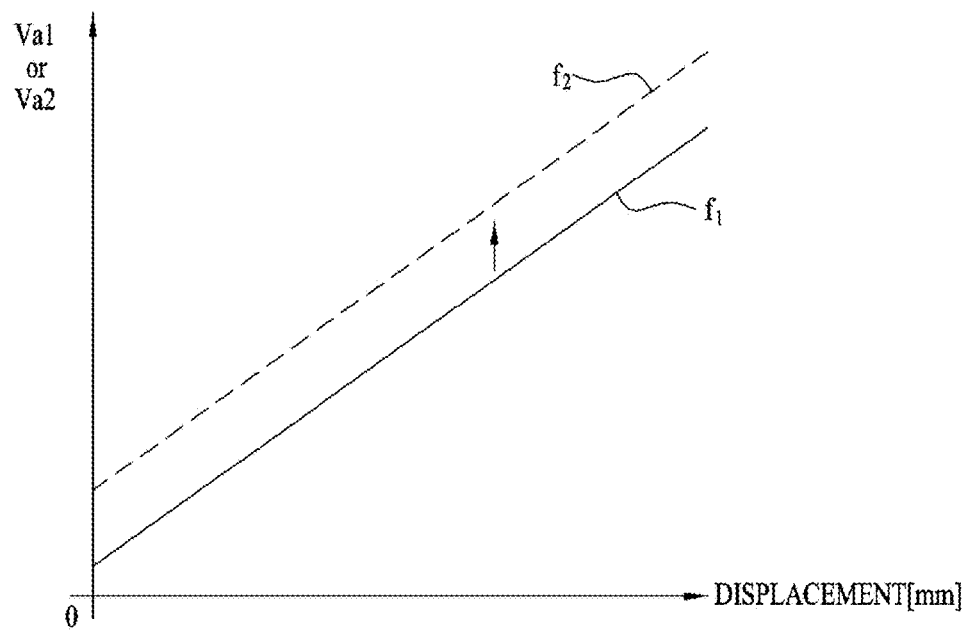
FIG. 11 illustrates variation in voltage, which is induced to the first induction coil or the second induction coil, according to ambient temperature.

FIG. 11 illustrates variation in the voltage Va1 or Va2, which is induced to the first induction coil 171 or the second induction coil 172, according to the ambient temperature.

In FIG. 11, the horizontal axis represents the displacement of the movable unit, and the vertical axis represents the voltage Va1 or Va2, which is induced to the first induction coil 171 or the second induction coil 172. f1 represents the voltage induced to the first or second induction coil when the ambient temperature is 25° C., and f2 represents the voltage induced to the first or second induction coil when the ambient temperature is 65° C.

Referring to FIG. 11, the voltage Va1 or Va2, which is induced to the first or second induction coil 171 or 172, increases as the ambient temperature rises. As such, the voltage Va1 or Va2, which is induced to the first or second induction coil 171 or 172, varies according to variation in ambient temperature. Therefore, when an AF feedback operation is performed, the lens mounted to the lens driving apparatus may be defocused.

For example, when the temperature is 25° C., the lens mounted to the lens driving apparatus has a first focal point due to the AF feedback operation. However, when the temperature is 65° C., the lens may have a second focal point, which is different from the first focal point. This is because the first induced voltage induced to the first induction coil 171 at 65° C. is increased so as to be higher than the first induced voltage induced to the first induction coil 171 at 25° C. and because the lens of the lens driving apparatus is moved by the AF feedback operation based on the increased first induced voltage.

The variation in the ambient temperature also has an influence on the focal length of the lens mounted to the lens driving apparatus as well as the first induced voltage Va1 of the first induction coil 171. For example, when the ambient temperature rises, the lens mounted to the lens driving apparatus may be expanded or contracted, and accordingly the focal length of the lens may be increased or decreased. The expansion or contraction of the lens may be determined according to the kind of lens.

The AF feedback operation is compensated for in consideration of variation in the first and second induced voltages and/or variation in the focal length of the lens, which is caused by variation in ambient temperature. Therefore, the embodiment is capable of inhibiting the lens from being defocused due to variation in ambient temperature.

In order to compensate for an error attributable to variation in ambient temperature, it is required to detect variation in ambient temperature. It may be possible to detect variation in ambient temperature based on the first voltage V1 of the first induction coil 171 and the second voltage of the second induction coil 172.

The second drive current Id2 may be applied to the second induction coil 172, and a voltage may be generated at the second induction coil 172 due to a voltage drop. The voltage Vb generated by the voltage drop caused by the second drive current Id2 is influenced by variation in ambient temperature.

The material of the first and second induction coils 171 and 172 may be a metal the resistance value of which varies according to variation in temperature, e.g. copper (Cu). For example, the temperature coefficient of resistance of copper (Cu) may be 0.00394 Ω/° C. Therefore, as the ambient temperature rises, the resistance value of the second induction coil 172 may increase, and the voltage Vb generated by the voltage drop caused by the second drive current Id2 may increase. Conversely, as the ambient temperature drops, the voltage Vb generated by the voltage drop caused by the second drive current Id2 may decrease.

Because the induced voltages generated by mutual induction of the first induction coil 171 and the second induction coil 172 are identically influenced by variation in ambient temperature, the difference between the first induced voltage Va1 and the second induced voltage Va2 may be constant in spite of variation in ambient temperature. For example, in the case in which the number of windings of the first coil and the number of windings of the second coil are the same as each other, variation in the first induced voltage Va1 and variation in the second induced voltage Va2, which are caused by variation in ambient temperature, may be the same as each other.

The voltage Vb generated by the voltage drop of the second induction coil 172 is also changed by being influenced by variation in ambient temperature.

In conclusion, variation in the difference between the first voltage V1 and the second voltage V2 may be variation in Vb attributable to variation in ambient temperature, and the AF feedback operation may be compensated for based on the variation in the difference between the first voltage V1 and the second voltage V2 (e.g. the variation in Vb).

The lens driving apparatus 100 shown in FIG. 1 may further include a capacitor, which is connected in parallel to the second coil 170 in order to remove PWM noise.

Figure 12:
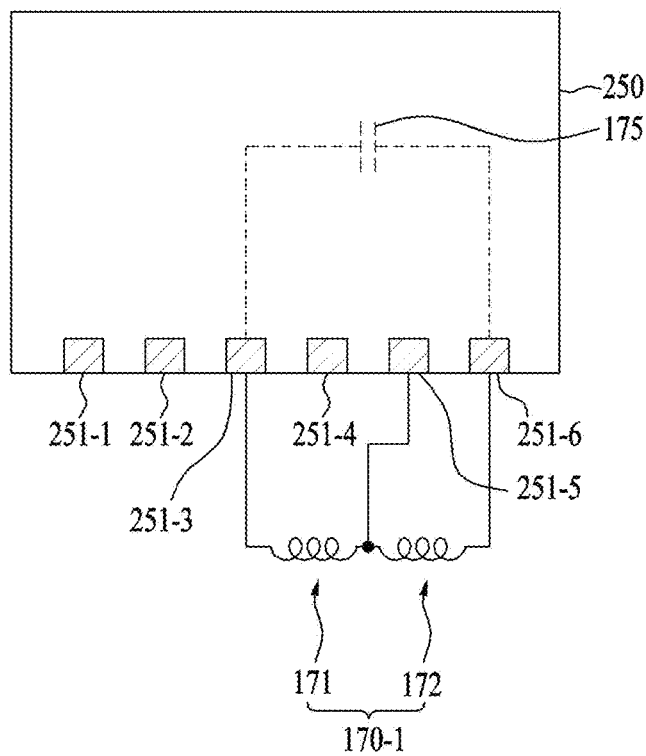
FIG. 12 illustrates a capacitor for removing PWM noise.

FIG. 12 illustrates a capacitor 175 for removing PWM noise.

Referring to FIG. 12, the second coil 170 may be connected to the terminals (e.g. 251-3 to 251-6) of the circuit board 250. For example, one end 22a of the first induction coil 171 may be connected to the third terminal 251-3 of the circuit board 250, one end 22b of the second induction coil 172 may be connected to the sixth terminal 251-6 of the circuit board 250, and the intermediate tap 22c may be connected to the fifth terminal 251-5 of the circuit board 250.

One end of the capacitor 175 may be connected to the third terminal 251-3 of the circuit board 250, and the opposite end of the capacitor 175 may be connected to the sixth terminal 251-6 of the circuit board 250. The capacitor 175 may be connected in parallel to the first induction coil 171 and the second induction coil 172, which are connected in series to each other.

In another embodiment, instead of the capacitor 175, there may be provided a first capacitor connected to a point between the fifth terminal 251-5 and the third terminal 251-3 and a second capacitor connected to a point between the fifth terminal 251-5 and the sixth terminal 261-6.

FIG. 12 illustrates the embodiment shown in FIG. 10a. The configuration shown in FIG. 12 may be identically applied to the embodiments shown in FIGS. 10b and 10c.

Figure 13A:
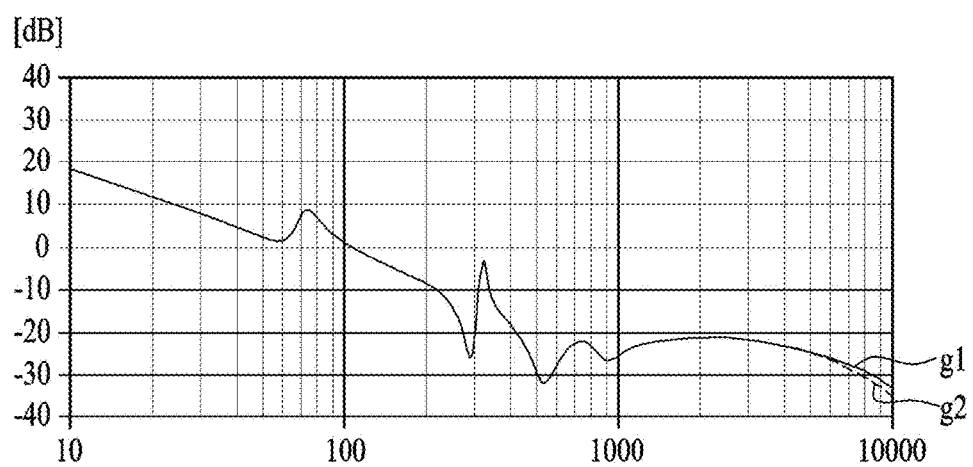
FIG. 13a illustrates frequency response characteristics with respect to a gain of output of the second coil according to the presence of the capacitor.
Figure 13B:
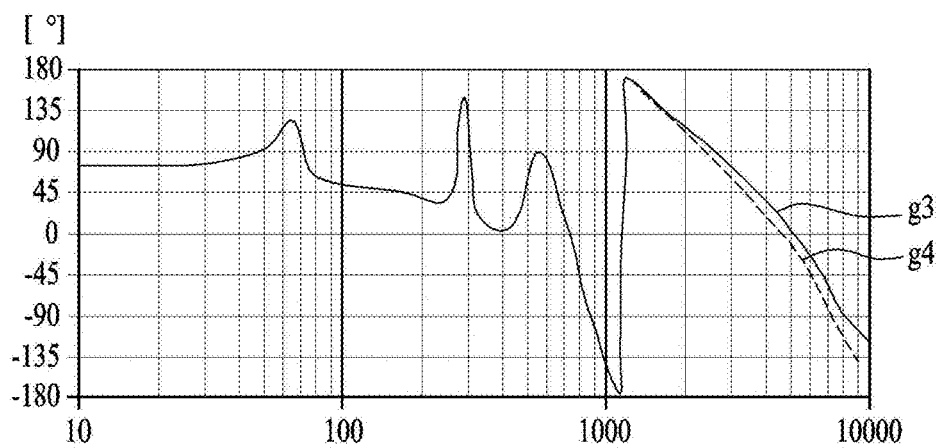
FIG. 13b illustrates frequency response characteristics with respect to a phase of the output of the second coil according to the presence of the capacitor.

FIG. 13a illustrates the frequency response characteristics with respect to the gain of output of the second coil 170 according to the presence of the capacitor 175, and FIG. 13b illustrates the frequency response characteristics with respect to the phase of the output of the second coil 170 according to the presence of the capacitor 175.

Referring to FIGS. 13a and 13b, through the addition of the capacitor 175, PWM noise may be removed, and the gain in the frequency range of 1 kHz or higher within an audible frequency may be reduced.

Figure 14:
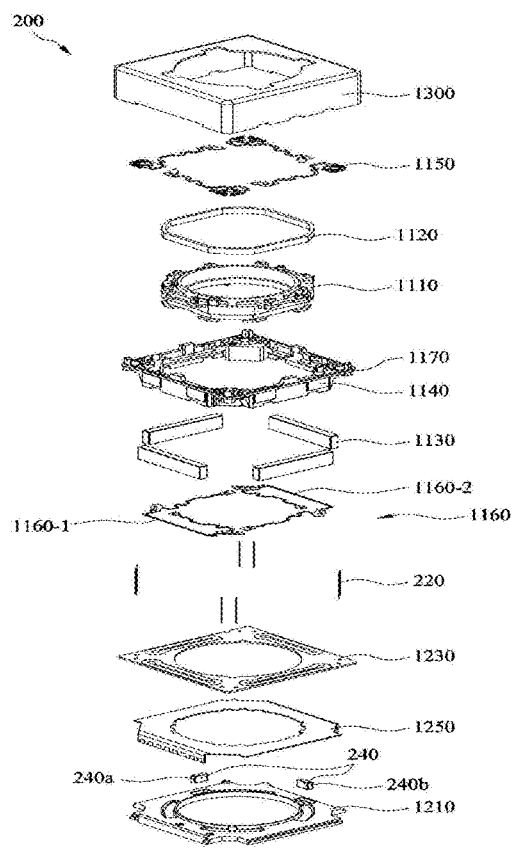
FIG. 14 illustrates an exploded perspective view of a lens driving apparatus according to another embodiment.
Figure 15:
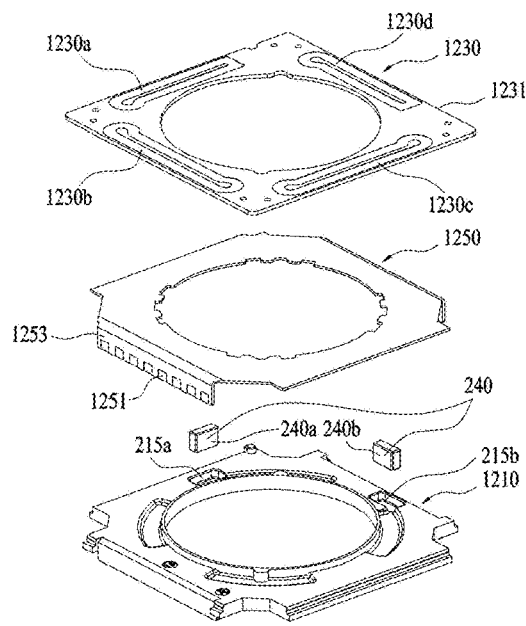
FIG. 15 illustrates an exploded perspective view of a base, a circuit board, and a third coil shown in FIG. 14.
Figure 16:
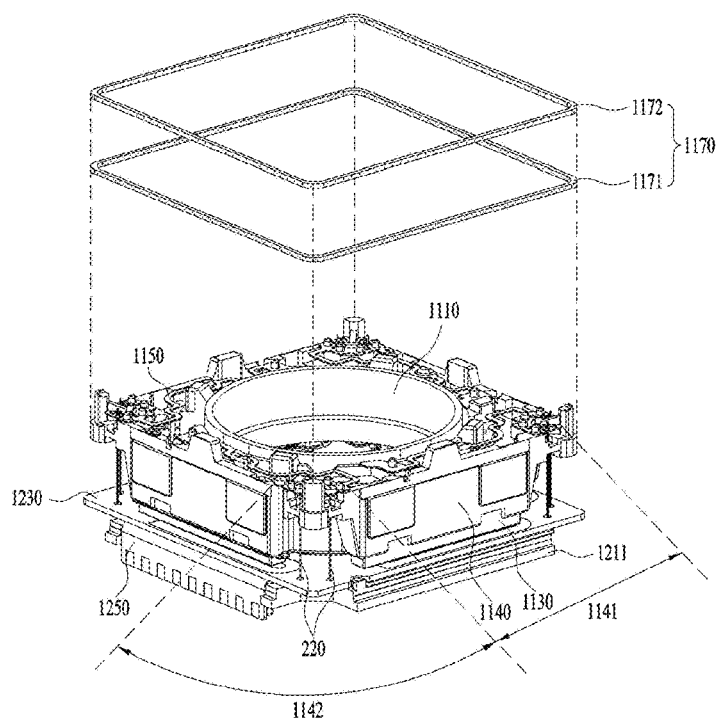
FIG. 16 is an assembled perspective view of the lens driving apparatus of FIG. 14, from which a cover member is removed.
Figure 17:
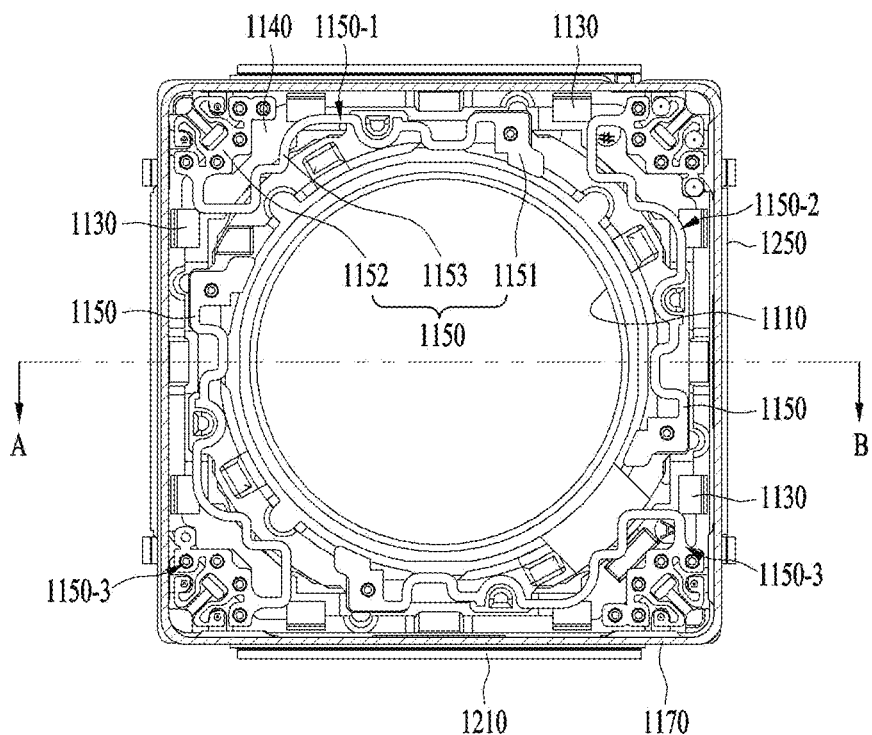
FIG. 17 is a plan view of FIG. 16.
Figure 18:
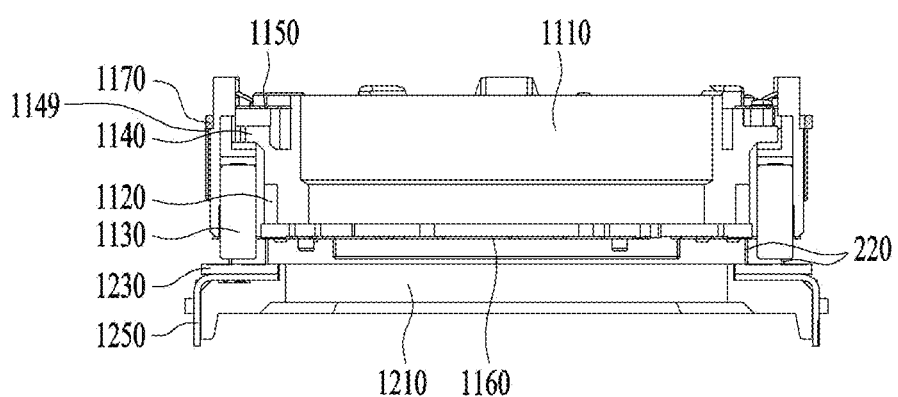
FIG. 18 illustrates a sectional view of FIG. 17 when viewed in AB direction.
Figure 19:
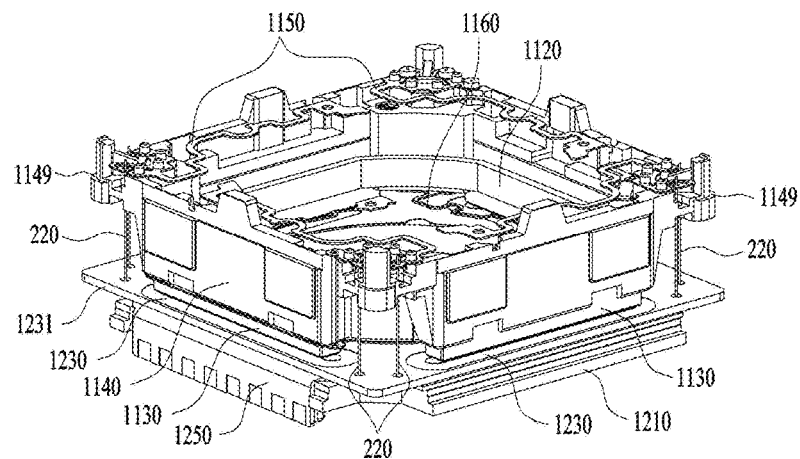
FIG. 19 is a perspective view of the lens driving apparatus of FIG. 16, from which a bobbin and a third coil are removed.

FIG. 14 is an exploded perspective view of a lens driving apparatus 200 according to another embodiment, FIG. 15 is an exploded perspective view of a base 1210, a circuit board 1250 and a third coil 1130 shown in FIG. 14, FIG. 16 is an assembled perspective view of the lens driving apparatus 200 shown in FIG. 14, from which a cover member 1300 is removed, FIG. 17 is a plan view of FIG. 16, FIG. 18 is a sectional view of FIG. 17 when viewed in the AB direction, and FIG. 19 is a perspective view of the lens driving apparatus shown in FIG. 16, from which a bobbin 1110 and a second coil 1170 are removed.

Referring to FIGS. 14 to 19, the lens driving apparatus 200 includes a bobbin 1110, a first coil 1120, a magnet 1130, a housing 1140, an upper elastic member 1150, a lower elastic member 1160, a second coil 1170, a support member 220, a third coil 1230, a circuit board 1250, and first and second position sensors 240a and 240b. The lens driving apparatus 200 may further include a cover member 1300 and a base 1210.

The description of the cover member 300 shown in FIG. 1 may be identically applied to the cover member 1300.

The bobbin 1110 is disposed inside the housing 1140. The description of the shape of the bobbin 110, the upper support protrusions 144, the lower support protrusions and the coil-receiving recess, which are shown in FIG. 1, may be identically applied to the configuration of the bobbin 1110.

The first coil 1120 is disposed around the outer circumferential surface of the bobbin 1110. The description of the first coil 120 shown in FIG. 1 may be identically applied to the configuration, arrangement and function of the first coil 1120.

The housing 1140 may be formed in the shape of a hollow column that includes an upper end portion 1141 and a side portion 1142 connected to the lower surface of the upper end portion 1141 to support the upper end portion 1141.

The magnet 1130 may be disposed around the outer circumferential surface, e.g. the side portion, of the housing 1140. The description of the stopper, the upper frame support protrusions and the lower frame support protrusions of the housing 140 shown in FIG. 1 may be identically applied to the housing 1140.

The housing 1140 may have through-holes formed in the corners of an upper end portion 1141 thereof, through which the elastic support members 220 are inserted.

The housing 1140 may be provided in the upper end portion 1141 thereof with a seat portion 1149, in which the second coil 1170 is disposed. For example, the seat portion 1149 may be formed such that the outer circumferential surface of the upper end portion 1141 of the housing 1140 is depressed.

The second coil 1170 seated on the seat portion 1149 may be spaced apart from the upper elastic member 1150 disposed on the upper surface of the upper end portion 1141. The reason for this is to inhibit the remaining parts of the upper elastic member, except for the divided parts of the upper elastic member that are connected to the second coil 1170, from being electrically connected to the second coil 1170.

For example, the second coil 1170 may be generally formed in the shape of a closed loop when viewed in the first direction so as to surround the outer circumferential surface of the upper end portion of the housing 1140. Therefore, the seat portion 1149 may be formed in a shape corresponding to or coinciding with the shape of the second coil 1170 so as to surround the upper portion of the housing 1140.

The second coil 1170 may be fixed or coupled to the seat portion 1149 of the housing 1140 using epoxy, a thermosetting adhesive, or a photo-curable adhesive.

In order to increase electromotive force generated by mutual induction between the first coil 1120 and the second coil 1170, the first coil 1120 and the second coil 1170 may be arranged such that the winding direction of the first coil 1120 and the winding direction of the second coil 1170 are parallel to each other.

That is, both the first coil 1120 and the second coil 1170 may be wound about the optical axis, for example, in the clockwise direction or in the counterclockwise direction.

The description of the seat portion 149 of the housing 140 shown in FIG. 3 may be identically applied to the seat portion 1149 of the housing 1140.

The magnet 1130 may be disposed in the housing 1140. The description of the magnet 130 shown in FIG. 1 may be identically applied to the configuration, arrangement and function of the magnet 1130.

The upper elastic member 1150 and the lower elastic member 1160 may be coupled to the bobbin 1110 and the housing 1140, and may flexibly support the bobbin 1110.

The upper elastic member 1150 may be divided into a plurality of parts. For example, the upper elastic member 1150 may include first to fourth elastic members 1150-1 to 1150-4, which are separated from each other.

Each of the first to fourth upper elastic members 1150-1 to 1150-4 may include an inner frame 1151 coupled to the bobbin 1110, an outer frame 1152 coupled to the housing 1140, and a connection portion 1153 for connecting the inner frame 1151 and the outer frame 1152 to each other.

Alternatively, in another embodiment, the outer frame 1152 of at least one of the first to fourth upper elastic members 1150-1 to 1150-4 may be divided into two or more parts, and the second coil 1170 may be electrically connected to at least one of the divided outer frames. At least one of the divided outer frames may be provided with a separate soldering portion, to which the second coil 1170 is bonded.

The lower elastic member 1160 may be divided into a plurality of parts. For example, the lower elastic member 1160 may include a first lower elastic member 1160-1 and a second lower elastic member 1160-2, which are separated from each other.

Like the upper elastic member 150 shown in FIG. 1, each of the upper elastic member 1150 and the lower elastic member 1160 may include a plurality of inner connection portions and a plurality of outer connection portions.

The first coil 1120 may be electrically connected to two of the inner connection portions of the upper and lower elastic members 1150 and 1160, and the second coil 1170 may be electrically connected to at least three other inner connection portions.

The outer connection portions of the upper and lower elastic members 1150 and 1160 may be electrically connected to the circuit board 1250 through the support member 220.

Through the support member 220 and the upper and lower elastic members 1150 and 1160, a first drive signal may be supplied from the circuit board 1250 to the first coil 1120, a second drive signal may be supplied from the circuit board 1250 to the second coil 1170, and the output of the second coil 1170 may be transmitted to the circuit board 1250. Here, the first drive signal may be the same as the first drive signal that is applied to the first coil 120, which was described with reference to FIG. 1, and the second drive signal may be the same as the second drive signal that is applied to the second induction coil 172. The output of the second coil 1170 may be the output V1 of the first induction coil 171 and the output V2 of the second induction coil, which are shown in FIG. 1.

The description of the upper and lower elastic members 150 and 160 shown in FIG. 1 may be identically applied to the upper elastic member 1150 and the lower elastic member 1160, which are shown in FIG. 14. However, as described above, the upper elastic member 1150 shown in FIG. 14 may be electrically connected to the support member 220.

The base 1210 may be located under the bobbin 1110, and may have a support recess, which is formed in the surface thereof that faces the portion of the circuit board 1250 at which a terminal surface 1253 is formed.

In addition, the base 1210 may have a first position sensor seat recess 215a, which is depressed from the upper surface thereof and in which a first position sensor 240a is disposed, and a second position sensor seat recess 215b, which is depressed from the upper surface thereof and in which a second position sensor 240b is disposed. For example, an imaginary line connecting the first position sensor seat recess 215a and the center of the base 1210 and an imaginary line connecting the second position sensor seat recess 215b and the center of the base 1210 may make an angle of 90° therebetween.

The first and second position sensors 240a and 240b may be disposed in the position sensor seat recesses 215a and 215b in the base 1210, which is located under the circuit board 1250, and may be electrically connected to the circuit board 1250.

When the housing 1140 moves in the second direction and/or in the third direction, the first and second position sensors 240a and 240b may sense variation in the magnetic force generated from the magnet 1130.

For example, each of the first and second position sensors 240a and 240b may be constituted by a Hall sensor alone or by a driver including a Hall sensor, which, however, is illustrative. Any sensor capable of sensing a position, in addition to the magnetic force, may be used. The first and second position sensors 240a and 240b may be sensors for optical image stabilizer (OIS).

The third coil 1230 may be disposed on the circuit board 1250, and the first and second position sensors 240a and 240b may be disposed under the circuit board 1250.

The circuit board 1250 may be disposed on the upper surface of the base 1210 and may have therein a hollow, which corresponds to the hollow in the bobbin 1110, the hollow in the housing 1140, and/or the hollow in the base 1210.

The circuit board 1250 may have at least one terminal surface 1250a, which is bent and extends from the upper surface thereof, and which is electrically connected to the support member 220, and at which a plurality of terminals or pins for receiving electrical signals from the outside or supplying electrical signals to the outside is formed.

The circuit board 1250 may be a flexible printed circuit board (FPCB). However, the disclosure is not limited thereto. The circuit board 1250 may be a PCB, or the terminals of the circuit board 1250 may be directly formed on the surface of the base 1210 through a process of forming a surface electrode.

As described above with reference to FIG. 12, the lens driving apparatus 200 may further include a capacitor, which is connected in parallel to two terminals of the circuit board 1250, which is electrically connected to the second coil 1170. Alternatively, the lens driving apparatus 200 may further include a first capacitor connected to a point between one end of the second coil 1170 and an intermediate tap and a second capacitor connected to a point between the opposite end of the second coil and the intermediate tap.

The third coil 1230 is disposed on the upper surface of the circuit board 1250 so as to correspond to or be aligned with the magnet 130. The number of third coils 1230 may be one or more, or may be the same as the number of magnets 1130. However, the disclosure is not limited thereto.

The third coil 1230 may be embodied by forming a coil on an additional board 231, which is provided separately from the circuit board 1250. However, the disclosure is not limited thereto. The third coil 1230 may be disposed on the circuit board 1250 while being spaced apart therefrom, without an additional board.

Although it is illustrated in FIG. 15 that four third coils 1230a to 1230d are disposed on the circuit board 1250, the number of third coils is not limited thereto.

As described above, the third coil 1230 may be electrically connected to the circuit board 1250. A drive signal, e.g. drive current, may be supplied to the third coil 1230. The housing 1140 may be moved in the second direction and/or in the third direction, e.g. in the x-axis direction and/or in the y-axis direction, by the electromagnetic force generated by the interaction between the magnet 1130 and the third coil 1230, which are arranged so as to face each other or to be aligned with each other. Hand tremor compensation may be performed by controlling the movement of the housing 1140.

The support member 220 may be coupled at the upper end thereof to the upper elastic member 1150, may be coupled at the lower end thereof to the base 1210, the board 231 or the circuit board 1250, and may support the bobbin 1110 and the housing 1140 so that the bobbin 1110 and the housing 1140 are movable in a direction perpendicular to the first direction.

The support member 220 may be provided in a plural number, and each of the support members may be disposed on the outer surfaces of the corners of the housing.

Each of the support members 220 may be formed separately from the upper elastic member 1150, and may be embodied by an elastic support member such as, for example, a leaf spring, a coil spring, or a suspension wire. Alternatively, in another embodiment, the support members 220 may be integrally formed with the upper elastic member 1150.

Referring to FIG. 14, like the second coil 170 shown in FIG. 1, when the bobbin 1110 moves in the first direction, the second coil 1170 serves to sense the displacement of the movable unit, e.g. the bobbin 1110.

As shown in FIGS. 16 to 18, the housing 1140 may have a polygonal shape when viewed in the first direction, and the second coil 1170 may be disposed so as to surround the outer surface of the upper end portion 1141 of the housing 140.

In the embodiment, the side portion of the housing 1140 may include four side surfaces, which are arranged in a quadrangular shape when viewed from above. However, the disclosure is not limited thereto. The side surfaces of the housing may be arranged in a polygonal shape.

Alternatively, in another embodiment, the second coil 1170 may be disposed on the inner surface of the cover member 300.

The reason for disposing the second coil 1170 on the outer surface of the upper end portion of the housing 1140 is to increase the distance from the third coil 1230 to the second coil 1170 in the first direction and consequently to minimize the influence of the third coil 1230 on the output of the second coil 1170.

The drive signal that is applied to the second coil 1230 may be an alternating-current signal. When the drive signal is applied to the third coil 1230, an electromagnetic wave or electromagnetic field may be generated from the third coil 1230. This electromagnetic wave or electromagnetic field may make the second coil 1170 generate electromotive force, current and voltage due to mutual induction action.

Because the electromotive force induced to the second coil 1170 by the third coil 1230 has an influence on the output of the second coil 1170, it may be difficult for the second coil 1170 to sense the position of the bobbin 1110 accurately.

The second coil 1170 may include a first induction coil 1171 and a second induction coil 1172. The description of the arrangement, function and operation of the first and second induction coils 171 and 172, the sensing of displacement of the movable unit, and the temperature compensation, which was made with reference to FIGS. 7 to 12, may be identically applied to the first and second induction coils 1171 and 1172 of the second coil 1170.

Therefore, since it is possible to sense the displacement of the bobbin 1110 using the second coil 1170, at which electromotive force is generated by mutual induction, without using a separate AF position sensor, the embodiment is capable of simplifying the configuration of the lens driving apparatus and of reducing manufacturing costs.

Figure 20:
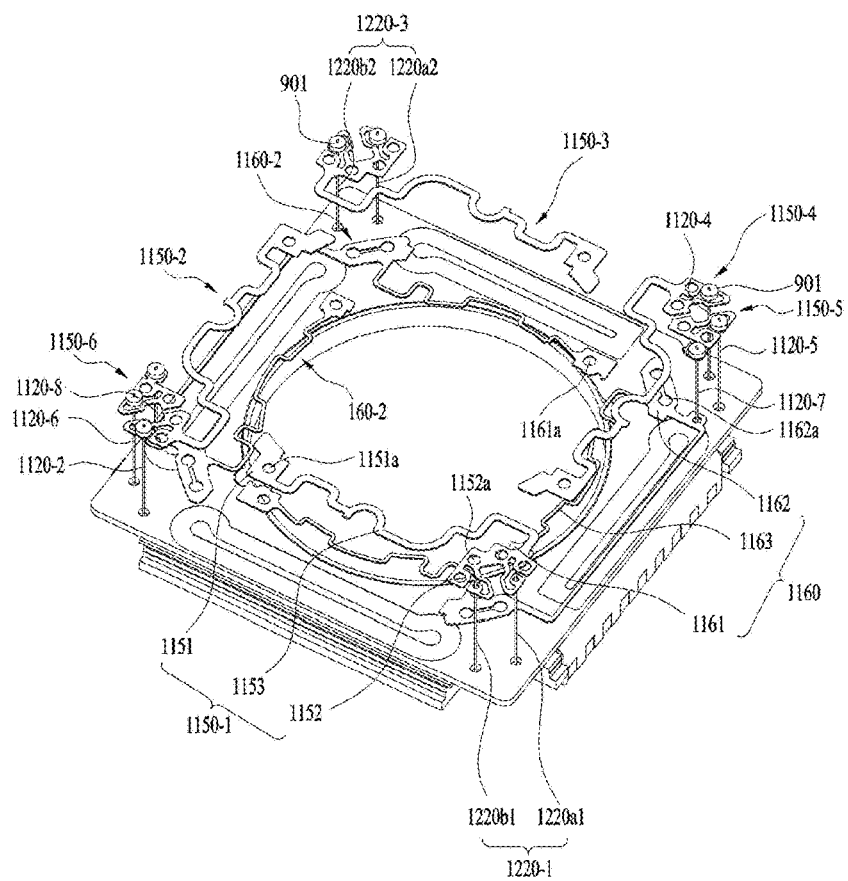
FIG. 20 illustrates an upper elastic member, a lower elastic member, and a support member according to another embodiment.

FIG. 20 illustrates an upper elastic member, a lower elastic member, and a support member according to another embodiment.

Referring to FIG. 20, the upper elastic member may include a plurality of divided upper elastic members 1150-1 to 1150-6. For example, the upper elastic member may include first to sixth upper elastic members 1150-1 to 1150-6, which are spaced apart from each other.

Each of the first to fourth upper elastic members 1150-1 to 1150-4 may include a first inner frame 1151 coupled to the bobbin 1110, a first outer frame 1152 coupled to the housing 1140, and a first connection portion 1153 for connecting the first inner frame 1151 and the first outer frame 1152 to each other.

For example, a through-hole 1151*a* in the first inner frame 1151 and a coupling protrusion of the bobbin 1110 may be coupled to each other and a through-hole 1152*a* in the first outer frame 1152 and an upper support protrusion of the housing 1140 may be coupled to each other by thermal fusion or using an adhesive member such as epoxy.

Each of the fifth and sixth upper elastic members 1150-5 and 1150-6 may not be coupled to the bobbin 1110 but may be coupled only to the housing 1140. However, the disclosure is not limited thereto. In another embodiment, the fifth and sixth upper elastic members may be coupled to both the bobbin and the housing.

The lower elastic member shown in FIG. 20 may include a plurality of divided lower elastic members.

For example, the lower elastic member may include a first lower elastic member 1160-1 and a second lower elastic member 1160-2, which are spaced apart from each other.

Each of the first and second lower elastic members 1160-1 and 1160-2 may include a second inner frame 1161 coupled to the bobbin 1110, a second outer frame 1162 coupled to the housing 1140, and a second connection portion 1163 for connecting the second inner frame 1161 and the second outer frame 1162 to each other.

The first coil 1120 may be connected to two of the first and second inner frames of the upper and lower elastic members.

For example, the two opposite ends of the first coil 120 may be connected or bonded to the second inner frames of the first and second lower elastic members 1160-1 and 1160-2 by soldering or using a conductive adhesive member.

The first induction coil 1171 may be connected to two other first and second inner frames of the upper and lower elastic members, and the second induction coil 1172 may be connected to two other first and second inner frames of the upper and lower elastic members.

For example, the first induction coil 1171 may be connected to two of the first inner frames of the first to fourth upper elastic members 1150-1 to 1150-4 by soldering or using a conductive adhesive member.

In addition, the second induction coil 1172 may be connected to two other first inner frames of the first to fourth upper elastic members 1150-1 to 1150-4 by soldering or using a conductive adhesive member.

For example, the first induction coil 1171 may be connected or bonded to the first and second upper elastic members 1150-1 and 1150-2, and the second induction coil 1172 may be connected or bonded to the third and fourth upper elastic members 1150-3 and 1150-4.

The support member shown in FIG. 20 may be provided in a plural number, and each of the support members 1220-1 to 1220-8 may be disposed at second side portions 1141 of the housing 1140.

Referring to FIG. 20, in order to arrange the support members symmetrically, the first support member 1220-1 includes two wires 1220*a*1 and 1220*b*1, and the third support member 1220-3 includes two wires 1220*a*2 and 1220*b*2. However, the disclosure is not limited thereto. The support members may be arranged symmetrically in various other shapes. This is for enabling the support members to support the housing in a balanced manner. At least one of the two wires 1220*a*1 and 1220*b*1 and at least one of the two wires 1220*a*2 and 1220*b*2 may be electrically connected to the circuit board.

Each of the support members 1220-1 to 1220-8 may be formed separately from the upper elastic member 1150, and may be embodied by an elastic support member such as, for example, a leaf spring, a coil spring, or a suspension wire. Alternatively, in another embodiment, the support members 1220 may be integrally formed with the upper elastic member 1150.

For example, each of the first to sixth support members 1220-1 to 1220-6 may electrically connect a corresponding one of the first to sixth elastic members 1150-1 to 1150-6 to the circuit board 1250.

The seventh support member 1220-7 may connect the fifth upper elastic member 1150-5 and the first lower elastic member 1160-1 to each other, and the eighth support member 1220-8 may connect the sixth upper elastic member 1150-6 and the second lower elastic member 1160-2 to each other.

For example, the first coil 1120, which is connected to the first and second lower elastic members 1160-1 and 1160-2, may be electrically connected to the circuit board 1250 by the seventh and eighth support members 1220-7 and 1220-8 and the fifth and sixth upper elastic members 1150-5 and 1150-6.

The first induction coil 1171, which is connected to the first and second upper elastic members 1150-1 and 1150-2, may be electrically connected to the circuit board 1250 by the first and second support members 1220-1 and 1220-2.

The second induction coil 1172, which is connected to the third and fourth upper elastic members 1150-3 and 1150-4, may be electrically connected to the circuit board 1250 by the third and fourth support members 1220-3 and 1220-4.

In order to absorb and alleviate the vibration of the bobbin 1110, the lens driving apparatus 200 may further include a first damping member (not shown), which is disposed between each of the upper elastic members 1150-1 to 1150-6 and the housing 1140.

For example, the lens driving apparatus 200 may further include a first damping member (not shown), which is disposed in the space between the first connection portion 1153 of each of the upper elastic members 1150-1 to 1150-4 and the housing 1140.

In addition, for example, the lens driving apparatus 200 may further include a second damping member (not shown), which is disposed between each of the second connection portions 1163 of the lower elastic members 1160-1 and 1160-2 and the housing 1140.

In addition, for example, the lens driving apparatus 200 may further include a damping member (not shown), which is disposed between the inner surface of the housing 1140 and the outer circumferential surface of the bobbin 1110.

In addition, the lens driving apparatus 200 may further include a damping member (not shown), which is disposed at a portion at which the support member 1220 and the upper elastic member 1150 are coupled or bonded to each other.

In addition, the lens driving apparatus 200 may further include a damping member (not shown), which is disposed at a portion at which the circuit board 1259 and/or the base 1210 and the support member 1220 are coupled or bonded to each other.

Figure 21A:
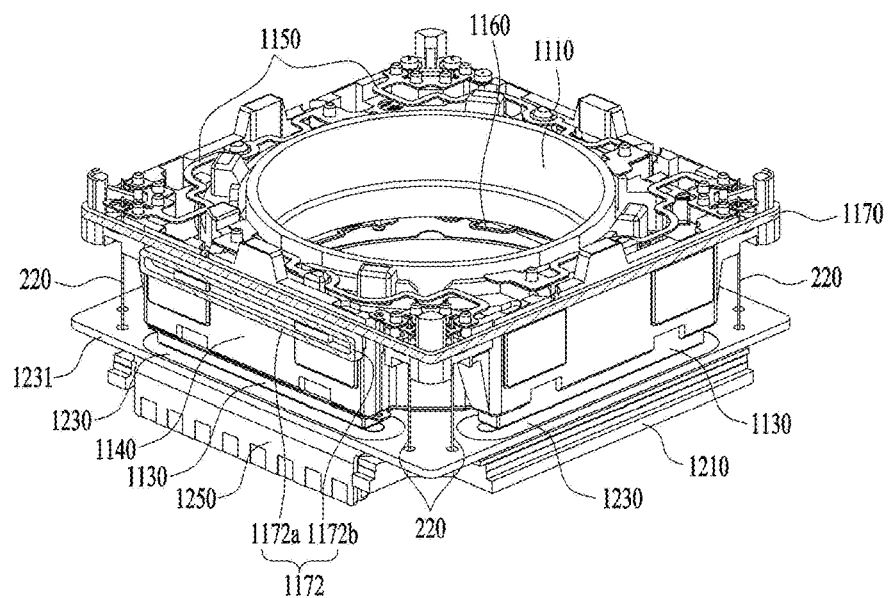
FIG. 21a illustrates arrangement of a second coil according to another embodiment.
Figure 21B:
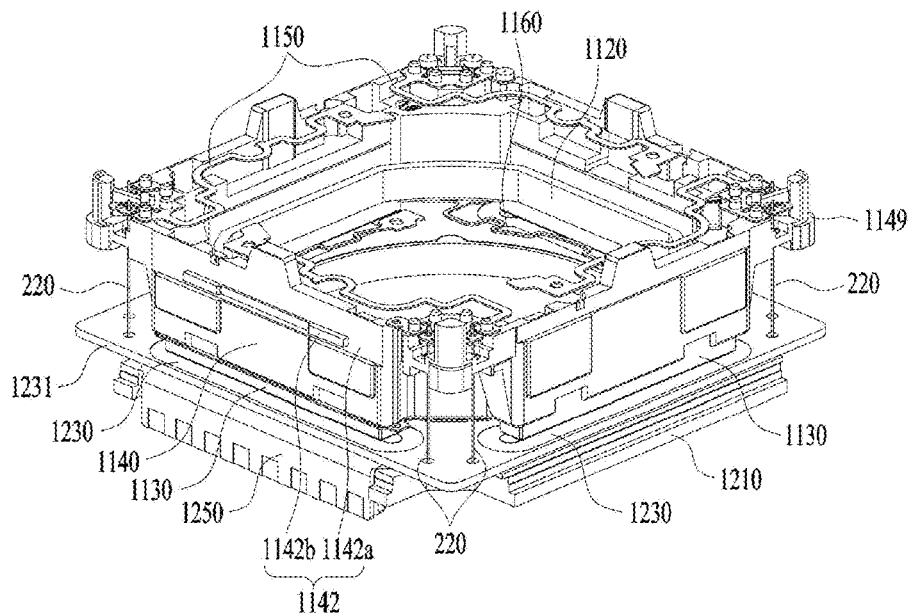
FIG. 21b illustrates a perspective view of the second coil of FIG. 21a, from which the bobbin and a first induction coil are removed.

FIG. 21*a* illustrates the arrangement of the second coil 1170 according to another embodiment, and FIG. 21*b* is a perspective view of the second coil shown in FIG. 21*a*, from which the bobbin 1110 and the first induction coil 1171 are removed.

Referring to FIGS. 21*a* and 21*b*, the first induction coil 1171 of the second coil 1170 may be disposed so as to surround the outer circumferential surface of the upper end portion of the housing 1140 so as to rotate about the optical axis in the clockwise direction or in the counterclockwise direction.

The second induction coil 1172 of the second coil 1170 may be disposed in the shape of a coil ring that is wound around one of the side portions of the housing 1140 about an axis perpendicular to the optical axis in the clockwise direction or in the counterclockwise direction.

The housing 1140 may be provided on one side portion thereof with a seat portion 1142, which includes at least one winding protrusion 1142*b* around which the second induction coil 1172 is wound.

For example, the seat portion 1142 of the housing 1140 may include a recess portion 1142*a*, which is depressed from one side portion of the housing 1140, and at least one winding protrusion 1142*b*, which protrudes from the recess portion 1142*a*.

For example, the second induction coil 1172 may be formed in the shape of a closed loop, which is disposed in the recess portion 1142*a* and which includes a straight portion 1172*a* and a curved portion 1172*b*, and may be wound around the winding protrusion 1147.

In another embodiment, the first induction coil 1171 may be disposed on the seat portion 1142 of the housing 1140, and the second induction coil 1172 may be disposed on the seat portion 1149 of the housing 1140.

In general, the equivalent circuit of the coil may include a resistance element, an inductance element, and a capacitance element. The coil generates resonance at a self-resonance frequency. In this state, current and voltage, which flow through the coil, are maximized.

In order to inhibit deterioration in the auto focusing function and the hand tremor compensation function of the lens driving apparatus, it is desirable for the first coil 1120 and the second coil 1170 to be designed to have different self-resonance frequencies from each other and for the second coil 1170 and the third coil 1230 to be designed to have different self-resonance frequencies from each other.

For example, in order to suppress the incidence of audio noise, it is desirable that the difference between the self-resonance frequency of the first coil 1120 and the self-resonance frequency of the second coil 1170 be set to 20 kHz or higher. For example, the difference between the self-resonance frequency of the first coil 1120 and the self-resonance frequency of the second coil 1170 may range from 20 kHz to 3 MHz, and the difference between the self-resonance frequency of the second coil 1170 and the self-resonance frequency of the third coil 1230 may range from 20 kHz to 3 MHz.

The self-resonance frequency of the third coil 1230 may be set to be higher than the self-resonance frequency of the first coil 1120. Further, the self-resonance frequency of the third coil 1230 may be set to be higher than the self-resonance frequency of the second coil 1170.

For example, the difference between the self-resonance frequency of the third coil 1230 and the self-resonance frequency of the first coil 1120 may be set to 50 kHz or higher.

In order to suppress the incidence of high-frequency noise attributable to the PWM operation, the first and second coils 1120 and 1170 may be driven such that the self-resonance frequency of each of the first and second coils 1120 and 1170 is 20 kHz or higher. Further, in order to reduce current consumption, the first and second coils 1120 and 1170 may be driven such that the self-resonance frequency of each of the first and second coils 1120 and 1170 is 500 kHz or higher.

Figures 22, 23:
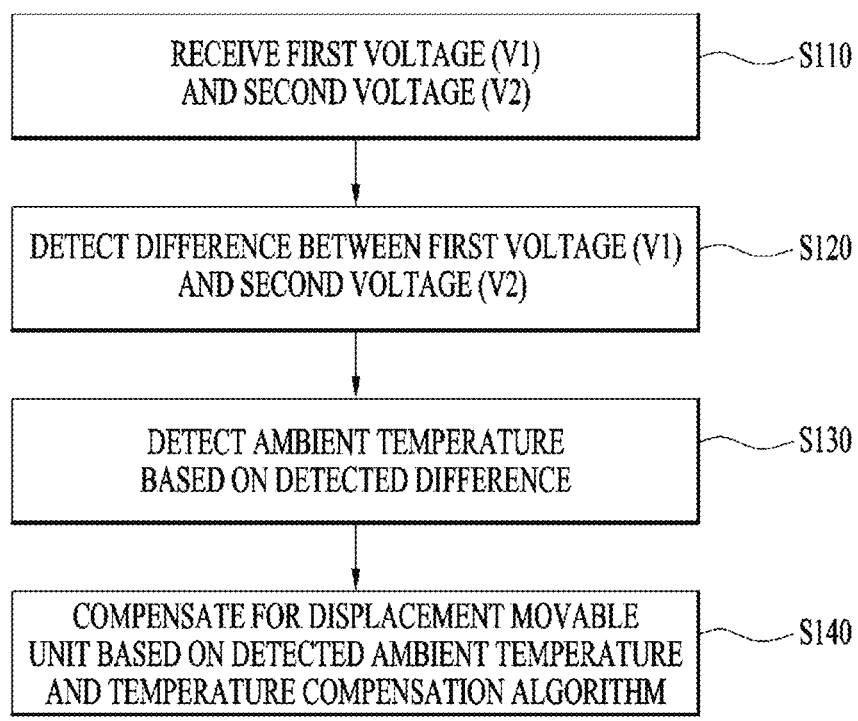
FIG. 22 shows first induced voltage of the first induction coil according to a displacement of a movable unit when ambient temperature is room temperature, and a code value corresponding to a displacement of an AF movable unit.
FIG. 23 is a flowchart showing a temperature compensation method with respect to AF feedback according to the embodiment.

FIG. 22 shows the first induced voltage Va1 of the first induction coil 171 according to the displacement of the movable unit when the ambient temperature is room temperature, and a code value corresponding to the displacement of the AF movable unit.

Referring to FIG. 22, when the ambient temperature is room temperature, the displacement (or position) of the movable unit may range from d0 to dn (n is a natural number; n>1). The code value for AF feedback control, which corresponds to the displacement (or position) of the movable unit, may be set to a value ranging from code_0 to code_n.

In addition, when the ambient temperature is room temperature, the first induced voltage V1, which is induced to the first induction coil 171 corresponding to the displacement of the movable unit, may range from P0 to Pn.

When the ambient temperature is room temperature and when the displacement is a first displacement d1, the first induced voltage (V1=Va1) of the first induction coil 171 may be P1, and the code value may be code_1.

However, if the ambient temperature rises above room temperature, the first induced voltage (V1=Va1) of the first induction coil 171 at the first displacement d1 may have a value (e.g. a value greater than P1) different from P1.

The controller 830 compensates for error in the displacement of the movable unit according to variation in ambient temperature.

FIG. 23 is a flowchart showing a temperature compensation method with respect to the AF feedback according to the embodiment.

Referring to FIG. 23, the controller 830 receives the first voltage V1 of the first induction coil 171 and the second voltage of the second induction coil 172 (S110).

The controller 830 detects the difference between the first voltage V1 and the second voltage V2 (S120).

The controller 830 detects the ambient temperature or variation in ambient temperature based on the difference between the first voltage V1 and the second voltage V2 (S130).

The controller 830 compensates for the displacement of the movable unit of FIG. 9 or the code value based on the detected temperature or the detected variation in the temperature. For example, the controller 830 may compensate for the displacement of the movable unit or the code value based on the variation in the temperature.

The variation in the temperature may be a difference between the detected temperature and the room temperature. For example, in order to compensate for the displacement of the movable unit based on the variation in the temperature, two or more reference temperature values are required, and the displacement of the movable unit may be compensated for using a regression equation based on the two or more reference temperature values.

For example, the controller 830 may control the displacement of the movable unit or the code value using the detected temperature and a temperature compensation algorithm. The temperature compensation algorithm may be designed based on the temperature coefficient of resistance of the second induction coil 172, the coefficient of thermal expansion of the lens, or a temperature function related to thermal expansion.

For example, some lenses are expanded in proportion to an increase in temperature, whereby the focal length thereof is increased, whereas some lenses are contracted in proportion to an increase in temperature, whereby the focal length thereof is deceased.

The controller 830 may compensate for the displacement of the movable unit or the code value based on variation in the focal length of the lens according to variation in ambient temperature as well as variation in the mutually-induced voltage generated by mutual induction according to variation in ambient temperature.

The output of the first induction coil 171 for sensing the displacement of the movable unit may vary according to variation in ambient temperature. The embodiment is capable of inhibiting defocusing by compensating for variation in the output of the first induction coil 171 according to variation in ambient temperature, thereby achieving accurate auto focusing.

Figure 24:
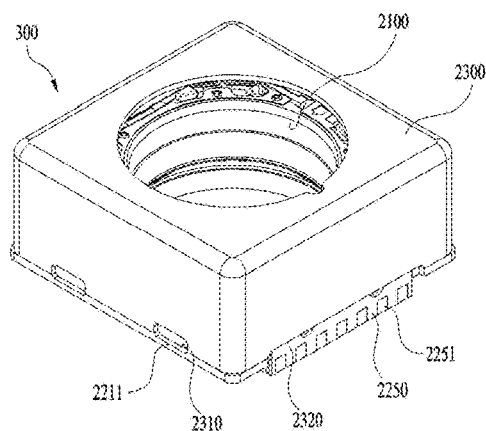
FIG. 24 is a schematic perspective view of a lens driving apparatus according to another embodiment.
Figure 25:
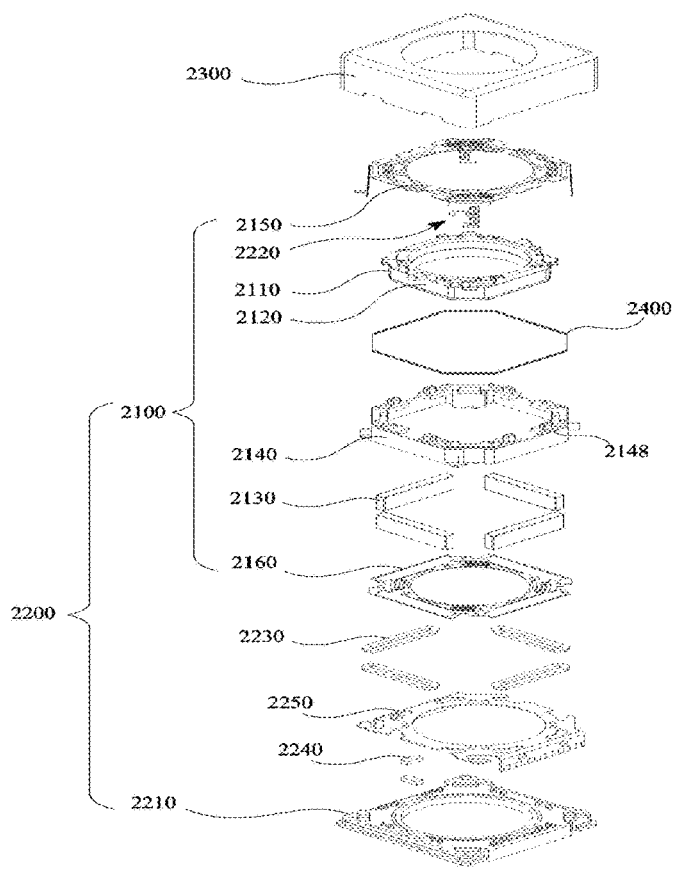
FIG. 25 is an exploded perspective view of FIG. 24.
Figure 26:
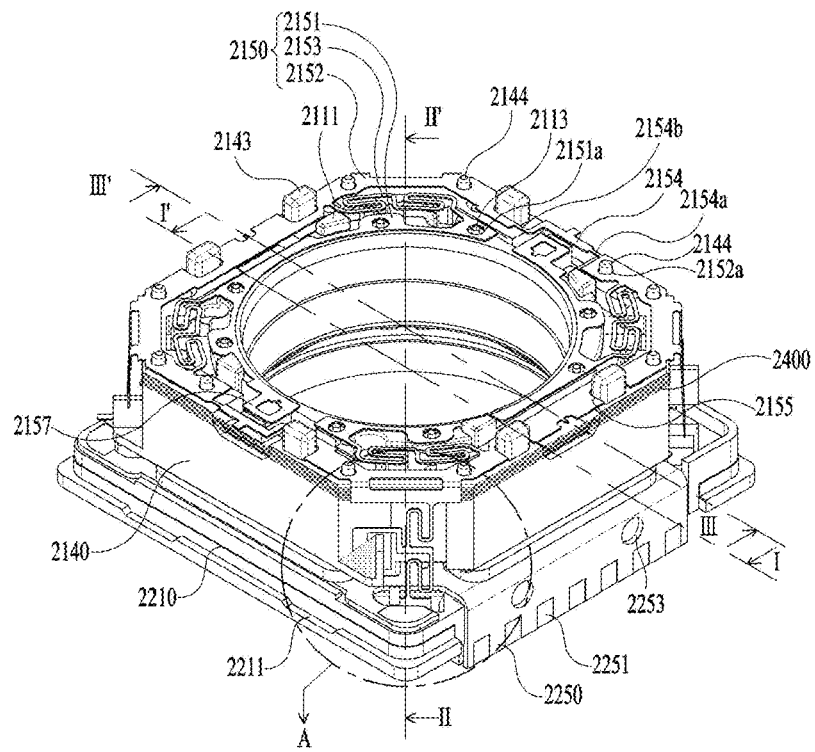
FIG. 26 is a view of the lens driving apparatus of FIG. 24, from which a cover member 2310 is removed.
Figure 27:
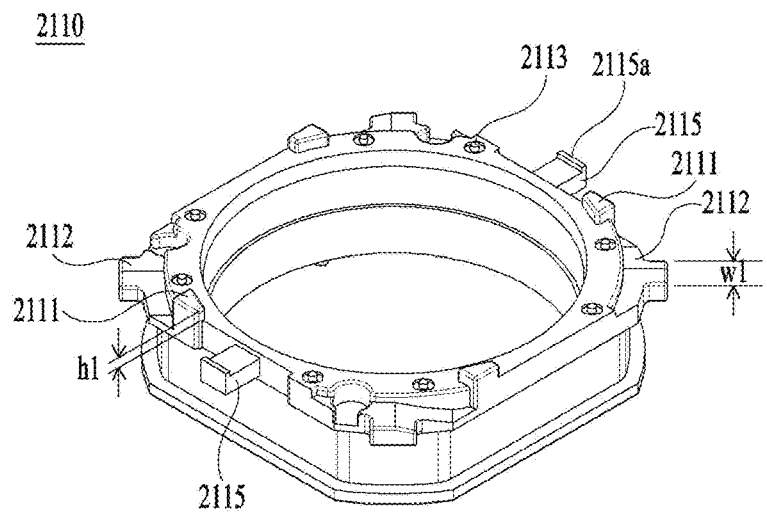
FIG. 27 is a perspective view of a bobbin shown in FIG. 25.
Figure 28:
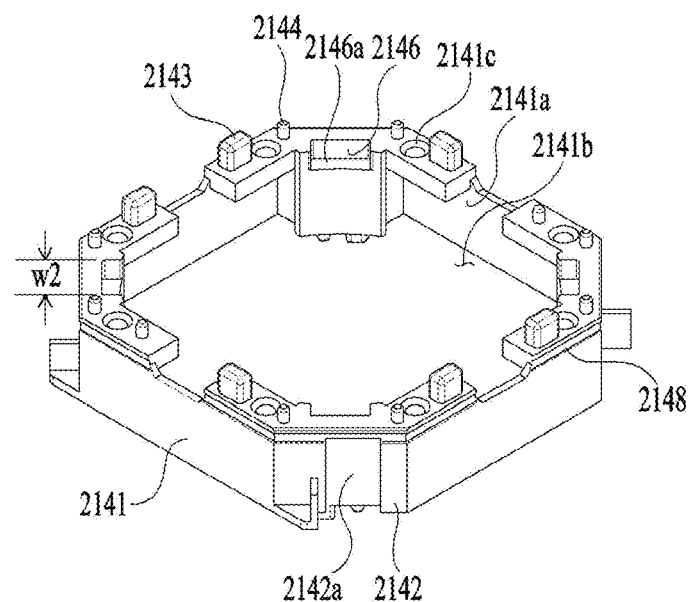
FIG. 28 is a first perspective view of a housing shown in FIG. 25.
Figure 29:
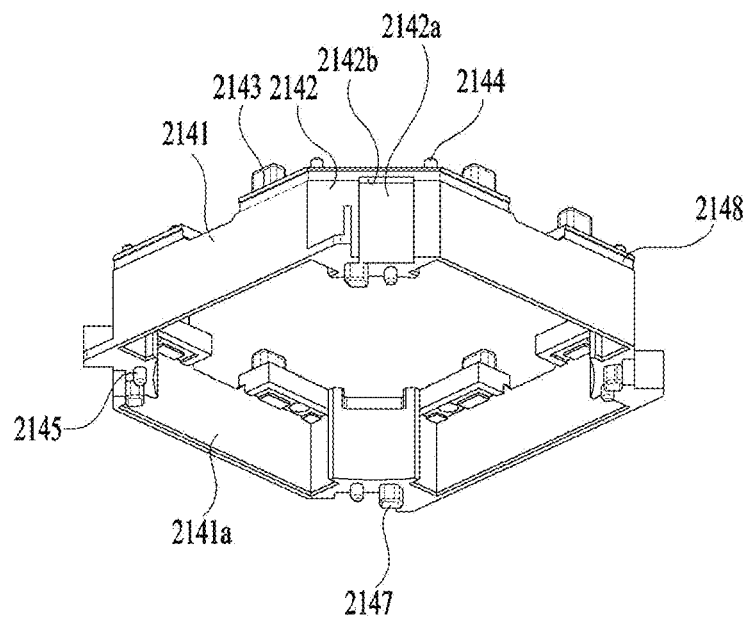
FIG. 29 is a second perspective view of the housing shown in FIG. 25.
Figure 30:
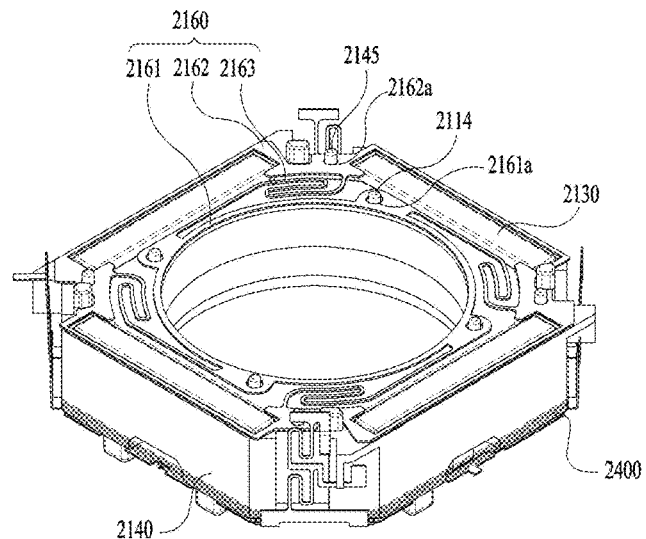
FIG. 30 is a rear perspective view of the housing to which the bobbin and a lower elastic member of FIG. 25 are coupled.
Figure 31:
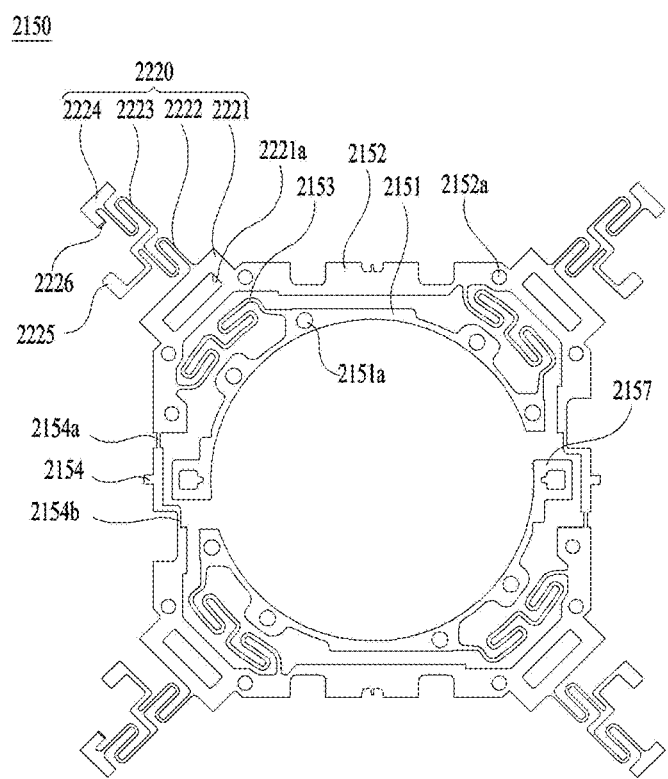
FIG. 31 is a plan view illustrating an initial state of an upper elastic member shown in FIG. 25.
Figure 32:
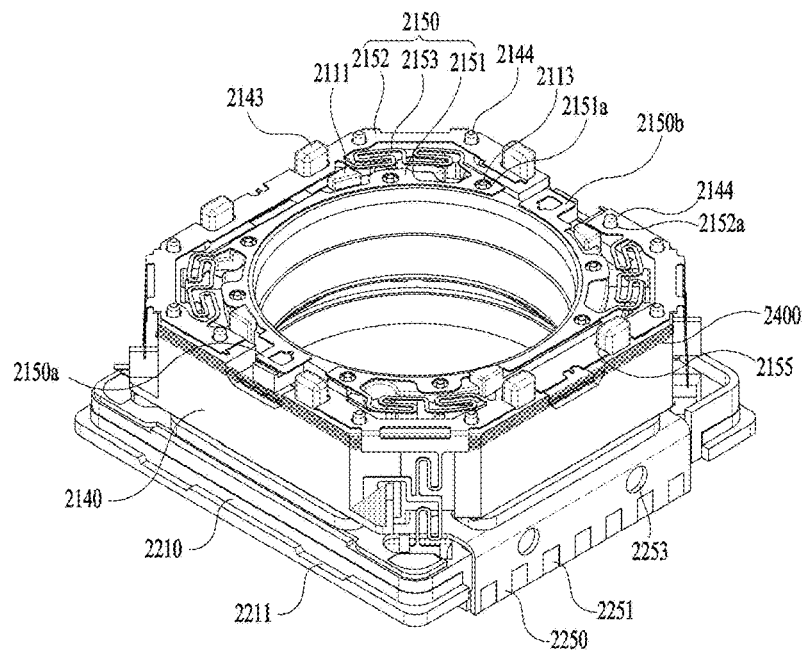
FIG. 32 is a view illustrating a state in which the upper elastic member of FIG. 25 is divided into first and second upper elastic members.
Figure 33:
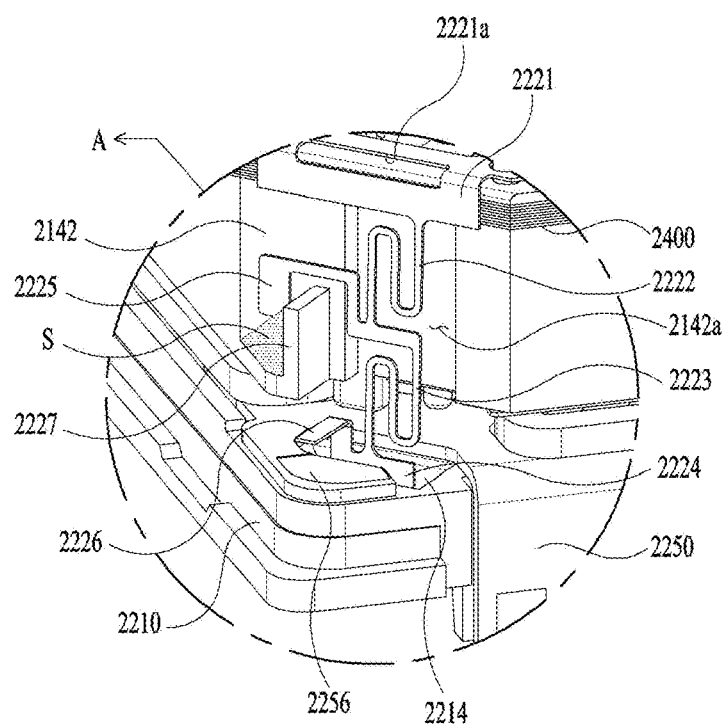
FIG. 33 is an enlarged view of portion "A" in FIG. 26.
Figure 34:
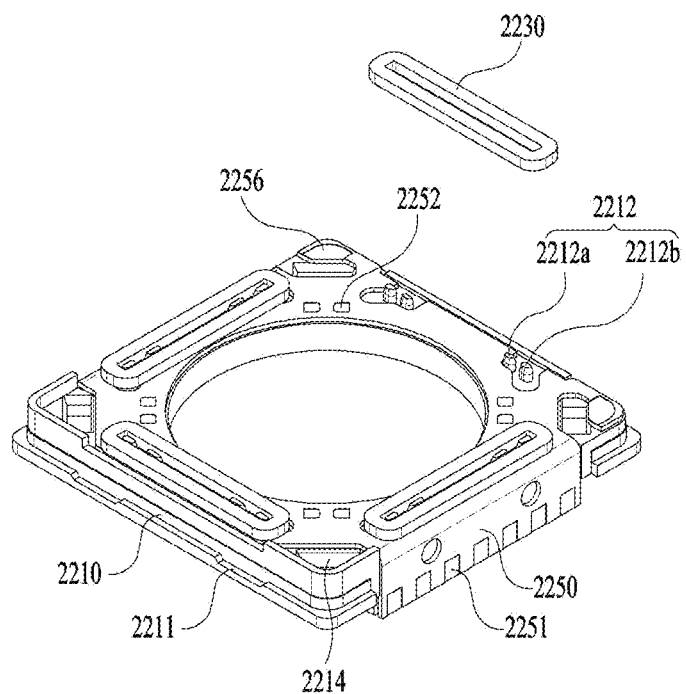
FIGS. 34 and 35 are views illustrating a base, a circuit board, and a second coil of FIG. 25.
Figure 35:
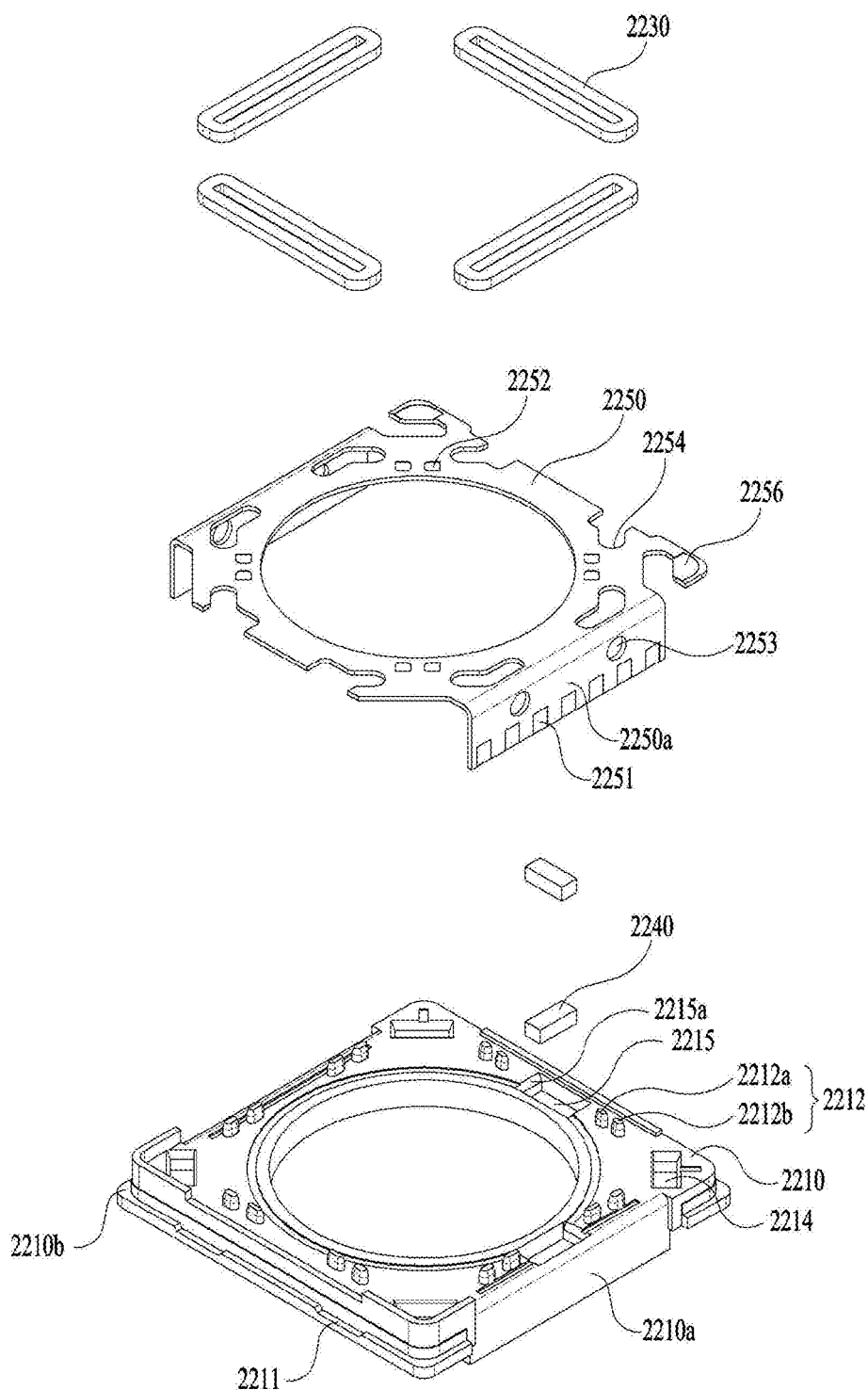
Figure 36:
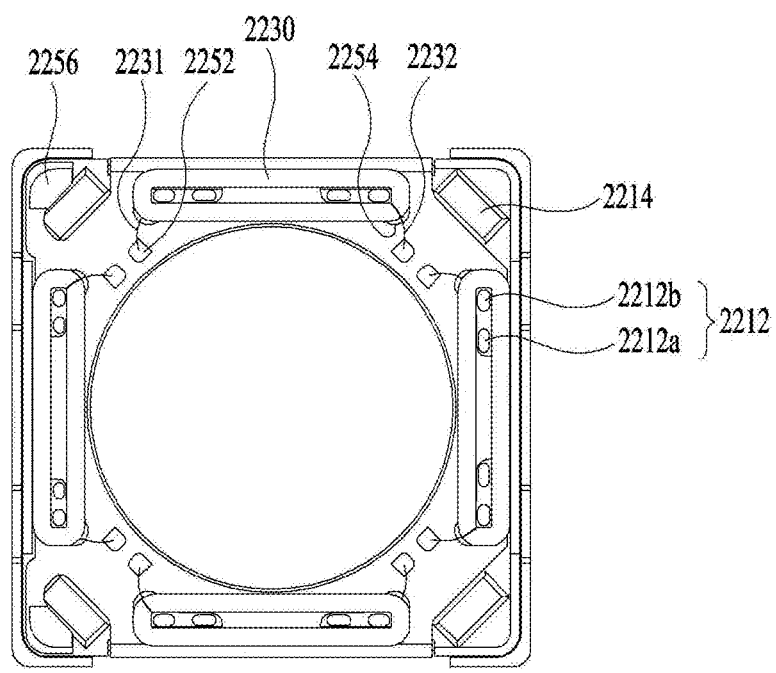
FIG. 36 is a plan view illustrating the coupling structure of the second coil coupled to the circuit board of FIG. 25.
Figure 37:
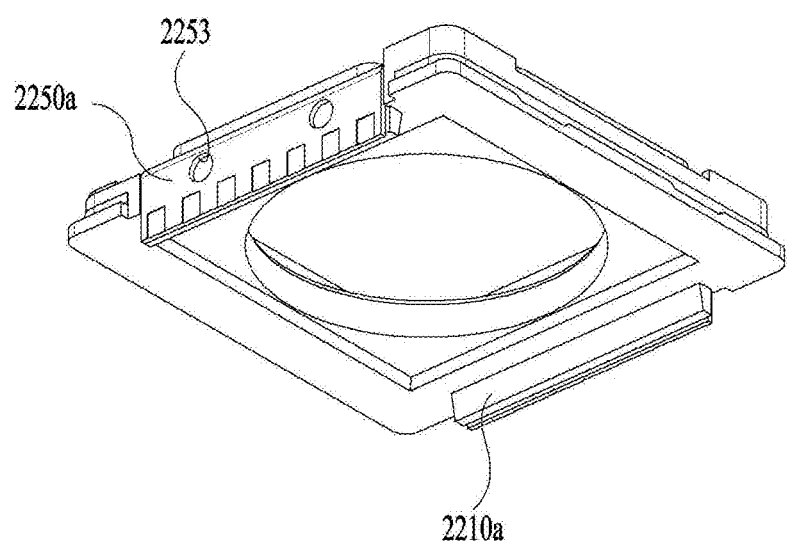
FIG. 37 is a view illustrating the bottom surface of the base of FIG. 25.
Figure 38:
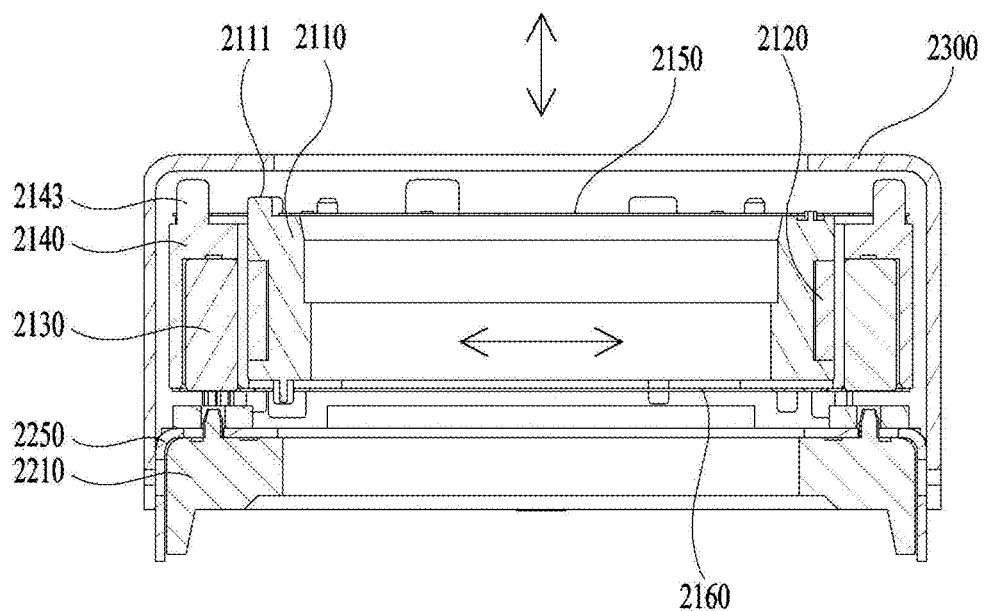
FIG. 38 is a sectional view taken along line I-I' in FIG. 26.
Figure 39:
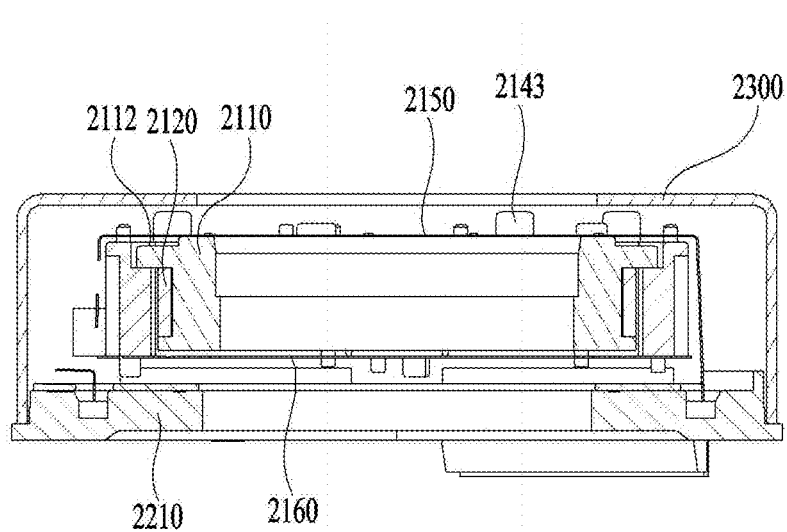
FIG. 39 is a sectional view taken along line II-II' in FIG. 26.
Figure 40:
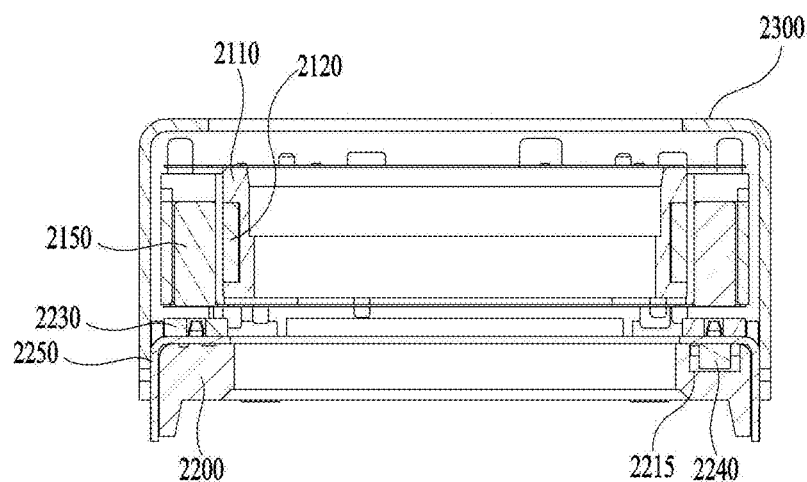
FIG. 40 is a sectional view taken along line III-III' in FIG. 26.
Figure 41:
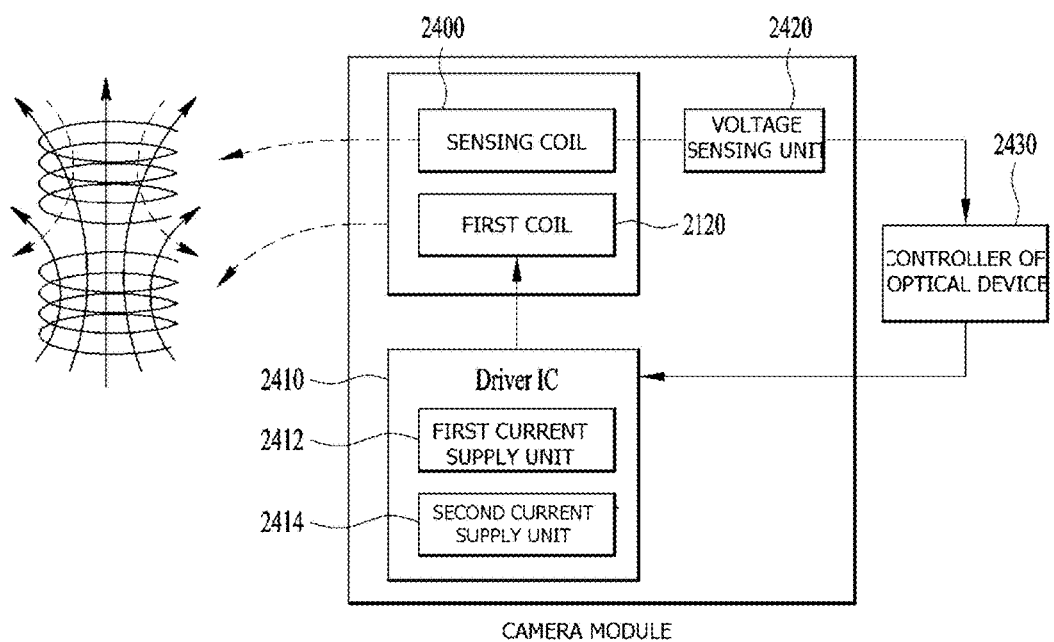
FIG. 41 is a view illustrating the constitution related to a sensing coil of FIG. 25.

FIG. 24 is a schematic perspective view of a lens driving apparatus 300 according to another embodiment, FIG. 25 is an exploded perspective view of FIG. 24, FIG. 26 is a view of the lens driving apparatus of FIG. 24, from which a cover member 2310 is removed, FIG. 27 is a perspective view of a bobbin 2110 shown in FIG. 25, FIG. 28 is a first perspective view of a housing 2140 shown in FIG. 25, FIG. 29 is a second perspective view of the housing 2140 shown in FIG. 25, FIG. 30 is a rear perspective view of the housing 2140 to which the bobbin 2110 and a lower elastic member 2150 of FIG. 25 are coupled, FIG. 31 is a plan view illustrating the initial state of an upper elastic member 2150 shown in FIG. 25, FIG. 32 is a view illustrating the state in which the upper elastic member 2150 of FIG. 25 is divided into first and second upper elastic members, FIG. 33 is an enlarged view of portion "A" in FIG. 26, FIGS. 34 and 35 are views illustrating a base 2210, a circuit board 2250 and a second coil 2230 of FIG. 25, FIG. 36 is a plan view illustrating the coupling structure of the second coil 2230 coupled to the circuit board 2250 of FIG. 25, FIG. 37 is a view illustrating the bottom surface of the base 2210 of FIG. 25, FIG. 38 is a sectional view taken along line I-I' in FIG. 26, FIG. 39 is a sectional view taken along line II-II' in FIG. 26, FIG. 40 is a sectional view taken along line III-III' in FIG. 26, and FIG. 41 is a view illustrating the constitution related to a sensing coil 2400 of FIG. 25.

As shown in FIGS. 24 and 25, the lens driving apparatus 300 according to the embodiment may include a first lens driving apparatus 2100 and a second lens driving apparatus 2200. At this time, the first lens driving apparatus 2100 may be a driving unit for auto focusing, and the second lens driving apparatus 2200 may be a driving unit for hand tremor compensation.

The first lens driving apparatus 2100 may include a bobbin 2110, a first coil 2120, a magnet 2130, and a housing 2140.

The bobbin 2110 may be mounted inside the housing 2140 so as to reciprocate in a direction parallel to the optical axis. The first coil 2120 may be mounted on the outer circumferential surface of the bobbin 2110 so as to electromagnetically interact with the magnet 2130. In addition, the bobbin 2110 may be elastically supported by upper and lower elastic members 2150 and 2160, and may perform an auto focusing function by moving in the first direction.

Although not illustrated, the bobbin 2110 may include a lens barrel (not shown), in which at least one lens is installed. However, the lens may be directly received in the bobbin 2110, and a separate lens barrel may be omitted. The lens barrel may be coupled to the inside of the bobbin 2110 in any of various manners. For example, female threads may be formed in the inner circumferential surface of the bobbin 2110, and male threads, capable of engaging with the female threads, may be formed in the outer circumferential surface of the lens barrel. However, the disclosure is not limited thereto. Alternatively, one or more lenses may be integrally formed with the bobbin 2110, without the lens barrel. A single lens may be coupled to the lens barrel, or two or more lenses may be coupled to the lens barrel in order to constitute an optical system.

The bobbin 2110 may include a first stopper 2111 and/or a second stopper 2112. The first stopper 2111 may be referred to as an upper stopper and the second stopper 2112 may be referred to as a lower stopper.

The first stopper 2111 may inhibit the top surface of a body of the bobbin 2110 from directly colliding with the inside of the cover member 2300 although the bobbin 2110 deviates from a prescribed range due to external impact when the bobbin 2110 moves in the first direction to perform an auto focusing function. In addition, the first stopper 2111 may also function to guide a mounting position of the upper elastic member 1150.

For example, a plurality of first stoppers 2111 may protrude upwards by a first height h1. At least four stoppers may each protrude in the form of a polygonal post. In addition, the first stoppers 2111 may be symmetrically arranged about the center of the bobbin 2110. However, the disclosure is not limited thereto. The first stoppers may be asymmetrically arranged to avoid interference with other parts.

The second stopper 2112 may inhibit the bottom surface of the body of the bobbin 2110 from directly colliding with the base 2210 and the top surface of the circuit board 2250 shown in the sectional views of FIGS. 25 and 39 although the bobbin 2110 deviates from a prescribed range due to external impact when the bobbin 2110 moves in the first direction to perform an auto focusing function. For example, the second stopper 2112 may protrude from the edge of the bobbin 2110 in a circumferential direction, and the housing 2140 may be provided with a seat recess 2146 formed at a portion corresponding to the second stopper 2112.

In the case in which the second stopper 2112 is initially located on a bottom 2146a (see FIG. 28) of the seat recess 2146 in contact therewith, the bobbin 2110 may move upwards when current is supplied to the first coil 1120 and move downwards when no current is supplied to the first coil 1120, as in unidirectional control in a voice coil motor, to realize the auto focusing function.

On the other hand, in the case in which the second stopper 2112 is initially spaced apart from the bottom 2146a of the seat recess 2146 by a predetermined distance, the auto focusing function may be controlled like bi-directional control in the voice coil motor. That is, the bobbin 2110 may move upwards or downwards in a direction parallel to the optical axis to realize the auto focusing function. For example, the bobbin 2110 may move upwards when forward current is supplied to the first coil 2120, and the bobbin 2110 may move downwards when reverse current is supplied to the first coil 2120.

Meanwhile, the seat recess 2146 of the housing 2140 may be depressed, and may have a second width w2 that is greater than the first width w1 of the second stopper 2112, whereby the rotation of the second stopper 2112 in the seat recess 2146 may be restricted. Even when force is applied to the bobbin 2110 in the direction in which the bobbin 2110 is rotated about the optical axis, rather than in the optical-axis direction, therefore, the second stopper 2112 may prevent inhibit the rotation of the bobbin 2110.

In addition, a plurality of upper support protrusions 2113 may be protrudingly formed at the top surface of the bobbin 2110, and a plurality of lower support protrusions 2114 (see FIG. 30) may be protrudingly formed at the bottom surface of the bobbin 2110.

As shown in FIG. 26, the upper support protrusions 2113 may each have a cylindrical or prismatic shape. The upper support protrusions 2113 may fix an inner frame 2151 of the upper elastic member 2150 and the bobbin 2110 by coupling.

For example, the inner frame 2151 of the upper elastic member 2150 may be provided at portions thereof corresponding to the upper support protrusions 2113 with first through-holes 2151a. The upper support protrusions 2113 and the first through-holes 2151a may be fixed by thermal fusion or using an adhesive member, such as epoxy.

In addition, as shown in FIGS. 26 and 27, the upper support protrusion 2113 may be provided in a plural number. The distance between the upper support protrusions 2113 may be approximately set within a range capable of avoiding interference with peripheral parts. That is, the upper support protrusions 2113 may be arranged at uniform intervals in the state in which the upper support protrusions 2113 are symmetrically arranged about the center of the bobbin 2110. Alternatively, the upper support protrusions may be arranged symmetrically with respect to a specific imaginary line passing through the center of the bobbin 2110, although the distance between the upper support protrusions is not uniform.

As shown in FIG. 30, the lower support protrusions 2114 may each have a cylindrical or prismatic shape, like the upper support protrusions 2113. The lower support protrusions 2114 may fix an inner frame 2161 of the lower elastic member 2160 and the bobbin 2110 by coupling.

For example, the inner frame 2161 of the lower elastic member 2160 may be provided at portions thereof corresponding to the lower support protrusions 2114 with second through-holes 2161a. The lower support protrusions 2114 and the second through-holes 2161a may be fixed by thermal fusion or using an adhesive member, such as epoxy. In addition, as shown in FIG. 30, the lower support protrusions 2114 may be provided in a plural number. The distance between the lower support protrusions 2114 may be approximately set within a range capable of avoiding interference with peripheral parts. That is, the lower support protrusions 2114 may be arranged at uniform intervals in a state in which the lower support protrusions 2114 are symmetrically arranged about the center of the bobbin 2110.

Meanwhile, the number of the lower support protrusions 2114 may be less than that of the upper support protrusions 2113. This is based on the shapes of the upper elastic member 2150 and the lower elastic member 2160.

As shown in FIG. 27, the upper elastic member 2150 is divided into two parts, which are electrically separated from each other to function as terminals for supplying current to the first coil 2120. For this reason, a sufficient number of upper support protrusions 2113 is provided in order to inhibit incomplete coupling between the upper elastic member 2150 and the bobbin 2110.

Meanwhile, as shown in FIG. 29, the lower elastic member 2160 is a single body. Consequently, stable coupling between the lower elastic member 2160 and the bobbin 2110 is achieved even using a smaller number of lower support protrusions 2114 than the number of upper support protrusions 2113. Alternatively, the lower elastic member 2160 may be divided into two parts, which are electrically separated from each other to function as terminals for supplying current to the first coil 2120. In this case, the upper elastic member 2150 may be a single body.

In addition, two winding protrusions 2115 may be provided at the upper outer circumference of the bobbin 2110. Two opposite ends of the first coil 2120 may be wound around the winding protrusions 2115. The two opposite ends of the first coil 2120 disposed on the winding protrusions 2115 may be electrically connected to a pair of solder portions 2157 provided at the upper elastic member 2150 by soldering. In addition, a pair of winding protrusions 2115 may be arranged symmetrically with respect to the center of the bobbin 2110. The soldering between the solder portions 2157 and the first coil 2120 wound around the winding protrusions 2115 may also function to securely couple the inner frame 2151 of the upper elastic member 2150 and the upper surface of the bobbin 2110 to each other to inhibit incomplete coupling therebetween. In addition, a catching projection 2115a may be formed at the end of each of the winding protrusions 2115 in order to inhibit separation of the two opposite ends of the wound first coil 2120.

The first coil 2120 may be a coil block having a ring shape, which can be fitted onto the outer circumference of the bobbin 2110. However, the disclosure is not limited thereto. The first coil may be directly wound around the outer circumferential surface of the bobbin 2110.

For example, as shown in FIG. 25, the first coil 2120 may have an approximately octagonal shape, which corresponds to the shape of the outer circumference of the bobbin 2110. The bobbin 2110 may also have an octagonal shape. In addition, at least four sides of the first coil 2120 may be straight, and corners connected between the respective sides may be round or straight. Each straight portion of the bobbin 2110 may correspond to the magnet 2130. In addition, the surface of the magnet 2130 corresponding to the first coil 2120 may have the same curvature as the first coil 2120. That is, in the case in which the first coil 2120 is straight, the surface of the corresponding magnet 2130 may be straight. In the case in which the first coil 2120 is curved, the surface of the corresponding magnet 2130 may be curved. In addition, even in the case in which the first coil 2120 is curved, the surface of the corresponding magnet 2130 may be straight and vice versa.

The first coil 2120 moves the bobbin 2110 in the direction parallel to the optical axis to perform the auto focusing function. When current is supplied to the first coil 2120, the first coil 2120 may be moved together with the bobbin 2110 by electromagnetic interaction with the magnet 2130.

Meanwhile, the first coil 2120 may be configured to correspond to the magnet 2130. As illustrated, in the case in which the magnet 2130 is a single body such that the entirety of the surface of the magnet 2130 facing the first coil 2120 has the same polarity, the first coil 2120 may also be configured such that the surface of the first coil 2120 facing the magnet 2130 has the same polarity.

On the other hand, although not illustrated, in the case in which the magnet 2130 is divided into two parts by surfaces perpendicular to the optical axis, and therefore the surface of the magnet 2130 facing the first coil 2120 is divided into two or more surfaces, the first coil 2120 may also be divided into a number of parts corresponding to the number of the divided magnets 2130.

The magnet 2130 may be mounted at a position corresponding to the first coil 2120.

For example, the magnet 2130 may be mounted at a portion of the housing 2140 that corresponds to the first coil 2120 disposed on the bobbin 2110.

The magnet 2130 may be a single body. One surface of the magnet 2130 facing the first coil 2120 may have an N pole, and the other surface of the magnet 2130 may have an S pole. However, the disclosure is not limited thereto. The opposite configuration is also possible. In addition, the magnet 2130 may be divided into two parts by surfaces perpendicular to the optical axis.

At least two magnets 2130 may be mounted. According to this embodiment, four magnets 2130 may be mounted. Each of the magnets 2130 may be formed in the shape of a rectangular parallelepiped having a constant width and may be mounted to the housing 2140 such that a wide surface of each of the magnets 2130 is attached to a corresponding side surface of the housing 2140. At this time, the magnets 2130 that face each other may be arranged parallel to each other.

In addition, each magnet 2130 may be arranged so as to face the first coil 2120. At this time, the facing surfaces of the magnet 2130 and the first coil 2120 may be straight and parallel to each other. However, the disclosure is not limited thereto. Depending on the design, one of the magnet 2130 and the first coil 2120 may be straight, and the other may be curved. Alternatively, both the facing surfaces of the first coil 2120 and the magnet 2130 may be curved. At this time, the facing surfaces of the first coil 2120 and the magnet 2130 may have the same curvature.

For example, in the case in which each magnet 2130 has a hexahedral shape, one pair of magnets 2130 may be arranged parallel to each other in the second direction, and another pair of magnets 2130 may be arranged parallel to each other in the third direction. With this arrangement structure, movement of the housing 2140 may be controlled for optical image stabilization.

The housing 2140 may have an approximately quadrangular shape. According to this embodiment, as shown in FIG. 28, the housing 2140 may have an approximately octagonal shape. At this time, the housing 2140 may include a first side portion 2141 and a second side portion 2142.

The first side portion 2141 may be a portion at which the magnet 2130 is mounted, and the second side portion 2142 may be a portion at which the support member 2220 is disposed.

The first side portion 2141 may be flat. According to this embodiment, the first side portion 2141 may be formed to have an area equal to or greater than that of the magnet 2130. At this time, the magnet 2130 may be fixed to a magnet seat portion 2141a formed at the inside of the first side portion 2141. The magnet seat portion 2141a may be a recess corresponding to the size of the magnet 2130. The magnet seat portion 2141a may face at least four surfaces of the magnet 2130. At this time, an opening 2141b may be formed in the bottom surface of the magnet seat portion 2141a, i.e. the surface of the housing 2140 facing the second coil 2230, such that the bottom surface of the magnet 2130 disposed in the housing 2140 directly faces the second coil 2230. Meanwhile, the magnet 2130 may be fixed to the magnet seat portion 2141a using an adhesive. However, the disclosure is not limited thereto. The magnet 2130 may be fixed to the magnet seat portion 2141a using an adhesive member, such as a piece of double-sided tape. Alternatively, the magnet seat portion 2141a may be formed as a mounting hole having a window shape, in which a portion of the magnet 2130 is inserted or exposed, instead of the recess shown in FIG. 28. Meanwhile, the first side portion 2141 may be provided at the top surface thereof with an adhesive injection hole 2141c, through which an adhesive member, such as epoxy, for fixing the magnet 2130 is injected. According to this embodiment, the adhesive injection hole 2141c may have a tapered cylindrical shape, and an adhesive may be injected through the exposed top surface of the housing 2140.

A plurality of third stoppers 2143 may be disposed at the top surface of the housing 2140. At this time, the third stoppers 2143 may be referred to as upper stoppers. The third stoppers 2143 may inhibit collision between the cover member 2300 and the housing 2140. Specifically, the third stoppers 2143 may inhibit the top surface of the housing 2140 from directly colliding with the inside of the cover member 300 when an external impact is applied to the lens driving apparatus. In addition, the third stoppers 2143 may also function to guide the mounting position of the upper elastic member 2150. To this end, as shown in FIG. 26, the upper elastic member 2150 may be provided with guide recesses 2155, each of which has a shape corresponding to the shape of each third stopper 2143.

Meanwhile, the first side portion 2141 may be parallel to the side surface of the cover member 2300. In addition, the first side portion 2141 may have a larger size than the second side portion 2142.

In addition, as shown in FIGS. 28 and 29, the second side portion 2142 may have therein an escape recess 2142a having a predetermined depth. At this time, the bottom surface of the escape recess 2142a may be open to inhibit interference between the fixing portion of the lower portion of the support member 2220 and the housing 2140. In addition, steps 2142b may be formed at the upper side of the escape recess 2142a to support the inside of the upper portion of the support member 2220.

In addition, a plurality of upper frame support protrusions 2144, to which the outer frame 2152 of the upper elastic member 2150 is coupled, may be protrudingly formed at the upper side of the housing 2140.

At this time, the number of the upper frame support protrusions 2144 may be greater than that of the upper support protrusions 2113. This is because the length of the outer frame 2152 is greater than that of the inner frame 2151. Meanwhile, the outer frame 2152 may be provided with third through-holes 2152a corresponding to the upper frame support protrusions 2144. The upper frame support protrusions 2144 may be fixed in the third through-holes 2152a using an adhesive or by thermal fusion.

In addition, a plurality of lower frame support protrusions 2145, to which the outer frame 2162 of the lower elastic member 2160 is coupled, may be protrudingly formed at the lower side of the housing 2140. At this time, the number of the lower frame support protrusions 2145 may be greater than that of the lower support protrusions 2114. This is because the length of the outer frame 2162 of the lower elastic member 2160 is greater than that of the inner frame 2161. Meanwhile, the outer frame 2162 of the lower elastic member 2160 may be provided with fourth through-holes 2162*a* corresponding to the lower frame support protrusions 2145. The lower frame support protrusions 2145 may be fixed in the fourth through-holes 2162*a* using an adhesive or by thermal fusion.

In addition, a fourth stopper 2147 may protrude from the bottom surface of the housing 2140. At this time, the fourth stopper 2147 may be referred to as a lower stopper. The fourth stopper 2147 may inhibit the bottom surface of the housing 2140 from colliding with the base 2210 and/or the circuit board 2150. In addition, in an initial state or during normal operation, the fourth stopper 2147 may remain spaced apart from the base 2210 and/or the circuit board 2150 by a predetermined distance. As a result, the housing 2140 may be spaced apart from the base 2210 and the cover member 2300 such that the height of the housing 2140 in the optical-axis direction can be maintained by the support member 2220 without interference from above or below. Consequently, the housing 2140 may perform a shifting operation in the second direction and the third direction, which are a forward-and-backward direction and a left-and-right direction, respectively, in a plane perpendicular to the optical axis.

Meanwhile, when the bobbin 2110 moves upwards and/or downwards in the direction parallel to the optical axis, the bobbin 2110 may be elastically supported by the upper and lower elastic members 2150 and 2160. Each of the upper elastic member 2150 and the lower elastic member 2160 may be a leaf spring.

As shown in FIGS. 26 and 30, the upper and lower elastic members 2150 and 2160 may include inner frames 2151 and 2161 coupled to the bobbin 2110, outer frames 2152 and 2162 coupled to the housing 2140, and connection portions 2153 and 2163 for connecting the inner frames 2151 and 2161 and the outer frames 2152 and 2162 to each other, respectively.

The connection portions 2153 and 2163 may be bent at least once to form a predetermined pattern. The upward and/or downward movement of the bobbin 2110 in the first direction may be elastically supported by the change in position and minute deformation of the connection portions 2153 and 2163.

According to this embodiment, as shown in FIG. 32, the upper elastic member 2150 may be divided into a first upper elastic member 2150*a* and a second upper elastic member 2150*b*. Through this two-division structure, power having different polarities may be supplied to the first upper elastic member 2150*a* and the second upper elastic member 2150*b*.

That is, as shown in FIGS. 26 and 31, the inner frame 2151 of each of the first and second upper elastic members 2150*a* and 2150*b* may be provided at one end thereof with a solder portion 2157. The solder portion 2157 may be disposed at a position corresponding to a respective one of the winding protrusions 2115, around which the two opposite portions of the first coil 2120 are wound.

The solder portion 2157 and the first coil 2120 may be electrically connected to each other via conductive connection such as soldering. Power may be supplied to the first coil 2120 through the first and second upper elastic members 2150*a* and 2150*b*.

Referring to FIG. 31, at least two cutting pieces 2154 may be provided at the outer frame 2152 of the upper elastic member 2150 of FIG. 31. The upper elastic member 2150 shown in FIG. 31 is assembled with the housing 2140 and the bobbin 2110, and subsequently the cutting pieces 2154 are cut out, whereby the upper elastic member 2150 shown in FIG. 31 can be divided into two parts, namely the first and second upper elastic members 2150*a* and 2150*b* shown in FIG. 32.

At this time, the two opposite ends 2154*a* and 2154*b* of each cutting piece 2154 may each have a width that is smaller than the width of the outer frame 2152 so as to be easily cut.

In the case in which the width of each of the two opposite ends 2154*a* and 2154*b* of each cutting piece 2154 is smaller than the width of the outer frame 2152, a worker can visually and clearly check the positions to be cut of the outer frame 2152 of the upper elastic member 2150, and thus can perform a cutting process more conveniently using a cutting tool. Alternatively, unlike this embodiment, a first upper elastic member and a second upper elastic member may be manufactured separately, without forming the cutting pieces 2154, and may be individually coupled to the bobbin 2110 and the housing 2140.

Meanwhile, according to this embodiment, as shown in FIG. 31, support members 2220 may be formed integrally with the corners of the upper elastic member 2150, and may be bent in a direction parallel to the optical axis before or after the assembly. However, the disclosure is not limited thereto. The support members 2220 may be formed separately from the upper elastic member 2150 and may be coupled thereto. In addition, in the case in which the support members 2220 are formed separately, each of the support members 2220 may be embodied by a leaf spring, a coil spring, or a suspension wire. Any member capable of realizing elastic support may be used.

The upper and lower elastic members 2150 and 2160 may be assembled with the bobbin 2110 and the housing 2140 by thermal fusion and/or bonding using an adhesive. At this time, depending on the assembly order, the fixing operation may be completed by bonding using an adhesive after thermal fusion.

For example, in the case in which the bobbin 2110 and the inner frame 2161 of the lower elastic member 2160 are assembled first, and the housing 2140 and the outer frame 2162 of the lower elastic member 2160 are assembled second, the lower support protrusions 2114 of the bobbin 2110, the second through-holes 2161*a* coupled to the lower support protrusions 2114 of the bobbin 2110, and the fourth through-holes 2162*a* coupled to the lower frame support protrusions 2145 of the housing 2140 may be fixed by thermal fusion.

In the case in which the bobbin 2110 and the inner frame 2151 of the upper elastic member 2150 are assembled third, the upper support protrusions 2113 of the bobbin 2110 and the first through-holes 2151*a* coupled thereto may be fixed by thermal fusion.

Thereafter, in the case in which the housing 2140 and the outer frame 2152 of the upper elastic member 2150 are fixed fourth, the third through-holes 2152*a* coupled to the upper frame support protrusions 2144 of the housing 2140 may be bonded using an adhesive member, such as epoxy. However, the assembly order may be changed. For example, thermal fusion may be performed at the first to third assembly processes, and bonding may be performed at the fourth fixing process. Thermal fusion may cause deformation, such as twisting. For this reason, bonding may be performed at the final step.

In particular, since the upper elastic member 2150 is divided into two parts, the number of the upper support protrusions 2113 may be set to be greater than that of the lower support protrusions 2114 so as to inhibit incomplete coupling, which may be caused in the case in which the upper elastic member 2150 is divided into several parts.

The second lens driving apparatus 2200, which functions as the optical image stabilizer, may include a first lens driving apparatus 2100, a base 2210, a support member 2220, a second coil 2230, and a position sensor 2240, and may further include a circuit board 2250.

The first lens driving apparatus 2100 may have the same configuration as described above. However, the first lens driving apparatus 2100 may be replaced by an optical system having an auto focusing function different from the above configuration.

For example, the first lens driving apparatus 2100 may be constituted by an optical module using a single lens moving actuator or a reflective index variable type actuator instead of using a voice coil motor type auto focusing actuator. That is, any optical actuator capable of performing an auto focusing function may be used as the first lens driving apparatus 2100. However, it is necessary to mount the magnet 2130 at a position corresponding to the second coil 2230.

As shown in FIGS. 34 to 37, the base 2210 may have an approximately quadrangular shape, and the support member 2220 may be fixed to each of four corners of the base 2210. The base 2210 may be provided with a plurality of first recesses 2211, through which an adhesive is injected to fix the cover member 2300. At least one first recess 2211 may be formed in the side surface of the base 2210 that does not face a terminal surface 2250a of the circuit board 2250.

The base 2210 may be provided at a side surface thereof facing the terminal surface 2250a with a terminal surface support recess 2210a having a size corresponding to the terminal surface 2250a. The terminal surface support recess 2210a may be depressed inwards from the outer circumference of the base 2210 by a predetermined depth in order to inhibit the terminal surface 2250a from protruding outwards or adjusting the protruding length of the terminal surface 2250a.

In addition, steps 2210b may be formed at the circumference of the base 2210. The steps 2210b may be coupled to the end of the cover member 2300 in surface contact therewith, and may guide the cover member 2300. At this time, the steps 2210b and the end of the cover member 2300 may be fixed and sealed using an adhesive.

A plurality of guide protrusions 2212 may protrude from the top surface of the base 2210. The guide protrusions 2212 may include a first guide protrusion 2212a and/or a second guide protrusion 2212b. The first and/or second guide protrusions 2212a and 2212b may be arranged in various manners according to a design. The first guide protrusion 2212a, which is disposed at an inner position, may guide the mounting position of the circuit board 2250, and the second guide protrusion 2212b may guide the inner circumferential surface of the second coil 2230.

According to this embodiment, four second coils 2230 are provided. Therefore, eight first guide protrusions 212a and eight second guide protrusions 212b may be provided. That is, four pairs of first guide protrusions 212a and four pairs of second guide protrusions 2212b may guide the circuit board 2250 and the second coil 2230. Alternatively, depending on the design, a single first guide protrusion 2212a and a single second guide protrusion 2212b may be formed to guide the circuit board 2250 and/or the second coil 2230.

In addition, the base 2210 may be provided at the edge of the top surface thereof with support member seat recesses 2214, into which the support members 2220 are inserted. An adhesive may be applied to the support member seat recesses 2214 to fix the support members 2220 so that the support members 2220 cannot move. The ends of the support members 2220 may be inserted and fixed in the support member seat recesses 2214.

In addition, the base 2210 may be provided at the top surface thereof with a position sensor seat recess 2215 in which the position sensor 2240 is disposed. According to this embodiment, two position sensor seat recesses 2215 may be provided, and the position sensor 2102240 may be disposed in each position sensor seat recess 2215 to sense movement of the first lens driving apparatus 2100 in the second and third directions. To this end, for example, the two position sensor seat recesses 2215 may be arranged such that an angle between imaginary lines interconnecting the position sensor seat recesses 2215 and the center of the base 2210 is 90 degrees.

At least one surface of each position sensor seat recess 2215 may be provided with an inclined surface 2215a that is tapered such that epoxy can be easily injected to assemble the position sensor 2240. In addition, no epoxy may be injected into each position sensor seat recess 2215 although epoxy is injected to fix the position sensor 2240. The position sensor seat recesses 2215 may be disposed at the center or near the center of the second coil 2230. Alternatively, the center of the second coil 2230 may be aligned with that of the position sensor 2240.

In addition, as shown in FIG. 37, the base 2210 may be provided at the bottom surface thereof with a seat portion at which a filter is mounted. The filter may be an infrared cut off filter. However, the disclosure is not limited thereto. The base 2210 may be provided at the lower portion thereof with an additional sensor holder at which the filter is disposed. In addition, a sensor board having an image sensor mounted thereon may be coupled to the bottom surface of the base 2210 to constitute a camera module, which will be described later.

Referring to FIGS. 31 and 33, the support members 2220, which are formed integrally with four corners of the upper elastic member 2150, may be bent, and may be coupled to the base 2210 in the assembly process. The ends of the support members 2220 may be inserted into the support member seat recesses 2214 and may be fixed using an adhesive member, such as epoxy.

According to this embodiment, four support members 2220 may be provided so as to be disposed at the corners of the upper elastic member 2150. However, the disclosure is not limited thereto. Eight support members may be provided such that two support members are disposed at each corner of the upper elastic member.

The support members 2220 according to the embodiment may each include a connection portion 2221, elastic deformation portions 2222 and 2223, a fixing portion 2224, and a damping connection portion 2225. At least two of the four support members 2220 may each include a terminal portion 2226.

The connection portion 2221 may be connected to the upper elastic member 2150, and may be provided at the center thereof with a through-hole 2221a. The bending process may be performed with respect to the left and right portions of the through-hole 2221a in the connection portion 2221, whereby the process of bending the support member 2220 shown in FIG. 31 may be performed using a small amount of force. In addition, the shape of the connection portion 2221 is not limited to the shape shown in FIG. 31. Even if the through-hole 2221a is not provided, any shape capable of being bent may be used. In addition, for example, in the case in which the support member 2220 is formed separately from the upper elastic member 2150, the connection portion 2221 may be a portion at which the support member 2220 and the upper elastic member 2150 are electrically connected to each other.

The elastic deformation portions 2222 and 2223 may be bent at least once to form a predetermined pattern.

According to this embodiment, the elastic deformation portions 2222 and 2223 may include first and second elastic deformation portions 2222 and 2223 connected to each other and a damping connection portion 2225 connected to a portion at which the first and second elastic deformation portions 2222 and 2223 are connected to each other. For example, the first and second elastic deformation portions 2222 and 2223 may correspond to each other, or may be symmetric with respect to the portion at which the first and second elastic deformation portions 2222 and 2223 are connected to each other.

For example, as shown in FIG. 33, in the case in which the first elastic deformation portion 2222 is bent four times into an N shape having straight portions formed in a direction parallel to the optical axis, the second elastic deformation portion 2223 may have a shape corresponding to that of the first elastic deformation portion 2222. The N shape is merely illustrative, and the first and second elastic deformation portions may have various other patterns, e.g. a zigzag shape. For example, the first and second elastic deformation portions 2222 and 2223 may be integrated into a single elastic deformation portion. Alternatively, the first and second elastic deformation portions 2222 and 2223 may be configured in the form of a suspension wire having no pattern.

When the housing 2140 moves in the second and third directions perpendicular to the optical axis, the elastic deformation portions 2222 and 2223 may be minutely elastically deformed in the direction in which the housing 2140 moves. As a result, the housing 2140 may move substantially in the second and third directions perpendicular to the optical axis with little change in position of the housing 2140 in the first direction parallel to the optical axis, thereby improving the accuracy of optical image stabilization. This is based on the properties of the elastic deformation portions 2222 and 2223, which extend in the longitudinal direction.

The fixing portion 2224 may be provided at the end of the support member 2220. In addition, the fixing portion 2224 may be formed in a plate shape having a larger width than the elastic deformation portions 2222 and 2223. However, the disclosure is not limited thereto. The fixing portion 2224 may have a width equal to or less than that of the elastic deformation portions 2222 and 2223.

The fixing portion 2224 may be inserted into the support member seat recess 2214 of the base 2210, and may be fixed to the base 2210 using an adhesive member, such as epoxy. However, the disclosure is not limited thereto. The fixing portion 2224 may be fitted into the support member seat recess 2214.

The damping connection portion 2225 may be disposed at a portion with which the first and second elastic deformation portions 2222 and 2223 are in contact. The end of the damping connection portion 2225 may be disposed in a space defined by a partition wall 2227 of the housing 2140.

In addition, the damping connection portion 2225 may be located at a region of the support member 2220 that is located between the connection portion 2221 and the fixing portion 2224.

As shown in FIG. 33, the space may include three surfaces, namely an outer side surface of the second side portion 2142 of the housing 2140, a partition wall 2227 protruding from the outer side surface of the second side portion 2142, and a bottom surface located under the partition wall 2227. Silicon S for damping may be applied to the damping connection portion 2225 disposed in the space.

At this time, in order to inhibit silicon S from flowing down, silicon S may be applied in the state in which the housing 2140 is tilted such that the three surfaces of the space are oriented downwards. In addition, silicon S is made to remain a gel state, whereby the damping connection portion 2225 is not completely fixed. Therefore, the damping connection portion 2225 may move minutely according to movement of the elastic deformation portions 2222 and 2223. Minute vibration transferred via the elastic deformation portions 2222 and 2223, may be absorbed in the damping connection portion 2225 having silicon S applied thereto.

According to this embodiment, the end of the damping connection portion 2225 may have a hook shape. The hook-shaped end of the damping connection portion 2225 may be caught by the partition wall 2227. However, the disclosure is not limited thereto. The end of the damping connection portion 2225 may be straight, and may be disposed in the space.

Meanwhile, the upper elastic member 2150 may be divided into two parts, namely the first and second upper elastic members 2150a and 2150b, to which power having different polarities is supplied. Consequently, terminals 2226 for supplying power may be provided at the first and second upper elastic members 2150a and 2150b. The terminals 2226 may be provided at two of the four support members 2220, since positive (+) power or negative (−) power may be applied to the terminals 2226.

As shown in FIG. 33, the terminal 2226 may have the shape of a plate that extends from the fixing portion 2224, and may be bent at least once. The terminal 2226 may be electrically connected to a pad 2256 provided at the circuit board 2250 by a method such as soldering. To this end, the terminal 2226 of the support member 2220 and the pad 2256 of the circuit board 2250 may be arranged such that the surface of the terminal 2226 and the surface of the pad 2256 face each other. At this time, the terminal 2226 of the support member 2220 and the pad 2256 of the circuit board 2250 may be in surface contact with each other. Alternatively, as illustrated, the terminal 2226 of the support member 2220 and the pad 2256 of the circuit board 2250 may be spaced apart from each other by a predetermined distance, and a conductive member such as solder may be interposed therebetween. Through the coupling between the terminal 2226 of the support member 2220 and the pad 2256 of the circuit board 2250, the support member 2220 can supply power having different polarities to the first and second upper elastic members 2150a and 2150b, and can increase the fixing force between the support member 2220 and the base 2210.

The second coil 2230 may be disposed so as to face the magnet 2130, which is fixed to the housing 2140. In an example, the second coil 2230 may be disposed outside the magnet 2130. Alternatively, the second coil 2230 may be disposed under the magnet 2130 so as to be spaced apart from the magnet by a predetermined distance.

According to this embodiment, the second coil 2230 includes two second coils for the second direction, which face each other, and two second coils for the third direction, which face each other. However, the disclosure is not limited thereto. Two second coils, namely one second coil for the second direction and one second coil for the third direction may be provided. Alternatively, four or more second coils may be provided.

In addition, the second coil 2230 may be configured by winding a wire in a donut shape. As shown in FIG. 36, a start portion 2231 and an end portion 2232 of the second coil may be electrically connected to the terminals 2252 provided at the circuit board 2250.

The second coil 2230 may be mounted to the top surface of the circuit board 2250, which is disposed on the base 2210. However, the disclosure is not limited thereto. The second coil 2230 may be in close contact with the base 2210 or may be spaced apart from the base 2210 by a predetermined distance. Alternatively, the second coil 2230 may be provided at an additional board, which is disposed on the circuit board 2250. According to this embodiment, the mounting position of the second coil 2230 may be guided by first and second guide protrusions 2215*a* and 2215*b*, which protrude from the top surface of the base 2210.

The position sensor 2240 may be disposed at the center of the second coil 2230 to sense movement of the housing 2140. The position sensor 2240 may be constituted by a Hall sensor. However, any sensor capable of sensing a change in magnetic force may be used.

As shown in FIGS. 35 and 40, the position sensor 2240 may be mounted to the bottom surface of the circuit board 2250. The position sensor 2240 mounted to the bottom surface of the circuit board 2250 may be inserted into the position sensor seat recess 2215 formed in the base 2210. The bottom surface of the circuit board 2250 may be a surface that is opposite the surface on which the second coil 2230 is disposed.

The circuit board 2250 may be disposed on or coupled to the top surface of the base 2210. The mounting position of the circuit board 2250 may be guided by the first guide protrusion 2212*a*. The circuit board 2250 may be provided with at least one bent terminal surface 2250*a*. According to this embodiment, the circuit board 2250 may be provided with two bent terminal surfaces 2250*a*. A plurality of terminals 2251 may be disposed at the terminal surfaces 2250*a* in order to receive external power and to supply current to the first and second coils 2120 and 2230. The number of the terminals 2251 disposed at the terminal surfaces 2250*a* may be increased or decreased based on the kinds of components to be controlled. Meanwhile, according to this embodiment, the circuit board 2250 may be an FPCB. However, the disclosure is not limited thereto. The terminals of the circuit board 2250 may be directly formed at the surface of the base 2210 using a surface electrode method.

In addition, the circuit board 2250 may be provided with an escape recess 2254, through which one of the start portion 2231 and the end portion 2232 of the second coil 2230 passes. The escape recess 2254 may form a space, through which one of the start portion 2231 and the end portion 2232 of the second coil 2230 that is withdrawn from the bottom surface of the second coil 2230 passes. The bottom surface of the second coil 2230 may be a surface that is in contact with the circuit board 2250.

As shown in FIG. 36, any one of the start portion 2231 and the end portion 2232 of the second coil 2230 may be withdrawn from the bottom surface of the second coil 2230. In the case in which the start portion 2231 is withdrawn from the outer circumferential surface of the second coil 2230, the end portion 2232 may be withdrawn from the inner circumferential surface of the second coil 2230. At this time, the end portion 2232 is also withdrawn from the bottom surface of the second coil 2230. Thus, when the end portion 2232 is withdrawn from the inner circumferential surface of the second coil 2230 to the outside, the end portion 2232 must pass through the bottom surface of the second coil 2230. However, if the end portion 2232 is withdrawn from the bottom surface of the second coil 2230, the second coil 2230 may not be installed horizontally due to the thickness of the end portion. Therefore, the escape recess 2254 is formed in a predetermined shape in the circuit board 250 such that the entire bottom surface of the second coil 2230 is in surface contact with the entire surface of the mounting position. A space having a thickness corresponding to the escape recess 2254 is formed in the bottom surface near the end of the second coil 2230. As a result, the end portion 2232 passes through the space and can be withdrawn outside the second coil 2230.

The circuit board 2250 may be provided at corners thereof with pads 2256, which are electrically connected to the terminals 2226 provided at the support members 2220. The pads 2256 may be disposed on the top surfaces of the corners of the circuit board 2250, may be formed of a conductive material, and may be connected to an electric circuit (not shown) in the circuit board 250. Two withdrawn portions of the first coil 2120 may be connected to each of the pads 2256. Meanwhile, the pads 2256 may be provided at two corners of the circuit board 2250, and no pads may be provided at the two other corners of the circuit board 2250. The corners, at which the pads 2256 are not provided, may each have an angular shape, but may each have a chamfered shape, as shown in FIG. 35.

Meanwhile, the position sensor 2240 may be aligned with the center of the second coil 2230, with the circuit board 2250 interposed therebetween. That is, the position sensor 2240 is not directly connected to the second coil 2230. The second coil 2230 may be disposed on the top surface of the circuit board 2250, and the position sensor 2240 may be disposed on the bottom surface of the circuit board 2250. According to this embodiment, the position sensor 2240, the second coil 2230 and the magnet 2130 may be arranged in the same axis or may be aligned with each other. However, the disclosure is not limited thereto.

Through the above configuration, the second coil 2230 moves the housing 2140 in the second and third directions via interaction with the magnet 2130, thereby performing hand tremor compensation.

The cover member 2300 may have approximately a box shape so as to contain the first and second lens driving apparatuses 2100 and 2200. At this time, as shown in FIG. 24, the cover member 2300 may have a second recess 2310 formed at a position corresponding to the first recess 2211 in the base 2100, and a concave recess having a predetermined area may be formed by coupling of the first and second recesses 2211 and 2310. This concave recess may be coated with an adhesive member having viscosity. That is, the adhesive member coated on the concave recess may fill a gap defined between the facing surfaces of the cover member 2300 and the base 2210 through the concave recess, and may seal a space defined between the cover member 2300 and the base 2210, which are coupled to each other.

In addition, the cover member 2300 may be provided at a side plate thereof with a third recess 2320 in order to avoid interference with the terminals 2251 provided on the terminal surface 2250*a* of the circuit board 2250.

The third recess 2320 may be depressed in the side plate of the cover member 2300 that faces the terminal surface 2250a, and an adhesive member may be supplied into the third recess 2320 in order to seal a space defined between the cover member 2300 and the base 2210 and a space defined between the cover member 2230 and the circuit board 2250.

Meanwhile, the first to third recesses 2211, 2310 and 2320 may be formed in both the base 2210 and the cover member 2300. However, the disclosure is not limited thereto. The first to third recesses 2211, 2310 and 2320 may be formed in only the base 2210 or only the cover member 2300 in a similar manner.

Since the first and second lens driving apparatuses 2100 and 2200 can achieve the auto focusing operation and the hand tremor compensation operation using the magnet 2130 in common, the embodiment is capable of reducing the number of parts and of improving responsiveness by reducing the weight of the housing 2140. Needless to say, a magnet for auto focusing and a magnet for hand tremor compensation may be provided separately from each other.

In addition, since the support member 2220 and the upper elastic member 2150 can be formed in a body or can be formed integrally with each other, the embodiment is capable of reducing the number of parts and of improving assembly efficiency.

In addition, since external minute vibration transferred to the support member 2220 can be absorbed using silicon S, the embodiment is capable of realizing hand tremor compensation control more precisely.

The lens driving apparatus 300 according to the embodiment may further include a sensing coil 2400, first and second current supply units 2412 and 2414, and a voltage sensing unit 2420.

The sensing coil 2400 may be arranged in the housing 2140. The sensing coil 2400 may be disposed around the upper end of the outer circumferential surface of the housing 2140. The sensing coil 2400 may be disposed along the upper end of the outer circumferential surface of the housing 2140. Alternatively, the sensing coil 2400 may be inserted and fixed into a coil receiving recess 2148 formed in the outer circumferential surface of the housing 2140. The sensing coil 2400 may be directly wound around the coil receiving recess 2148 depressed inwards from the outer circumferential surface of the housing 2140.

The coil receiving recess 2148 may be located at the upper portion of the housing 2140 in order to avoid overlapping the magnet 2130, located in the housing 2140, in the horizontal direction. The sensing coil 2400 may take the form of, for example, a closed loop. However, the disclosure is not limited thereto.

The sensing coil 2400 may be spaced apart from the first coil 2120. Through this configuration, when power is supplied to the first coil 2120, induced voltage may be generated at the sensing coil 2400. The voltage induced to the sensing coil 2400 may vary according to the distance between the sensing coil 2400 and the first coil 2120. That is, the voltage induced to the sensing coil 2400 is variable. In this embodiment, based on the above characteristics, it is possible to sense the movement and/or the position of the bobbin 2110 by measuring the voltage induced to the sensing coil 2400. The movement and/or the position of the bobbin 110 sensed in this way may be used for the auto focusing feedback function.

The sensing coil 2400 may be electrically connected to the circuit board 2250. At this time, the sensing coil 2400 may be electrically connected to the circuit board 2250 via the upper elastic member 2150 and the support member 2220.

In an example, the upper elastic member 2150 may be divided into four or more parts. At this time, two divided upper elastic members may be electrically connected to the sensing coil 2400, and two other upper elastic members may be electrically connected to the first coil 2120.

That is, the sensing coil 2400 and the first coil 2120 may be electrically connected to the circuit board 2250 via the divided upper elastic members.

The sensing coil 2400 may be located so as to avoid overlapping the first coil 2120 in the horizontal direction. Meanwhile, the sensing coil 2400 may be located so as to avoid overlapping the magnet 2130 in the horizontal direction. That is, the sensing coil 2400 may be disposed so as to avoid overlapping the first coil 2120 and the magnet 2130 in a direction perpendicular to the optical axis, thereby minimizing the influence of the sensing coil 2400 on electromagnetic interaction between the first coil 2120 and the magnet 2130.

The second current supply unit 2414 may supply impulse current to the first coil 2120. For example, the second current supply unit 2414 may supply high-frequency current such as impulse current to the first coil 2120. For example, the high-frequency current supplied to the first coil 2120 may induce voltage to the sensing coil 2400 without influencing the movement of the bobbin 2110.

That is, the second current supply unit 2414 may supply impulse current to the first coil 2120, whereby induced voltage may be generated at the sensing coil 2400 without influencing the auto focusing operation of the bobbin 2110. The current supply unit 2412 may supply high-frequency current to the first coil 2120 at a predetermined interval or periodically.

The voltage sensing unit 2420 may sense the voltage induced to the sensing coil 2400 and may transmit the result of sensing voltage to the controller 2430 of the optical device. The controller 2430 of the optical device may determine the position of the bobbin 2110 based on the sensed voltage transmitted thereto.

FIG. 41 illustrates a Driver IC 2410 for supplying current to the first coil 2120. The Driver IC 2410 may include a first current supply unit 2412 for supplying drive current to the first coil 2120 and a second current supply unit 2414 for supplying high-frequency current such as impulse current to the first coil 2120 in order to cause the sensing coil 2400 to generate induced voltage.

That is, when drive current and high-frequency current are supplied to the first coil 2120 via the Driver IC 2410, the bobbin 2110 may move together with the first coil 2120, and voltage may be induced to the sensing coil 2400 according to the movement of the bobbin 2100.

The voltage induced to the sensing coil 2400 may be sensed by the voltage sensing unit 2420 and may be transmitted to the controller 2430 of the optical device. The controller 2430 of the optical device may calculate the position of the bobbin 2110 and may determine whether to perform additional movement of the bobbin 2110. These processes may be carried out in real time and may be referred to as an auto focusing feedback function.

Hereinafter, the operation of the camera module according to the embodiment will be described.

First, the auto focusing function of the camera module according to the embodiment will be described. When power is supplied to the first coil 2120, the first coil 2120 is moved by electromagnetic interaction between the first coil 2120 and the magnet 2130. At this time, the bobbin 2110, to which the first coil 2120 is coupled, is moved together with the first coil 2120. That is, the bobbin 2110, in which the lens module is coupled, moves in the vertical direction with respect to the housing 2140.

The movement of the bobbin 2110 causes the lens module to move close to or away from the image sensor. That is, the focus on a subject is adjusted.

Meanwhile, in order to realize the auto focusing function of the camera module according to the embodiment more precisely, the auto focusing feedback may be applied. Voltage is induced to the sensing coil 2400 mounted in the housing 2140 by the high-frequency current supplied to the first coil 2120. Meanwhile, when drive current is supplied to the first coil 2120 and thus the bobbin 2110 moves relative to the housing 2140, the magnitude of the voltage that is induced to the sensing coil 2400 may vary. At this time, high-frequency current may be supplied to the first coil 2120 at a predetermined interval. The voltage sensing unit 2420 senses the voltage that is induced to the sensing coil 2400 and transmits the sensed voltage to the controller 2430 of the optical device. The controller 2430 of the optical device determines whether to perform additional movement of the bobbin 2110 based on the voltage transmitted thereto from the voltage sensing unit 2420. Since these processes are performed in real time, the auto focusing function of the camera module according to the embodiment may be realized more precisely via the auto focusing feedback.

The hand tremor compensation function of the camera module according to the embodiment will now be described. When power is supplied to the second coil 2230, the magnet 2130 may be moved by electromagnetic interaction between the second coil 2230 and the magnet 2130, and the housing 2140, in which the magnet 2130 is coupled, may be moved together with the magnet 2130. That is, the housing 2140 may move in the horizontal direction with respect to the base 2210.

Meanwhile, the housing 2140 may be caused to be tilted with respect to the base 2210. Through this movement of the housing 2140, the lens module moves with respect to the image sensor in a direction (a direction perpendicular to the optical axis of the lens module) that is parallel to the direction in which the image sensor is oriented, thereby realizing the hand tremor compensation function.

Meanwhile, in order to realize the hand tremor compensation function of the camera module according to the embodiment more precisely, the hand tremor compensation feedback may be applied. A pair of position sensors 2240, which is mounted on the base 2210 and is constituted by a Hall sensor, senses a magnetic field of the magnet 2130, which is fixed to the housing 2140. When the housing 2140 moves relative to the base 2210, the intensity of the magnetic field that is sensed by the position sensors 2240 varies. The position sensors 2240 sense the movement of the housing 2140 in the horizontal direction (the x-axis direction and the y-axis direction) or the position of the housing 2140 in the above-described way, and transmit the sensed value to the controller, e.g. the controller 2430 of the optical device shown in FIG. 41.

The controller determines whether to perform additional movement of the housing 2140 based on the sensed value transmitted thereto. Since these processes are performed in real time, the hand tremor compensation function of the camera module according to the embodiment may be realized more precisely via the hand tremor compensation feedback.

Hereinafter, the assembly order of the lens driving apparatus 300 according to the embodiment will be described.

First, the housing 2140 having the sensing coil 2400 wound thereon and the magnet 2130 are bonded to each other. Subsequently, an adhesive is applied to the top surface of the base 2210, and the position sensor 2240, the second coil 2230 and the circuit board 250 are assembled thereon.

Subsequently, the lower elastic member 2160 for the auto focusing operation is assembled to the lower portion of the bobbin 2110 and the lower portion of the housing 2140. Subsequently, the upper elastic member 2150 for the auto focusing operation and the hand tremor compensation operation is assembled to the upper portion of the bobbin 2110 and the upper portion of the housing 2140. Subsequently, the bobbin 2110 and the housing 2140 are placed on the base 2210 so as to have correct central locations and heights, and the support members 220 formed integrally with the upper elastic member 2150 are bent and are fixed to the base 2210. Subsequently, the cover member 2300 is assembled with the base 2210, thereby completing the assembly of the lens driving apparatus.

Hereinafter, the camera module according to the embodiment will be described.

The camera module may include a lens driving apparatus, a lens module, an infrared cut off filter, a printed circuit Board, an image sensor, and a controller.

The lens module may include one or more lenses (not shown), and a lens barrel configured to accommodate one or more lenses. However, one configuration of the lens module is not limited to a lens barrel, and any holder construction configured to hold one or more lenses may be possible. The lens module may move along with the lens driving apparatus by being coupled to the lens driving apparatus. The lens module may be coupled to the inside of the lens driving apparatus, for example. The lens module may be screw-engaged with the lens driving apparatus, for example. The lens module may be coupled to the lens driving apparatus using an adhesive (not shown), for example. Meantime, light having passed through the lens module may be emitted to the image sensor.

The infrared cut off filter can cut off light of an infrared area incident on the image sensor. The infrared cut off filter may be positioned between the lens module and the image sensor, for example. The infrared cut off filter may be positioned at a holder member (not shown) formed separately from the base. However, the infrared cut off filter may be mounted in a through-hole formed at the center portion of the base. The infrared cut off filter may be formed of a film material or glass material, for example. Meanwhile, the infrared cut off filter may be formed by coating a plate-type optical filter, such as an imaging surface protecting cover glass or a cover glass, with an infrared cut off coating material.

The printed circuit board may support the lens driving apparatus. The printed circuit board may be mounted with an image sensor. By way of example, the printed circuit board may be mounted at an upper inner side with an image sensor and at an upper outside with a sensor holder (not shown). The sensor holder may be positioned at an upper side with a lens driving apparatus. Furthermore, the printed circuit board may be positioned at an upper outside with a lens driving apparatus and at an upper inside with an image sensor. Through this configuration, light having passed through the lens module accommodated inside the lens driving apparatus may be emitted to the image sensor mounted at the printed circuit board. The printed circuit board may supply power to the lens driving apparatus.

Meanwhile, the printed circuit board may be provided with a controller for controlling the lens driving apparatus.

The image sensor may be mounted on the printed circuit board. The image sensor may be positioned so as to allow an optical axis to be aligned with the lens module, whereby the image sensor may obtain light having passed through the lens module. The image sensor may output an image using light emitted thereto. The image sensor may be a charge coupled device (CCD), a metal oxide semi-conductor (MOS), a CPD or a CID, for example. However, the kinds of image sensor are not limited thereto.

The controller may be mounted on the printed circuit board. The controller may be positioned at an outside of the lens driving apparatus. However, the controller may be positioned at an inside of the lens driving apparatus. The controller may control a direction, intensity and amplitude of current supplied to each component of the lens driving apparatus. The controller may perform at least one of an auto focusing function and a hand tremor compensation function of the camera module by controlling the lens driving apparatus. That is, the controller may move the lens module in the optical-axis direction or in a direction perpendicular to the optical-axis direction or may tilt the lens module by controlling the lens driving apparatus. Furthermore, the controller may perform feedback control with respect to the auto focusing function and the hand tremor compensation function.

Figure 42:
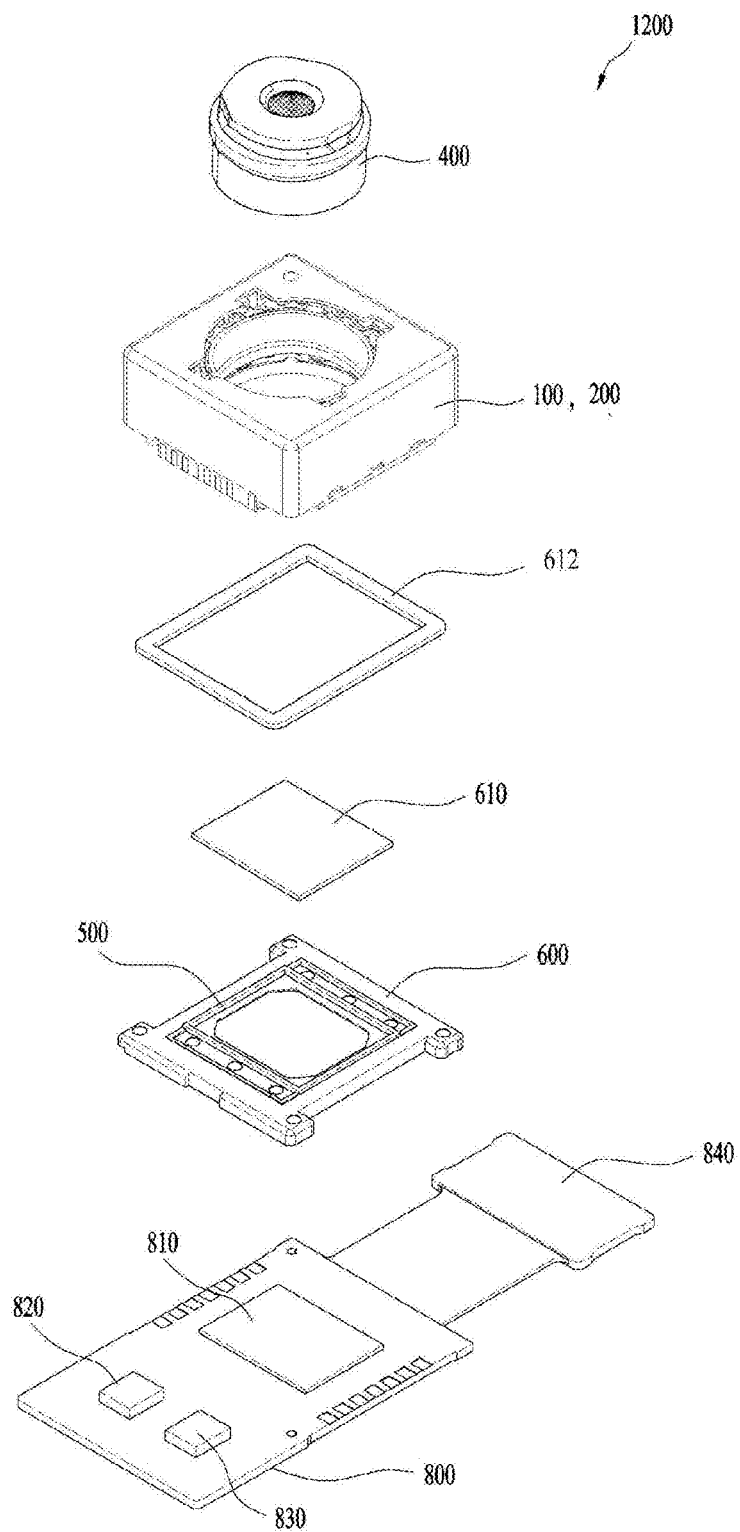
FIG. 42 illustrates an exploded perspective view of a camera module according to an embodiment.

FIG. 42 is an exploded perspective view illustrating a camera module 1200 according to an embodiment.

Referring to FIG. 42, the camera module 1200 may include a lens barrel 400, a lens driving apparatus 100, 200 or 300, a filter 610, an image sensor 810, a sensor 820, a controller 830, and a connector 840.

The camera module 1200 may further include an adhesive member 612, a first holder 600, and a second holder 800.

The lens barrel 400 may be mounted in a bobbin 110 of the lens driving apparatus 100, 200 or 300. The lens driving apparatus 100, 200 or 300 may be the embodiment shown in FIG. 1, 14 or 24.

The first holder 600 may be located under the base 210 or 1210 of the lens driving apparatus 100 or 200. The filter 610 may be mounted on the first holder 600, and the first holder 600 may have a protruding portion 500 on which the filter 610 is seated.

The adhesive member 612 may couple or attach the base 210 or 1210 of the lens driving apparatus 100 or 200 to the first holder 600. In addition to the attachment function described above, the adhesive member 612 may serve to inhibit foreign matter from entering the lens driving apparatus 100, 200 or 300.

For example, the adhesive member 612 may be epoxy, a thermosetting adhesive, or an ultraviolet-curable adhesive.

The filter 610 may serve to inhibit light within a specific frequency band having passed through the lens barrel 400 from being introduced into the image sensor 810. The filter 610 may be an infrared cut off filter. However, the disclosure is not limited thereto. At this time, the filter 610 may be oriented parallel to the x-y plane.

A region of the first holder 600 in which the filter 610 is mounted may be provided with a hollow to allow the light having passed through the filter 610 to be introduced into the image sensor 810.

The second holder 800 may be disposed under the first holder 600, and the image sensor 810 may be mounted on the second holder 600. The light having passed through the filter 610 is introduced into the image sensor 810 so as to form an image on the image sensor 810.

The second holder 800 may include various circuits, devices, and a controller in order to convert the image, formed on the image sensor 810, into electrical signals to thereby transmit the same to an external device.

The second holder 800 may take the form of a circuit board on which the image sensor may be mounted, a circuit pattern may be formed, and various devices are coupled.

The image sensor 810 may receive an image included in light introduced through the lens driving apparatus 100 or 200, and may convert the received image into electrical signals.

The filter 610 and the image sensor 810 may be spaced apart from each other so as to be opposite to each other in the first direction.

The sensor 820 may be mounted on the second holder 800, and may be electrically connected to the hand tremor controller 830 through the circuit pattern formed on the second holder 800.

The sensor 820 may be a device capable of sensing movement of the camera module 1200. For example, the sensor 820 may take the form of a motion sensor, a dual-axis or triple-axis gyro sensor, an angular speed sensor, an acceleration sensor, or a gravity sensor.

The controller 830 controls the operation of the lens driving apparatus 100, 200 or 300. The controller 830 may include at least one of an AF feedback controller for performing an AF feedback operation or an OIS feedback controller for performing OIS feedback control.

The controller 830 may be mounted on the second holder 800.

The AF feedback controller may be electrically connected to the first coil 120, 1120 or 2100 and the second coil 170, 1170 or 2400 of the lens driving apparatus 100, 200 or 300.

The AF feedback controller may supply the first drive signal Id1 to the first coil 120, 1120 or 2120 and may supply the second drive signal Id2 to the second coil 170, 1170 or 2400.

The AF feedback controller may perform AF feedback control with respect to displacement of the movable unit in response to the result of sensing the displacement of the movable unit based on the first induced voltage V1 of the first induction coil 1171 and the voltage V2 of the second induction coil.

In addition, the OIS feedback controller may be electrically connected to the position sensors 240a and 240b and the third coils 1230a to 1230d. The OIS feedback controller may perform OIS feedback control with respect to the OIS movable unit in response to the result of sensing displacement of the OIS movable unit based on signals supplied from the position sensors 240a and 240b. At this time, the OIS movable unit may include the AF movable unit and components mounted in the housing 1140.

The connector 840 may be electrically connected to the second holder 800 and may be provided with a port for electrical connection with an external device.

In order to remove PWM noise, unlike the embodiment in which a capacitor is added to the circuit board 250 of FIG. 1 or the circuit board 1250 of FIG. 14, a capacitor, which is connected in parallel to the second coil 170 or 1170, may be provided at the second holder 800 of the camera module.

In addition, the lens driving apparatus 100, 200 or 300 according to the embodiment may be included in an optical instrument, which forms an image of an object present in a space using reflection, refraction, absorption, interference, and diffraction of light, which increases visibility, which records and reproduces an image via a lens, or which performs optical measurement or propagation or transmission of images. For example, the optical instrument according to the embodiment may be any one of a mobile phone, a smartphone, a portable smart device, a digital camera, a laptop computer, a digital broadcasting terminal, a Personal Digital Assistant (PDA), a Portable Multimedia Player (PMP), and a navigation device, but not limited hereto. Any kind of device for capturing a picture or motion picture may be possible.

Figure 43:
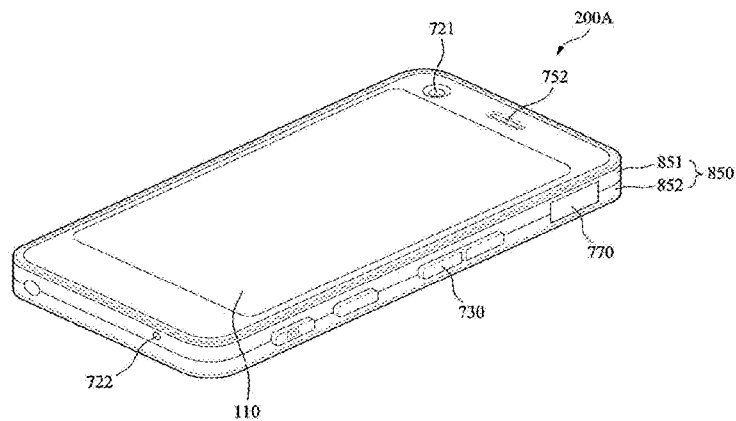
FIG. 43 illustrates a perspective view of a mobile terminal according to an embodiment.
Figure 44:
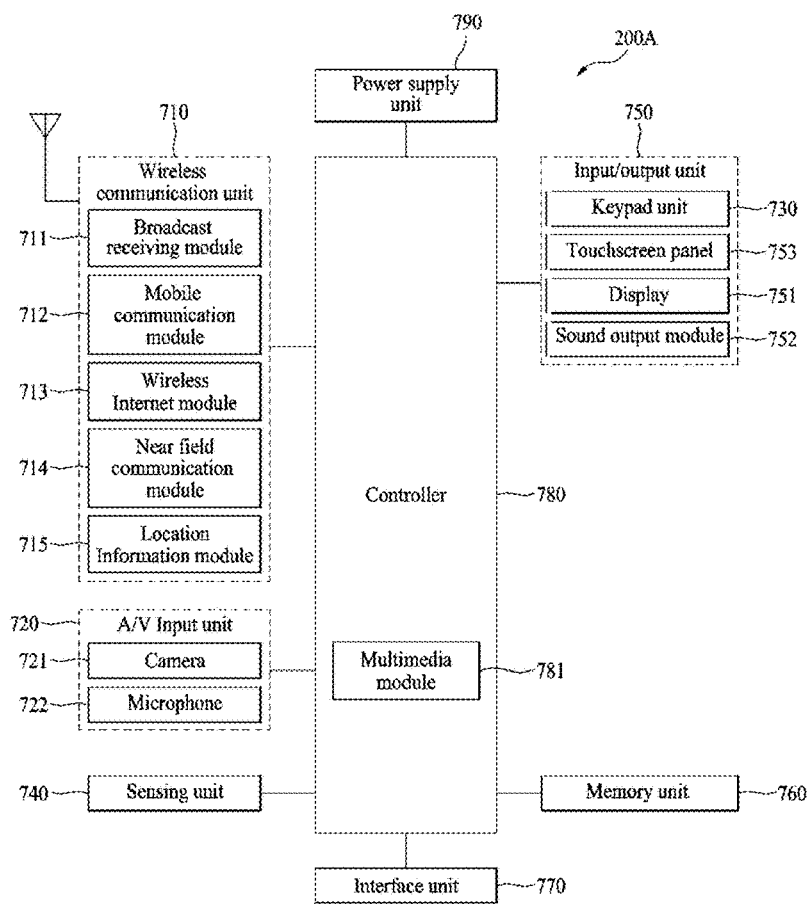
FIG. 44 is a view illustrating the constitution of the mobile terminal shown in FIG. 43.

FIG. 43 is a perspective view illustrating a mobile terminal 200A according to an embodiment, and FIG. 44 is a view illustrating the constitution of the mobile terminal shown in FIG. 43.

Referring to FIGS. 43 and 44, the mobile terminal 200A (hereinafter, referred to as a "terminal") may include a body 850, a wireless communication unit 710, an A/V input unit 720, a sensing unit 740, an input/output unit 750, a memory unit 760, an interface unit 770, a controller 780, and a power supply unit 790.

The body 850 shown in FIG. 43 has a bar shape. However, the disclosure is not limited thereto. The body may be any of various types such as, for example, a slide type, a folder type, a swing type, or a swivel type in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a near field communication module 714, and a location information module 715.

The Audio/Video (A/V) input unit 720 serves to input audio signals or video signals, and may include a camera 721 and a microphone 722.

The camera 721 may include the camera module 1200 according to the embodiment shown in FIG. 42.

The sensing unit 740 may sense the current state of the terminal 200A such as, for example, the opening or closing of the terminal 200A, the location of the terminal 200A, the presence of user touch, the orientation of the terminal 200A, or the acceleration/deceleration of the terminal 200A, and may generate a sensing signal to control the operation of the terminal 200A. For example, when the terminal 200A is a slide type phone, the sensing unit may sense whether the slide type phone is opened or closed. In addition, the sensing unit serves to sense whether power is supplied from the power supply unit 790, or whether the interface unit 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals.

For example, the display module 751 may include at least one of a liquid crystal display, thin film transistor-liquid crystal display, organic light-emitting diode display, flexible display, or 3D display.

The sound output module 752 may output audio data received from the wireless communication unit 710 in, for example, a call signal receiving mode, a call mode, a recording mode, a voice recognition mode, or a broadcast receiving mode, or may output audio data stored in the memory unit 760.

The touchscreen panel 753 may convert variation in capacitance, caused by a user touch to a specific touchscreen region, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external device. The interface unit 770 may receive power or data from the external device and transmit the same to respective constituent elements inside the terminal 200A, or may transmit data inside the terminal 200A to the external device. For example, the interface unit 770 may include a wired/wireless headset port, an external charger port, a wired/wireless data port, a memory card port, a port for connection of a device having an identification module, an audio input/output (I/O) port, a video I/O port, and an earphone port.

The controller 780 may control the general operation of the terminal 200A. For example, the controller 780 may perform control and processing related to voice call, data communication, and video call.

The controller 780 may include a multimedia module 781 for multimedia playback. The multimedia module 781 may be provided inside the controller 780, or may be provided separately from the controller 780.

The controller 780 may perform pattern recognition processing by which writing input or drawing input to a touchscreen is perceivable as characters and images respectively.

The power supply unit 790 may supply power required to operate the respective constituent elements upon receiving external power or internal power under the control of the controller 780.

The features, structures and effects described in association with the embodiments above are incorporated into at least one embodiment of the present invention, but are not limited only to the one embodiment. Furthermore, the features, structures and effects exemplified in association with respective embodiments can be implemented in other embodiments by combination or modification by those skilled in the art. Therefore, contents related to such combinations and modifications should be construed as falling within the scope of the present invention.

INDUSTRIAL APPLICABILITY

Embodiments may be used for a lens driving apparatus capable of achieving accurate auto focusing by inhibiting a lens from being defocused due to variation in ambient temperature, and for a camera module and an optical device.

The invention claimed is:

1. A lens driving apparatus comprising:
a housing;
a bobbin accommodated in the housing, the bobbin being equipped with a lens;
a first coil disposed on an outer circumferential surface of the bobbin;
a magnet disposed in the housing;
a second coil disposed in the housing; and
a circuit board electrically connected to the second coil,
wherein the second coil comprises a third coil and a fourth coil,
wherein the first coil receives a first signal and the fourth coil receives a second signal,
wherein induced voltage is generated at the second coil by mutual induction with the first coil, and
wherein the circuit hoard comprises a terminal for outputting the induced voltage of the second coil.

2. The lens driving apparatus according to claim 1, wherein voltage is generated at the fourth coil by the second signal.

3. The lens driving apparatus according to claim 2, wherein voltage generated by the second signal varies according to variation in ambient temperature.

4. The lens driving apparatus according to claim 1, wherein each of the third coil and the fourth coil surrounds an outer circumferential surface of the housing so as to rotate about an optical axis in a clockwise direction or in a counterclockwise direction.

5. The lens driving apparatus according to claim 1, wherein one of the third coil and the fourth coil surrounds an outer circumferential surface of the housing so as to rotate about an optical axis in a clockwise direction or in a counterclockwise direction, and
a remaining one of the third coil and the fourth coil is disposed in a shape of a coil ring that is wound about an axis perpendicular to the optical axis in the clockwise direction or in the counterclockwise direction.

6. The lens driving apparatus according to claim 1, wherein each of the first signal and the second signal is one of an alternating-current signal and a pulse signal.

7. The lens driving apparatus according to claim 1, wherein each of the first signal and the second signal comprises a pulse width modulation (PWM) signal.

8. The lens driving apparatus according to claim 7, wherein the PWM signal has a frequency of 20 kHz or higher.

9. The lens driving apparatus according to claim 1, wherein the third coil and the fourth coil are connected in series to each other, and an intermediate tap is provided at a contact point between one end of the third coil and one end of the fourth coil.

10. The lens driving apparatus according to claim 9, wherein the intermediate tap receives ground power.

11. The lens driving apparatus according to claim 1, wherein the third coil and the fourth coil are electrically separated from each other.

12. The lens driving apparatus according to claim 1, further comprising:
an upper elastic member coupled to an upper portion of the bobbin and an upper portion of the housing; and
a lower elastic member coupled to a lower portion of the bobbin and a lower portion of the housing,
wherein each of the upper elastic member and the lower elastic member is divided into two or more parts,
wherein the first coil is electrically connected to two selected from among the divided parts of the upper elastic member, and
wherein the second coil is electrically connected to at least three selected from among parts of the upper elastic member other than the selected parts of the upper elastic member and among the parts of the lower elastic member.

13. The lens driving apparatus according to claim 12, wherein the circuit board is disposed on one side surface of the housing and electrically connected to the divided parts of the upper elastic member and the divided parts of the lower elastic member.

14. The lens driving apparatus according to claim 12, wherein the circuit board is disposed below the lower elastic member and electrically connected to the divided parts of the upper elastic member and the divided parts of the lower elastic member; and
support members electrically connect the divided parts of the upper elastic member and the circuit board to each other.

15. The lens driving apparatus according to claim 14, further comprising:
a fifth coil disposed on the circuit board, the fifth coil being configured to move the housing via interaction with the magnet.

16. The lens driving apparatus according to claim 1, further comprising:
a capacitor connected in parallel to both ends of the second coil.

17. The lens driving apparatus according to claim 1, wherein induced voltage generated at each of the third coil and the fourth coil by mutual induction with the first coil varies according to variation in ambient temperature.

18. The lens driving apparatus according to claim 1, wherein each of the first signal and the second signal comprises an alternating-current signal and a direct-current signal.

19. A camera module comprising:
a lens barrel;
a lens driving apparatus according to claim 1 for moving the lens barrel;
an image sensor for converting an image incident through the lens driving apparatus into an electrical signal; and
a drive controller for controlling the lens driving apparatus.

20. An optical device comprising:
a display module comprising a plurality of pixels, colors of which are changed according to an electrical signal;
a camera module according to claim 19 for converting an image incident thereon into an electrical signal; and
a controller for controlling operation of the display module and the camera module.

* * * * *